United States Patent
Sasaki et al.

(10) Patent No.: US 9,452,803 B2
(45) Date of Patent: *Sep. 27, 2016

(54) VEHICLE

(71) Applicant: Yamaha Hatsudoki Kabushiki Kaisha, Iwata-shi, Shizuoka (JP)

(72) Inventors: Kaoru Sasaki, Shizuoka (JP); Mitsuaki Ohta, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/652,871

(22) PCT Filed: Dec. 18, 2013

(86) PCT No.: PCT/JP2013/083931
§ 371 (c)(1),
(2) Date: Jun. 17, 2015

(87) PCT Pub. No.: WO2014/098140
PCT Pub. Date: Jun. 26, 2014

(65) Prior Publication Data
US 2015/0321721 A1    Nov. 12, 2015

(30) Foreign Application Priority Data

Dec. 18, 2012 (JP) .................. 2012-276256
Jul. 1, 2013 (JP) .................. 2013-138485

(51) Int. Cl.
*B62K 5/027* (2013.01)
*B62K 5/06* (2006.01)
(Continued)

(52) U.S. Cl.
CPC .................. *B62K 5/027* (2013.01); *B60G 3/20* (2013.01); *B62D 9/02* (2013.01); *B62J 15/00* (2013.01);
(Continued)

(58) Field of Classification Search
CPC ............ B62K 5/05; B62K 5/08; B62K 5/10; B62K 5/027; B62K 2202/00; B62D 9/02; B62J 15/00; B62J 17/02; B60G 2200/144; B60G 2300/122; B60G 2300/45
See application file for complete search history.

(56) References Cited

U.S. PATENT DOCUMENTS 4,351,410 A   9/1982  Townsend
4,822,067 A   4/1989  Matsuo et al.
(Continued)

FOREIGN PATENT DOCUMENTS

CN    1386668 A    12/2002
CN   102762440 A   10/2012
(Continued)

OTHER PUBLICATIONS

Basaki et al.; "Vehicle"; U.S. Appl. No. 14/652,870, filed Jun. 17, 2015.
(Continued)

*Primary Examiner* — Faye M Fleming
(74) *Attorney, Agent, or Firm* — Keating and Bennett, LLP

(57) ABSTRACT

A right front fender and a left front fender are displaceable relative to a vehicle body frame in accordance with an operation of a link mechanism. At least a portion of the right front fender is disposed above a center in the up-down direction of the vehicle body frame between an upper end of a right front wheel and a lower edge of the link mechanism or a steering mechanism directly above the right front wheel, as seen from a front in the front-rear direction of the vehicle body frame when the vehicle body frame is in the upright state. At least a portion of the left front fender is disposed above a center in the up-down direction of the vehicle body frame between an upper end of a left front wheel and a lower edge of the link mechanism or the steering mechanism directly above the left front wheel, as seen from the front in the front-rear direction of the vehicle body frame when the vehicle body frame is in the upright state.

10 Claims, 19 Drawing Sheets

(51) Int. Cl.
  *B62K 5/10* (2013.01)
  *B62K 5/05* (2013.01)
  *B62J 15/00* (2006.01)
  *B62D 9/02* (2006.01)
  *B62J 17/02* (2006.01)
  *B62K 5/08* (2006.01)
  *B60G 3/20* (2006.01)

(52) U.S. Cl.
  CPC ............... *B62J 17/02* (2013.01); *B62K 5/05* (2013.01); *B62K 5/06* (2013.01); *B62K 5/08* (2013.01); *B62K 5/10* (2013.01); *B60G 2200/144* (2013.01); *B60G 2300/122* (2013.01); *B60G 2300/45* (2013.01); *B62K 2202/00* (2013.01)

(56) References Cited

U.S. PATENT DOCUMENTS

| | | | |
|---|---|---|---|
| 7,073,806 | B2 | 7/2006 | Bagnoli |
| D547,242 | S | 7/2007 | Lambri |
| 7,497,525 | B2 * | 3/2009 | Mercier ............ B60T 8/1706 303/9.71 |
| D598,328 | S | 8/2009 | Lambri |
| 7,607,695 | B2 * | 10/2009 | Moulene ............ B60G 21/007 280/5.507 |
| D656,435 | S | 3/2012 | Lambri et al. |
| 9,145,168 | B2 * | 9/2015 | Spahl ............ B62D 9/02 |
| 2004/0140645 | A1 | 7/2004 | Hayashi |
| 2009/0166120 | A1 | 7/2009 | Okamoto |
| 2012/0181765 | A1 * | 7/2012 | Hill ............ B62K 5/027 280/62 |
| 2012/0312609 | A1 | 12/2012 | Takewaka et al. |
| 2013/0168944 | A1 | 7/2013 | Bartolozzi et al. |
| 2015/0137472 | A1 * | 5/2015 | Katoh ............ B62K 5/10 280/124.103 |
| 2015/0298736 | A1 * | 10/2015 | Sasaki ............ B62J 15/00 280/124.103 |

FOREIGN PATENT DOCUMENTS

| | | |
|---|---|---|
| DE | 10 2010 052 716 A1 | 6/2011 |
| EP | 2 077 219 A2 | 7/2009 |
| EP | 2 368 729 A1 | 9/2011 |
| JP | 7-144671 A | 6/1995 |
| JP | 2009-161015 A | 7/2009 |
| JP | 2012-056503 A | 3/2012 |
| TW | 201117997 A1 | 6/2011 |
| TW | 201130675 A1 | 9/2011 |
| WO | 2012/007819 A1 | 1/2012 |

OTHER PUBLICATIONS

Official Communication issued in International Patent Application No. PCT/JP2013/083931, mailed on Apr. 1, 2014.
Official Communication issued in corresponding European Patent Application No. 13865194.8, mailed on Dec. 3, 2015.
Official Communication issued in corresponding European Patent Application No. 13 865 194.8, mailed on Dec. 18, 2015.
Official Communication issued in corresponding Chinese Patent Application No. 201380038938.6 mailed on Jun. 1, 2016.

* cited by examiner

VEHICLE

BACKGROUND OF THE INVENTION

1. Field of the Invention

The present invention relates to a vehicle equipped with a leanable body frame and two front wheels.

2. Description of the Related Art

A known vehicle includes a vehicle body frame that is leanable leftward or rightward when the vehicle is cornering, and two front wheels that are arranged side by side in a left-right direction of the vehicle body frame (for example, see U.S. Design Pat. No. D547,242 and U.S. Pat. No. 7,073,806).

A front portion of this type of vehicle tends to be large. Thus, in the vehicles described in U.S. Design Pat. No. D547,242 and U.S. Pat. No. 7,073,806, the link mechanism is disposed above the two front wheels so as to reduce the space therebetween, thus realizing a reduction in the size of the front portion of the vehicle in relation to the left-right direction of the vehicle body frame. However, in the vehicle including two front wheels in which a distance therebetween is narrow, the vehicle body cover covering the link mechanism extends, when the vehicle is in the upright state, to an area forward of the front ends of the two front wheels and below upper ends of the two front wheels. Consequently, it is difficult to reduce the size of the front portion of the vehicle in relation to the front-rear direction of the vehicle body frame.

An attempt was made to reduce the size of the vehicle body cover in relation to the front-rear direction of the vehicle body frame. Specifically, the shape of the vehicle body cover was changed so that a front end of the vehicle body cover was disposed behind the front ends of the two front wheels, the space between which was reduced, and above the upper ends thereof when the vehicle is in the upright state. As a result, although it was possible to decrease the size of the front portion of the vehicle, it was discovered that the maximum speed of the vehicle may decrease, or fuel consumption may deteriorate.

SUMMARY OF THE INVENTION

Consequently, preferred embodiments of the present invention provide a front portion of a vehicle including a leanable vehicle body frame and two front wheels smaller in size while maintaining the traveling performance of the vehicle.

According to a preferred embodiment of the present invention, a vehicle includes a vehicle body frame; a handlebar configured to turn relative to the vehicle body frame; a vehicle body cover at least a portion of which covers the vehicle body frame; a right front wheel and a left front wheel arranged side by side in a left-right direction of the vehicle body frame; a steering mechanism configured to transmit a turning motion of the handlebar to the right front wheel and the left front wheel; a link mechanism disposed above the right front wheel and the left front wheel, and configured to cause the vehicle body frame to lean relative to a vertical direction by changing positions of the right front wheel and the left front wheel relative to the vehicle body frame; and a power unit supported by the vehicle body frame and including a drive source; wherein the vehicle body cover includes a link cover portion covering at least a portion of the link mechanism, configured to not be displaced relative to the vehicle body frame, including a front portion disposed forward of respective rear ends of the right front wheel and the left front wheel in a front-rear direction of the vehicle body frame, and as seen from the front in the front-rear direction of the vehicle body frame of the vehicle when the vehicle body frame is in an upright state, is configured such that a right lower edge of the front portion directly above the right front wheel is disposed above a lower end of the link mechanism or the steering mechanism in an up-down direction of the vehicle body frame, and such that a left lower edge of the front portion directly above the left front wheel is disposed above a lower end of the link mechanism or the steering mechanism in the up-down direction of the vehicle body frame; a right aerodynamic portion configured to be displaced relative to the vehicle body frame in accordance with an operation of the link mechanism, configured to reduce wind pressure received during travelling of the vehicle by at least one of a portion of the link mechanism, a portion of the steering mechanism, a portion of the vehicle body frame, a portion of the vehicle body cover, and a portion of the power unit, any one of which is located between an upper edge of the right front wheel and the right lower edge of the front portion of the link cover portion, and is located above a center in the up-down direction of the vehicle body frame between an upper end of the right front wheel and a lower edge of the link mechanism or the steering mechanism directly above the right front wheel as seen from the front in the front-rear direction of the vehicle body frame when the vehicle body frame is in the upright state; and a left aerodynamic portion configured to be displaced relative to the vehicle body frame in accordance with the operation of the link mechanism, configured to reduce wind pressure received during travelling of the vehicle by at least one of a portion of the link mechanism, a portion of the steering mechanism, a portion of the vehicle body frame, a portion of the vehicle body cover, and a portion of the power unit, any one of which is located between an upper edge of the left front wheel and the left lower edge of the front portion of the link cover portion, and is located above a center in the up-down direction of the vehicle body frame between an upper end of the left front wheel and a lower edge of the link mechanism or the steering mechanism directly above the left front wheel as seen from the front in the front-rear direction of the vehicle body frame when the vehicle body frame is in the upright state.

In the vehicle including the leanable vehicle body frame and the link mechanism, the right front wheel and the left front wheel each have a wide movable range. This is because the right front wheel and the left front wheel are turned when steered, displaced in the up-down direction of the vehicle body frame as the right shock absorber and the left shock absorber extend or contract, and displaced in the up-down direction of the vehicle body frame in accordance with the operation of the link mechanism. A vehicle body cover, which is not displaced relative to the vehicle body frame, covers a long distance with respect to the right front wheel and the left front wheel, each of which has such a wide movable range, so as to avoid interference therewith.

When a front end of the vehicle body cover is disposed behind the respective front ends of the right and left front wheels arranged with a narrow space therebetween to decrease the size of the vehicle body cover in the front-rear direction of the vehicle body frame, the vehicle body cover is likely to interfere with the right and left front wheels. It is preferable to secure a large distance between a lower edge of the front portion of the vehicle body cover and each of the respective upper ends of the right and left front wheels so as to prevent interference between the vehicle body cover and the right and left front wheels.

As a result of evaluations of various vehicle body covers having different shapes, it has been discovered that the deterioration of the traveling performance is caused by wind pressure received during the traveling of the vehicle by at least one of a portion of the power unit, a portion of the vehicle body cover, a portion of the vehicle body frame, a portion of the steering mechanism, and a portion of the link mechanism located between the right lower edge of the front portion of the link cover portion and the upper edge of the right front wheel and between the left lower edge of the front portion of the link cover portion and the upper edge of the left front wheel as seen from the front in the front-rear direction of the vehicle body frame when the vehicle body frame is in the upright state; located above the center in the up-down direction of the vehicle body frame between the upper end of the right front wheel and the lower edge of the link mechanism or the steering mechanism directly above the right front wheel; and is located above the center in the up-down direction of the vehicle body frame between the upper end of the left front wheel and the lower edge of the link mechanism or the steering mechanism directly above the left front wheel. Further, it has been discovered that the reduction of the wind pressure contributes to the maintenance of the traveling performance of the vehicle.

In addition, it has been discovered that the vehicle body cover not only covers at least a portion of the link mechanism but also reduces wind pressure. Accordingly, the vehicle body cover is divided in accordance with the functions thereof into a portion (the link cover portion) that covers at least a portion of the link mechanism and a portion (the right aerodynamic portion and the left aerodynamic portion) that contributes to the wind pressure reduction. Then, suitable positions and shapes for each of the individual functional portions was considered.

In the vehicle including the leanable vehicle body frame and the link mechanism, the right front wheel and the left front wheel each have a wide movable range. Consequently, there may be a large change in the positions and sizes of the areas between the link mechanism and the right front wheel and between the link mechanism and the left front wheel, in accordance with the operation of the link mechanism. When the portion defining and serving as the aerodynamic portion is not displaced relative to the vehicle body frame, the aerodynamic portion covers the entire areas that change their position to deflect air flow coming into these areas. This enlarges the portion that defines the aerodynamic portions.

The link cover portion is not displaced relative to the vehicle body frame and covers at least a portion of the link mechanism. In the link cover portion, at least a portion of the function to contribute to the wind pressure reduction is divided into the right aerodynamic portion and the left aerodynamic portion. Thus, the degree of freedom in the design of the link cover portion is enhanced. In addition, by separating at least a portion of the functions that the link cover portion provides, the link cover portion is smaller. Specifically, the link cover portion includes the front portion that is disposed forward of the respective rear ends of the right and left front wheels in the front-rear direction of the vehicle body frame. As seen from the front in the front-rear direction of the vehicle body frame when the vehicle body frame is in the upright state, the right lower edge of the front portion that is directly above the right front wheel is disposed above the lower end of the link mechanism or the steering mechanism in the up-down direction of the vehicle body frame, and the left lower edge of the front portion that is directly above the left front wheel is disposed above the lower end of the link mechanism or the steering mechanism in the up-down direction of the vehicle body frame. More specifically, the vehicle body cover is made smaller in size in relation to the left-right direction of the vehicle body frame by narrowing the space between the right front wheel and the left front wheel. In addition, the vehicle body cover is made smaller in size in relation to the front-rear direction of the vehicle body frame.

A relatively large space is provided between the right lower edge of the front portion of the link cover portion and the upper edge of the right front wheel, and between the left lower edge of the front portion of the link cover portion and the upper edge of the left front wheel by making the link cover portion smaller in size in relation to the front-rear direction of the vehicle body frame. However, the right aerodynamic portion and the left aerodynamic portion are configured so as to be displaced relative to the vehicle body frame in accordance with the operation of the link mechanism. More specifically, even though the positions and sizes of the areas between the link mechanism and the right front wheel and between the link mechanism and the left front wheel change in accordance with the operation of the link mechanism, the right aerodynamic portion and the left aerodynamic portion are caused to move according to the changes in the positions and sizes of the areas. Consequently, the right aerodynamic portion and the left aerodynamic portion are made smaller in size even though the right aerodynamic portion and the left aerodynamic portion provide the same aerodynamic function as that of the aerodynamic portion that is not displaced relative to the vehicle body frame irrespective of how the link mechanism operates. With this configuration, even though the right aerodynamic portion and the left aerodynamic portion are made smaller in size, it is possible to reduce or prevent an increase in the wind pressure that the vehicle receives.

Thus, as has been described above, the link cover portion is smaller in size by separating therefrom at least a portion of the function that contributes to the wind pressure reduction. In addition, the link cover portion is also made smaller by providing the right aerodynamic portion and the left aerodynamic portion, both of which are displaced relative to the vehicle body frame in accordance with the operation of the link mechanism, so as to contribute to the wind pressure reduction. Consequently, the front portion of the vehicle is made smaller in size while maintaining the traveling performance of the vehicle including the leanable vehicle body frame and the two front wheels.

Preferably, the vehicle is configured such that a front edge of the right aerodynamic portion is inclined such that at least one of an upper end thereof and a lower end thereof is located behind a front end thereof as seen from a side of the vehicle body frame when the vehicle body frame is in the upright state; and a front edge of the left aerodynamic portion is inclined such that at least one of an upper end thereof and a lower end thereof is located behind a front end thereof as seen from the side of the vehicle body frame when the vehicle body frame is in the upright state.

With this configuration, the direction of air is deflected in the up-down direction of the vehicle body frame, along the inclined portion of the right aerodynamic portion, that is flowing toward at least one of a portion of the power unit, a portion of the vehicle body cover, a portion of the vehicle body frame, a portion of the steering mechanism, and a portion of the link mechanism located between the right lower edge of the front portion of the link cover portion and the upper edge of the right front wheel as seen from the front in the front-rear direction of the vehicle body frame when the vehicle body frame is in the upright state; and is located above the center in the up-down direction of the vehicle body frame between the upper end of the right front wheel and the lower edge of the link mechanism or the steering mechanism directly above the right front wheel. For this reason, it is possible to further reduce the wind pressure received during the traveling of the vehicle by at least one of a portion of the power unit, a portion of the vehicle body cover, a portion of the vehicle body frame, a portion of the steering mechanism, and a portion of the link mechanism located between the right lower edge of the front portion of the link cover portion and the upper edge of the right front wheel as seen from the front in the front-rear direction of the vehicle body frame when the vehicle body frame is in the upright state; and is located above the center in the up-down direction of the vehicle body frame between the upper end of the right front wheel and the lower edge of the link mechanism or the steering mechanism directly above the right front wheel. Therefore, the right aerodynamic portion having the function to contribute to the wind pressure reduction is made even smaller in size.

In addition, the direction of air is deflected in the up-down direction of the vehicle body frame, along the inclined portion of the left aerodynamic portion, that is flowing toward at least one of a portion of the power unit, a portion of the vehicle body cover, a portion of the vehicle body frame, a portion of the steering mechanism, and a portion of the link mechanism located between the left lower edge of the front portion of the link cover portion and the upper edge of the left front wheel as seen from the front in the front-rear direction of the vehicle body frame when the vehicle body frame is in the upright state; and is located above the center in the up-down direction of the vehicle body frame between the upper end of the left front wheel and the lower edge of the link mechanism or the steering mechanism directly above the left front wheel. For this reason, it is possible to further reduce the wind pressure received during the traveling of the vehicle by at least one of a portion of the power unit, a portion of the vehicle body cover, a portion of the vehicle body frame, the steering mechanism, and a portion of the link mechanism located between the left lower edge of the front portion of the link cover portion and the upper edge of the left front wheel as seen from the front in the front-rear direction of the vehicle body frame when the vehicle body frame is in the upright state; and is located above the center in the up-down direction of the vehicle body frame between the upper end of the left front wheel and the lower edge of the link mechanism or the steering mechanism directly above the left front wheel. Therefore, the left aerodynamic portion having the function to contribute to the wind pressure reduction is made even smaller in size.

Consequently, the front portion of the vehicle is made even smaller in size while maintaining the traveling performance of the vehicle including the leanable vehicle body frame and the two front wheels.

Preferably, the vehicle is configured such that a front edge of the right aerodynamic portion is inclined such that at least one of a right end thereof and a left end thereof is located behind a front end thereof as seen from above the vehicle body frame when the vehicle body frame is in the upright state; and a front edge of the left aerodynamic portion is inclined such that at least one of a right end thereof and a left end thereof is located behind a front end thereof as seen from above the vehicle body frame when the vehicle body frame is in the upright state.

With this configuration, the direction of air is deflected in the left-right direction of the vehicle body frame along the inclined portion of the right aerodynamic portion that is flowing toward at least one of a portion of the power unit, a portion of the vehicle body cover, the vehicle body frame, a portion of the steering mechanism, and a portion of the link mechanism located between the right lower edge of the front portion of the link cover portion and the upper edge of the right front wheel as seen from the front in the front-rear direction of the vehicle body frame when the vehicle body frame is in the upright state; and is located above the center in the up-down direction of the vehicle body frame between the upper end of the right front wheel and the lower edge of the link mechanism or the steering mechanism directly above the right front wheel. For this reason, it is possible to further reduce the wind pressure received during the traveling of the vehicle by at least one of a portion of the power unit, a portion of the vehicle body cover, a portion of the vehicle body frame, a portion of the steering mechanism, and a portion of the link mechanism located between the right lower edge of the front portion of the link cover portion and the upper edge of the right front wheel as seen from the front in the front-rear direction of the vehicle body frame when the vehicle body frame is in the upright state; and is located above the center in the up-down direction of the vehicle body frame between the upper end of the right front wheel and the lower edge of the link mechanism or the steering mechanism directly above the right front wheel. Therefore, the right aerodynamic portion having the function to contribute to the wind pressure reduction is made even smaller in size.

In addition, the direction of air is deflected in the left-right direction of the vehicle body frame, along the inclined portion of the left aerodynamic portion, that is flowing toward at least one of a portion of the power unit, a portion of the vehicle body cover, a portion of the vehicle body frame, a portion of the steering mechanism, and a portion of the link mechanism located between the left lower edge of the front portion of the link cover portion and the upper edge of the left front wheel as seen from the front in the front-rear direction of the vehicle body frame when the vehicle body frame is in the upright state; and is located above the center in the up-down direction of the vehicle body frame between the upper end of the left front wheel and the lower edge of the link mechanism or the steering mechanism directly above the left front wheel. For this reason, it is possible to further reduce the wind pressure received during the traveling of the vehicle by at least one of a portion of the power unit, a portion of the vehicle body cover, a portion of the vehicle body frame, a portion of the steering mechanism, and a portion of the link mechanism located between the left lower edge of the front portion of the link cover portion and the upper edge of the left front wheel as seen from the front in the front-rear direction of the vehicle body frame when the vehicle body frame is in the upright state; and is located above the center in the up-down direction of the vehicle body frame between the upper end of the left front wheel and the lower edge of the link mechanism or the steering mechanism directly above the left front wheel. Therefore, the left aerodynamic portion having the function to contribute to the wind pressure reduction is made even smaller in size.

Consequently, the front portion of the vehicle is made even smaller in size while maintaining the traveling performance of the vehicle including the leanable vehicle body frame and the two front wheels.

Preferably, the vehicle is configured such that at least a portion of the right aerodynamic portion is disposed behind a front end of the right front wheel in the front-rear direction of the vehicle body frame when the vehicle body frame is in the upright state; and at least a portion of the left aerodynamic portion is disposed behind a front end of the left front wheel in the front-rear direction of the vehicle body frame when the vehicle body frame is in the upright state.

With this arrangement, it is possible to further reduce the wind pressure received during the traveling of the vehicle by at least one of a portion of the power unit, a portion of the vehicle body cover, a portion of the vehicle body frame, the steering mechanism, and a portion of the link mechanism located between the right lower edge of the front portion of the link cover portion and the upper edge of the right front wheel as seen from the front in the front-rear direction of the vehicle body frame when the vehicle body frame is in the upright state; and is located above the center in the up-down direction of the vehicle body frame between the upper end of the right front wheel and the lower edge of the link mechanism or the steering mechanism directly above the right front wheel. Furthermore, it is possible to bring the right front wheel close to the right aerodynamic portion while preventing interference between the right front wheel that is displaced and the right aerodynamic portion. For this reason, the vehicle including the right aerodynamic portion with the function to contribute to the wind pressure reduction is made smaller in size.

In addition, it is possible to further reduce the wind pressure received during the traveling of the vehicle by at least one of a portion of the power unit, a portion of the vehicle body cover, a portion of the vehicle body frame, a portion of the steering mechanism, and a portion of the link mechanism located between the left lower edge of the front portion of the link cover portion and the upper edge of the left front wheel as seen from the front in the front-rear direction of the vehicle body frame when the vehicle body frame is in the upright state; and is located above the center in the up-down direction of the vehicle body frame between the upper end of the left front wheel and the lower edge of the link mechanism or the steering mechanism directly above the left front wheel. Furthermore, it is possible to bring the left front wheel close to the left aerodynamic portion while preventing interference between the left front wheel that is displaced and the left aerodynamic portion. For this reason, the vehicle including the left aerodynamic portion with the function to contribute to the wind pressure reduction is made smaller in size.

Consequently, the front portion of the vehicle is made even smaller in size while maintaining the traveling performance of the vehicle including the leanable vehicle body frame and the two front wheels.

Preferably, the vehicle is configured such that at least a portion of the right aerodynamic portion is disposed forward of at least one of a portion of the link mechanism, a portion of the steering mechanism, a portion of the vehicle body frame, a portion of the vehicle body cover, and a portion of the power unit, any one of which is located between the upper edge of the right front wheel and the right lower edge of the front portion of the link cover portion, and is located above the center in the up-down direction of the vehicle body frame between an upper end of the right front wheel and a lower edge of the link mechanism or the steering mechanism directly above the right front wheel, as seen from the front in the front-rear direction of the vehicle body frame when the vehicle body frame is in the upright state; and at least a portion of the left aerodynamic portion is disposed forward of at least one of a portion of the link mechanism, a portion of the steering mechanism, a portion of the vehicle body frame, a portion of the vehicle body cover, and a portion of the power unit, any one of which is located between the upper edge of the left front wheel and the left lower edge of the front portion of the link cover portion, and is located above the center in the up-down direction of the vehicle body frame between an upper end of the left front wheel and a lower edge of the link mechanism or the steering mechanism directly above the left front wheel, as seen from the front in the front-rear direction of the vehicle body frame when the vehicle body frame is in the upright state.

With this arrangement, it is possible to further reduce the wind pressure received during the traveling of the vehicle by at least one of a portion of the power unit, a portion of the vehicle body cover, a portion of the vehicle body frame, a portion of the steering mechanism, and a portion of the link mechanism located between the right lower edge of the front portion of the link cover portion and the upper edge of the right front wheel as seen from the front in the front-rear direction of the vehicle body frame when the vehicle body frame is in the upright state; and is located above the center in the up-down direction of the vehicle body frame between the upper end of the right front wheel and the lower edge of the link mechanism or the steering mechanism directly above the right front wheel. Furthermore, it is possible to bring the right front wheel close to the right aerodynamic portion while preventing interference between the right front wheel that is displaced and the right aerodynamic portion. For this reason, the vehicle including the right aerodynamic portion with the function to contribute to the wind pressure reduction is made smaller in size.

In addition, it is possible to further reduce the wind pressure received during the traveling of the vehicle by at least one of a portion of the power unit, a portion of the vehicle body cover, a portion of the vehicle body frame, a portion of the steering mechanism, and a portion of the link mechanism located between the left lower edge of the front portion of the link cover portion and the upper edge of the left front wheel as seen from the front in the front-rear direction of the vehicle body frame when the vehicle body frame is in the upright state; and is located above the center in the up-down direction of the vehicle body frame between the upper end of the left front wheel and the lower edge of the link mechanism or the steering mechanism directly above the left front wheel. Furthermore, it is possible to bring the left front wheel close to the left aerodynamic portion while preventing interference between the left front wheel that is displaced and the left aerodynamic portion. For this reason, the vehicle including the left aerodynamic portion with the function to contribute to the wind pressure reduction is made smaller in size.

Consequently, the front portion of the vehicle is made even smaller in size while maintaining the traveling performance of the vehicle including the leanable vehicle body frame and the two front wheels.

Preferably, the vehicle is configured such that the steering mechanism includes a right shock absorber supporting the right front wheel at a lower portion thereof, and configured to buffer displacement of the right front wheel in the up-down direction of the vehicle body frame relative to an upper portion thereof; a left shock absorber supporting the left front wheel at a lower portion thereof, and configured to buffer displacement of the left front wheel in the up-down direction of the vehicle body frame relative to an upper portion thereof; a right bracket to which the upper portion of the right shock absorber is fixed; a left bracket to which the upper portion of the left shock absorber is fixed; a steering shaft to which the handlebar is attached; and a transmission mechanism configured to transmit a turning motion of steering shaft to the right bracket and the left bracket; the right aerodynamic portion is fixed to any one of the link mechanism, the right shock absorber, the right bracket, and the transmission mechanism; and the left aerodynamic portion is fixed to any one of the link mechanism, the left shock absorber, the left bracket, and the transmission mechanism.

With this configuration, since the right and left aerodynamic portions are moved directly in accordance with the operation of the link mechanism, it is easy to make the right and left aerodynamic portions smaller in size. Consequently, the front portion of the vehicle is made even smaller in size while maintaining the traveling performance of the vehicle including the leanable vehicle body frame and the two front wheels.

Preferably, the vehicle is configured such that the right aerodynamic portion is fixed to the upper portion of the right shock absorber; and the left aerodynamic portion is fixed to the upper portion of the left shock absorber.

With this configuration, even when the right front wheel is displaced in the up-down direction of the vehicle body frame due to the operation of the right shock absorber, the right aerodynamic portion is not displaced in the same direction in accordance with the displacement of the right front wheel. Accordingly, it is possible to further reduce the wind pressure received during the traveling of the vehicle by at least one of a portion of the power unit, a portion of the vehicle body cover, a portion of the vehicle body frame, a portion of the steering mechanism, and a portion of the link mechanism located between the right lower edge of the front portion of the link cover portion and the upper edge of the right front wheel as seen from the front in the front-rear direction of the vehicle body frame when the vehicle body frame is in the upright state; and is located above the center in the up-down direction of the vehicle body frame between the upper end of the right front wheel and the lower edge of the link mechanism or the steering mechanism directly above the right front wheel. Therefore, the right aerodynamic portion having the function to contribute to the wind pressure reduction is made even smaller in size.

In addition, even when the left front wheel is displaced in the up-down direction of the vehicle body frame due to the operation of the left shock absorber, the left aerodynamic portion is not displaced in the same direction in accordance with the displacement of the left front wheel. Accordingly, it is possible to further reduce the wind pressure received during the traveling of the vehicle by at least one of a portion of the power unit, a portion of the vehicle body cover, a portion of the vehicle body frame, a portion of the steering mechanism, and a portion of the link mechanism located between the left lower edge of the front portion of the link cover portion and the upper edge of the left front wheel as seen from the front in the front-rear direction of the vehicle body frame when the vehicle body frame is in the upright state; and is located above the center in the up-down direction of the vehicle body frame between the upper end of the left front wheel and the lower edge of the link mechanism or the steering mechanism directly above the left front wheel. Therefore, the left aerodynamic portion having the function to contribute to the wind pressure reduction is made even smaller in size.

Consequently, the front portion of the vehicle is made even smaller in size while maintaining the traveling performance of the vehicle including the leanable vehicle body frame and the two front wheels.

Preferably, the vehicle may be configured such that at least a portion of the right aerodynamic portion is disposed above the center in the up-down direction of the vehicle body frame between the upper end of the right front wheel and the lower edge of the link mechanism or the steering mechanism directly above the right front wheel, and is disposed below the right lower edge of the front portion of the link cover portion as seen from the front in the front-rear direction of the vehicle body frame when the vehicle body frame is in the upright state; and at least a portion of the left aerodynamic portion is disposed above the center in the up-down direction of the vehicle body frame between the upper end of the left front wheel and the lower edge of the link mechanism or the steering mechanism directly above the left front wheel, and is disposed below the left lower edge of the front portion of the link cover portion as seen from the front in the front-rear direction of the vehicle body frame when the vehicle body frame is in the upright state.

With this arrangement, it is possible to further reduce the wind pressure received during the traveling of the vehicle by at least one of a portion of the power unit, a portion of the vehicle body cover, a portion of the vehicle body frame, a portion of the steering mechanism, and a portion of the link mechanism located between the right lower edge of the front portion of the link cover portion and the upper edge of the right front wheel as seen from the front in the front-rear direction of the vehicle body frame when the vehicle body frame is in the upright state; and is located above the center in the up-down direction of the vehicle body frame between the upper end of the right front wheel and the lower edge of the link mechanism or the steering mechanism directly above the right front wheel. Therefore, the right aerodynamic portion having the function to contribute to the wind pressure reduction is made even smaller in size.

In addition, it is possible to further reduce the wind pressure received during the traveling of the vehicle by at least one of a portion of the power unit, a portion of the vehicle body cover, a portion of the vehicle body frame, a portion of the steering mechanism, and a portion of the link mechanism located between the left lower edge of the front portion of the link cover portion and the upper edge of the left front wheel as seen from the front in the front-rear direction of the vehicle body frame when the vehicle body frame is in the upright state; and is located above the center in the up-down direction of the vehicle body frame between the upper end of the left front wheel and the lower edge of the link mechanism or the steering mechanism directly above the left front wheel. Therefore, the left aerodynamic portion having the function to contribute to the wind pressure reduction is made even smaller in size.

Consequently, the front portion of the vehicle is made even smaller in size while maintaining the traveling performance of the vehicle including the leanable vehicle body frame and the two front wheels.

Preferably, the vehicle may be configured such that at least a portion of the right aerodynamic portion is disposed below the center in the up-down direction of the vehicle body frame between the upper end of the right front wheel and the lower edge of the link mechanism or the steering mechanism directly above the right front wheel, and is disposed above an upper edge of the right front wheel as seen from the front in the front-rear direction of the vehicle body frame when the vehicle body frame is in the upright state; and at least a portion of the left aerodynamic portion is disposed below the center in the up-down direction of the vehicle body frame between the upper end of the left front wheel and the lower edge of the link mechanism or the steering mechanism directly above the left front wheel, and is disposed above an upper edge of the left front wheel as seen from the front in the front-rear direction of the vehicle body frame when the vehicle body frame is in the upright state.

According to the arrangement described above, at least a portion of the right aerodynamic portion is disposed below the center in the up-down direction of the vehicle body frame between the upper end of the right front wheel and the lower edge of the link mechanism or the steering mechanism that is directly above the right front wheel, and is disposed above the upper edge of the right front wheel as seen from the front in the front-rear direction of the vehicle body frame when the vehicle body frame is in the upright state. Since the right aerodynamic portion that is displaced relative to the vehicle body frame is disposed both above and below the center, the function contributing to the wind pressure reduction is ensured even though the right aerodynamic portion is small. Here, the portion below the center is spaced farther apart from the link cover portion that is not displaced relative to the vehicle body frame than the portion above the center. Accordingly, even though a portion of the right aerodynamic portion is disposed below the center, interference of the right aerodynamic portion with the link cover portion is avoided.

In addition, at least a portion of the left aerodynamic portion is disposed below the center in the up-down direction of the vehicle body frame between the upper end of the left front wheel and the lower edge of the link mechanism or the steering mechanism that is located above the upper side of the left front wheel, and is disposed above the upper edge of the left front wheel as seen from the front in the front-rear direction of the vehicle body frame when the vehicle body frame is in the upright state. Since the left aerodynamic portion that is displaced relative to the vehicle body frame is disposed both above and below the center, the function contributing to the wind pressure reduction is ensured even though the left aerodynamic portion is small. Here, the portion below the center is spaced farther apart from the link cover portion that is not displaced relative to the vehicle body frame than the portion above the center. Accordingly, even though portion of the left aerodynamic portion is disposed below the center, interference of the right aerodynamic portion with the link cover portion is avoided.

Consequently, the front portion of the vehicle is made even smaller in size while maintaining the traveling performance of the vehicle including the leanable vehicle body frame and the two front wheels.

Preferably, the vehicle may be configured such that the right aerodynamic portion covers at least a portion of an upper surface of the right front wheel, and is configured to prevent objects including muddy water kicked up by the right front wheel from scattering; and the left aerodynamic portion covers at least a portion of an upper surface of the left front wheel, and is configured to prevent objects including muddy water kicked up by the left front wheel from scattering.

With this configuration, it is possible to further reduce the wind pressure received during the traveling of the vehicle by at least one of a portion of the power unit, a portion of the vehicle body cover, a portion of the vehicle body frame, a portion of the steering mechanism, a portion of the link mechanism located between the right lower edge of the front portion of the link cover portion and the upper edge of the right front wheel as seen from the front in the front-rear direction of the vehicle body frame when the vehicle body frame is in the upright state; and is located above the center in the up-down direction of the vehicle body frame between the upper end of the right front wheel and the lower edge of the link mechanism or the steering mechanism directly above the right front wheel. Therefore, the right aerodynamic portion having the function to contribute to the wind pressure reduction is made even smaller in size. In addition, since a portion of the fender function for the right front wheel is assigned to the right aerodynamic portion, it is possible to enhance the degree of freedom in the design of the right aerodynamic portion and the right front fender. Moreover, since a portion of the function of the right aerodynamic portion is assigned to the right front fender of the right front wheel, it is possible to enhance the degree of freedom in the design of the right aerodynamic portion and the right front fender. Accordingly, compared with a case where individual elements are prepared for each of the functions, the overall configuration is made smaller while ensuring the same functions.

In addition, it is possible to further reduce the wind pressure received during the traveling of the vehicle by at least one of a portion of the power unit, a portion of the vehicle body cover, a portion of the vehicle body frame, a portion of the steering mechanism, and a portion of the link mechanism located between the left lower edge of the front portion of the link cover portion and the upper edge of the left front wheel as seen from the front in the front-rear direction of the vehicle body frame when the vehicle body frame is in the upright state; and is located above the center in the up-down direction of the vehicle body frame between the upper end of the left front wheel and the lower edge of the link mechanism or the steering mechanism directly above the left front wheel. Therefore, the left aerodynamic portion having the function to contribute to the wind pressure reduction is made even smaller in size. In addition, since a portion of the fender function for the left front wheel is assigned to the left aerodynamic portion, it is possible to enhance the degree of freedom in the design of the left aerodynamic portion and the left front fender. Moreover, since a portion of the function of the left aerodynamic portion is assigned to the left front fender of the left front wheel, it is possible to enhance the degree of freedom in the design of the left aerodynamic portion and the left front fender. Accordingly, compared with a case where individual elements are prepared for each of the functions, the overall configuration is made smaller while ensuring the same functions.

Consequently, the front portion of the vehicle is made even smaller in size while maintaining the traveling performance of the vehicle including the leanable vehicle body frame and the two front wheels.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 9A to 9C are views showing a modified example of the vehicle shown in FIG. 1.

DETAILED DESCRIPTION OF THE PREFERRED EMBODIMENTS

Figure 1:
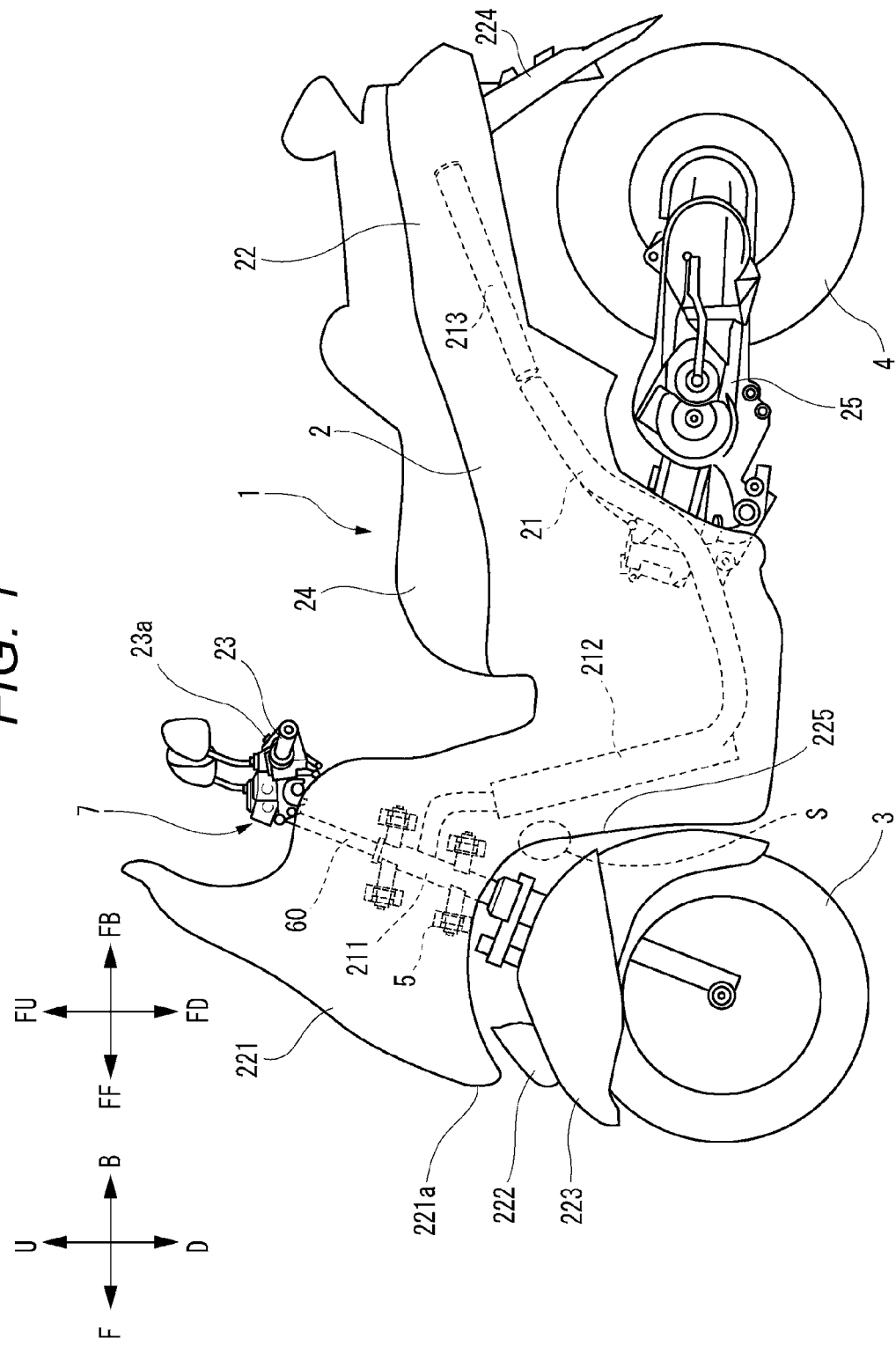
FIG. 1 is a left side view wherein an entire vehicle according to a preferred embodiment of the present invention is seen from a left side thereof.

In vehicles including the leanable vehicle body frame and the link mechanism, the right front wheel and the left front wheel each have a wide movable range. This is because the right front wheel and the left front wheel are turned when steered, are displaced in the up-down direction of the vehicle body frame as the right shock absorber and the left shock absorber extend or contract, and are displaced in the up-down direction of the vehicle body frame in accordance with the operation of the link mechanism. A vehicle body cover, that is not displaced relative to the vehicle body frame, covers a long distance with respect to the right front wheel and the left front wheel, each of which has such a wide movable range, so as to avoid interference therewith.

When a front end of the vehicle body cover is disposed behind the respective front ends of the right and left front wheels arranged within a narrow space so as to decrease the size of the vehicle body cover in the front-rear direction of the vehicle body frame, the vehicle body cover is likely to interfere with the right and left front wheels. It is preferable to secure a large distance between a lower edge of the front portion of the vehicle body cover and each of the respective upper ends of the right and left front wheels so as to prevent interference between the vehicle body cover and the right and left front wheels.

Then, it was considered how to reduce wind pressure that the vehicle receives when the vehicle is in the upright state and the front end of the vehicle body cover is disposed behind the respective front ends of the right front wheel and the left front wheel and above the respective top ends of the right front wheel and the left front wheel located within a narrowed space. Specifically, a structure was considered including an aerodynamic portion extending downward and rearward from the front end portion of the vehicle body cover. However, since the aerodynamic portion has to avoid interference with the fright front wheel and the left front wheel, the dimensions of the aerodynamic portion are limited in relation to the left-right direction and the up-down direction of the vehicle body frame. Thus, sufficient wind pressure reduction has been unable to be obtained.

When the steering ranges of the right front wheel and the left front wheel are decreased, the movable ranges of the right front wheel and the left front wheel are accordingly decreased such that the dimension of the aerodynamic portion is increased. However, when the steering ranges for the right and left front wheels are decreased, the minimum turning radius of the vehicle decreases. That is, it has been discovered that, in the structure wherein the aerodynamic portion is extended downward and rearward from the front end portion of the vehicle body cover with a dimension decreased in the front-rear direction of the vehicle body frame, it is impossible to obtain a sufficient wind pressure reduction while ensuring sufficient steering ranges of the right front wheel and the left front wheel.

Accordingly, the vehicle body cover is divided in accordance with the functions thereof into the portion (the link cover portion) that covers at least a portion of the link mechanism and the portion (the aerodynamic portion) that contributes to the wind pressure reduction. Then suitable positions and shapes for each of the individual functional portions was considered.

In the vehicle including the leanable vehicle body frame and the link mechanism, the right front wheel and the left front wheel each have a wide movable range. Consequently, there may be a large change in the positions and sizes of the areas between the link mechanism and the right front wheel and between the link mechanism and the left front wheel in accordance with the operation of the link mechanism. When the configuration in which the portion defining and serving as the aerodynamic portion is not displaced relative to the vehicle body frame, the aerodynamic portion is configured to cover the entire areas that change to deflect air flow coming into the areas. This enlarges the portion that defines the aerodynamic portions.

The link cover portion is not displaced relative to the vehicle body frame and covers at least a portion of the link mechanism. In the link cover portion, at least a portion of the function that contributes to the wind pressure reduction is divided into the aerodynamic portion. Thus, the degree of freedom in design of the link cover portion is enhanced. In addition, by separating portions of the functions that the link cover portion performs, the link cover portion is made smaller. Specifically, the link cover portion includes the front portion that is disposed forward of the respective rear ends of the right and left front wheels in the front-rear direction of the vehicle body frame. As seen from the front in the front-rear direction of the vehicle body frame when the vehicle body frame is in the upright state, the right lower edge of the front portion that is directly above the right front wheel is disposed above the lower end of the link mechanism or the steering mechanism in the up-down direction of the vehicle body frame, and the left lower edge of the front portion that is directly above the left front wheel is disposed above the lower end of the link mechanism or the steering mechanism in the up-down direction of the vehicle body frame. More specifically, the vehicle body cover is made smaller in size in relation to the left-right direction of the vehicle body frame by narrowing the space between the right front wheel and the left front wheel. In addition, the vehicle body cover is made smaller in size in relation to the front-rear direction of the vehicle body frame.

A relatively large space is formed between the right lower edge of the front portion of the link cover portion and the right front wheel and between the left lower edge of the front portion of the link cover portion and the left front wheel by making the link cover portion smaller in size in relation to the front-rear direction of the vehicle body frame. However, the right aerodynamic portion and the left aerodynamic portion are configured so as to be displaced relative to the vehicle body frame in accordance with the operation of the link mechanism. More specifically, even though the positions and sizes of the areas between the link mechanism and the right front wheel and between the link mechanism and the left front wheel change in accordance with the operation of the link mechanism, the right aerodynamic portion and the left aerodynamic portion are caused to move according to the changes in the positions and sizes of the areas. Consequently, the right aerodynamic portion and the left aerodynamic portion are made smaller in size even though the right aerodynamic portion and the left aerodynamic portion provide the same aerodynamic function as that of the aerodynamic portion that is not displaced relative to the vehicle body frame irrespective of how the link mechanism operates. With this configuration, even though the right aerodynamic portion and the left aerodynamic portion are made smaller in size, it is possible to reduce or prevent an increase in the wind pressure that the vehicle receives.

Thus, as has been described above, the link cover portion is made smaller in size by separating at least a portion of the function that contributes to the wind pressure reduction. In addition, the right aerodynamic portion and the left aerodynamic portion which include the function of contributing to the wind pressure reduction is made smaller by configuring the right aerodynamic portion and the left aerodynamic portion to be displaced relative to the vehicle body frame in accordance with the operation of the link mechanism. Consequently, the front portion of the vehicle is made smaller in size while maintaining the traveling performance of the vehicle including the leanable vehicle body frame and the two front wheels.

Referring to the accompanying drawings, preferred embodiments of the present invention will be described below in detail.

In the accompanying drawings, an arrow F denotes a frontward direction of a vehicle. An arrow B denotes a rearward direction of the vehicle. An arrow U denotes an upward direction of the vehicle. An arrow D denotes a downward direction of the vehicle. An arrow R denotes a rightward direction of the vehicle. An arrow L denotes a leftward direction of the vehicle.

A vehicle turns by causing a vehicle body frame to lean leftward or rightward of the vehicle in relation to a vertical direction. Then, in addition to the directions based on the vehicle, directions based on the vehicle body frame are determined. In the accompanying drawings, an arrow FF denotes a frontward direction of the vehicle body frame. An arrow FB denotes a rearward direction of the vehicle body frame. An arrow FU denotes an upward direction of the vehicle body frame. An arrow FD denotes a downward direction of the vehicle body frame. An arrow FR denotes a rightward direction of the vehicle body frame. An arrow FL denotes a leftward direction of the vehicle body frame.

In this specification, a "front-rear direction of the vehicle body frame," a "left-right direction of the vehicle body frame," and an "up-down direction of the vehicle body frame" indicate, respectively, a front-rear direction, a left-right direction, and an up-down direction of the vehicle body frame as seen from a rider who drives the vehicle. "Sideways of the vehicle body frame" indicates right or left of the vehicle body frame.

In this specification, an expression "extending in the front-rear direction of the vehicle body frame" includes a direction that is inclined in relation to the front-rear direction of the vehicle body frame and indicates that it extends in a direction closer to the front-rear direction of the vehicle body frame than the left-right direction and up-down direction of the vehicle body frame.

In this specification, an expression "extending in the left-right direction of the vehicle body frame" includes a direction that is inclined in relation to the left-right direction of the vehicle body frame and indicates that it extends in a direction closer to the left-right direction of the vehicle body frame than the front-rear direction and up-down direction of the vehicle body frame.

In this specification, an expression "extending in the up-down direction of the vehicle body frame" includes a direction that is inclined in relation to the up-down direction of the vehicle body frame and indicates that it extends in a direction closer to the up-down direction of the vehicle body frame than the left-right direction and front-rear direction of the vehicle body frame.

In this specification, an "upright state of the vehicle body frame indicates a state that the vehicle is not steered at all, and a state that the up-down direction of the vehicle body frame coincides with the vertical direction. In this state, a direction based on the vehicle coincides with a direction based on the vehicle body frame. When the vehicle is turned by causing the vehicle body frame to lean leftward or rightward in relation to the vertical direction, the left-right direction of the vehicle does not coincide with the left-right direction of the vehicle body frame. In addition, the up-down direction of the vehicle does not coincide with the up-down direction of the vehicle body frame, either. However, the front-rear direction of the vehicle coincides with the front-rear direction of the vehicle body frame.

Referring to FIGS. 1 to 8 and FIGS. 13A to 19, a vehicle 1 according to a preferred embodiment of the present invention will be described. The vehicle 1 is a vehicle including a leanable vehicle body frame and two front wheels.

FIG. 1 is a left side view wherein the entire vehicle 1 is seen from the left thereof. The vehicle 1 includes a vehicle main body 2, a pair of left and right front wheels 3, a rear wheel 4, a link mechanism 5, and a steering mechanism 7.

The vehicle main body 2 includes a vehicle body frame 21, a vehicle body cover 22, a seat 24, and a power unit 25. In FIG. 1, the vehicle body frame 21 is in an upright state. The following description referring to FIG. 1 will be based on the premise that the vehicle body frame 21 is in the upright state.

The vehicle body frame 21 includes a head pipe 211, a down frame 212, and a rear frame 213. In FIG. 1, portions of the vehicle body frame 21 that are concealed by the vehicle body cover 22 are shown by dashed lines. The vehicle body frame 21 supports the seat 24 and the power unit 25. The power unit 25 supports the rear wheel 4. The power unit 25 includes drive source devices such as an engine, an electric motor, a battery and the like and other devices such as a transmission and the like.

The head pipe 211 is disposed at a front portion of the vehicle 1. An upper portion of the head pipe 211 is disposed behind a lower portion of the head pipe 211 as seen from the side of the vehicle body frame 21.

The down frame 212 is connected to the head pipe 211. The down frame 212 is disposed directly behind the head pipe 211. The down frame 212 extends in the up-down direction of the vehicle body frame 21.

The rear frame 213 is disposed directly behind the down frame 212. The rear frame 213 extends in the front-rear direction of the vehicle body frame 21. The rear frame 213 supports the seat 24 and the power unit 25.

The vehicle body cover 22 includes a front cover 221, a front spoiler 222, a pair of front fenders 223, a rear fender 224, and a leg shield 225. The vehicle body cover 22 is a vehicle-mounted portion that covers at least a portion of various elements installed in the vehicle 1 such as the pair of left and right front wheels 3, the vehicle body frame 21, the link mechanism 5 and the like.

The front cover 221 is disposed forward of the seat 24. The front cover 221 covers the link mechanism 5 and at least a portion of the steering mechanism 7. The shape and position of the front cover 221 will be described in detail below.

At least a portion of the front spoiler 222 is disposed directly below the front cover 221. The shape and position of the front spoiler 222 will be described in detail below.

At least a portion of the pair of left and right front fenders 223 are respectively disposed directly below the front cover 221. At least a portion of the pair of left and right front fenders 223 are respectively disposed directly above the pair of left and right front wheels 3. The shape and position of the pair of left and right front fenders 223 will be described in detail below.

At least a portion of the rear fender 224 is disposed directly above the rear wheel 4.

The leg shield 225 covers at least a portion of legs of a rider. The leg shield 225 is disposed behind the pair of left and right front wheels 3 and forward of the seat 24.

At least a portion of the pair of left and right front wheels 3 is disposed directly below the head pipe 211. At least a portion of the pair of left and right front wheels 3 is disposed directly below the front cover 221.

At least a portion of the rear wheel 4 is disposed below the seat 24. At least a portion of the rear wheel 4 is disposed directly below the rear fender 224.

Figure 2:
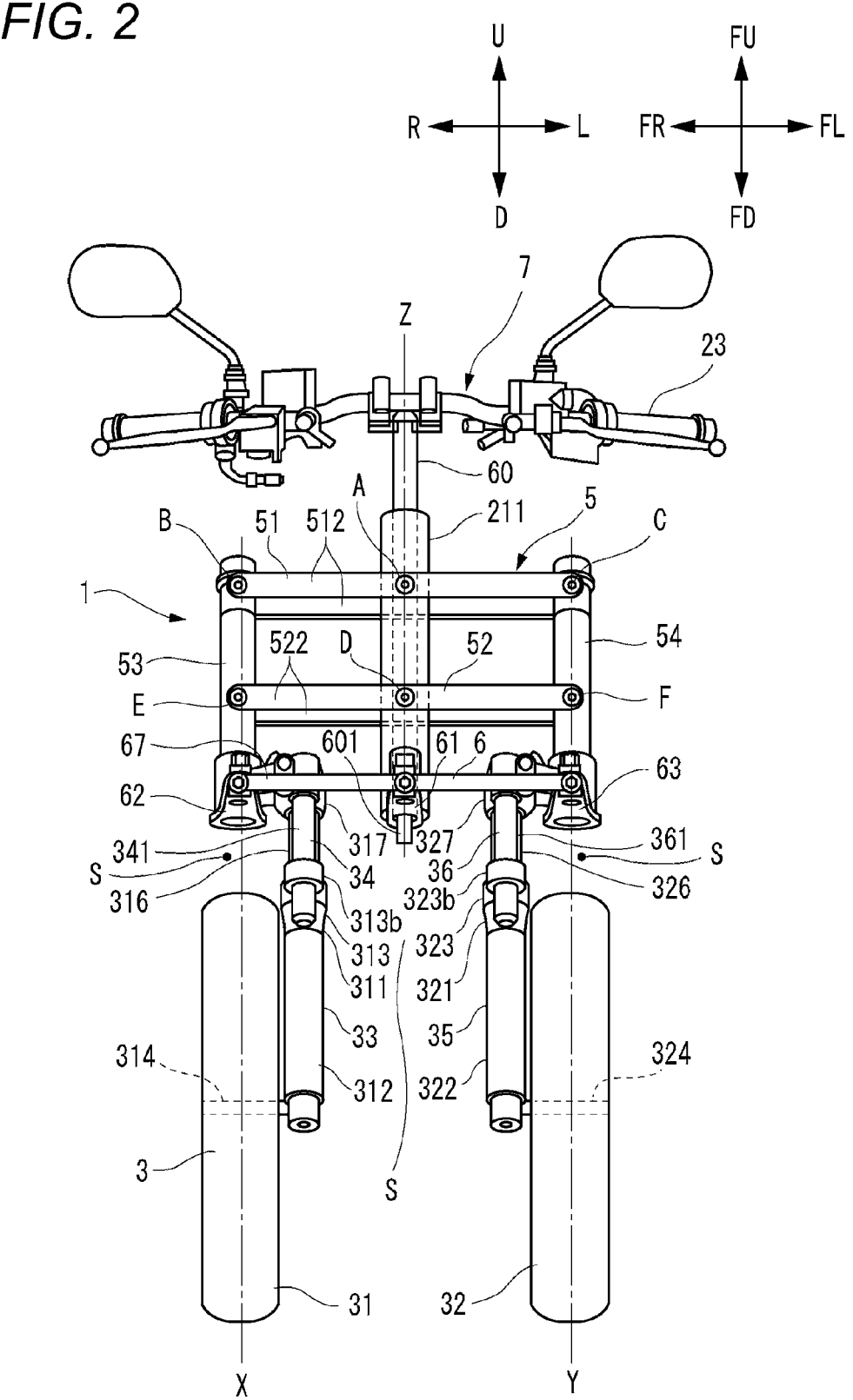
FIG. 2 is a front view wherein a portion of the vehicle shown in FIG. 1 is seen from the front.

FIG. 2 is a front view wherein the front portion of the vehicle 1 is seen from the front of the vehicle body frame 21. In FIG. 2, the vehicle body frame 21 is in the upright state. The following description referring to FIG. 2 will be based on the premise that the vehicle body frame 21 is in the upright state. FIG. 2 shows the front portion of the vehicle 1 when the front cover 221, the front spoiler 222, and the pair of left and right front fenders 223 are removed.

The pair of left and right front wheels 3 includes a right front wheel 31 and a left front wheel 32. The right front wheel 31 is disposed to the right of the head pipe 211 that defines a portion of the vehicle body frame 21. The left front wheel 32 is disposed to the left of the head pipe 211. The right front wheel 31 and the left front wheel 32 are arranged side by side in the left-right direction of the vehicle body frame 21.

The steering mechanism 7 includes a right shock absorber 33, a left shock absorber 35, a right bracket 317, and a left bracket 327.

The right shock absorber 33 includes a right outer tube 312 (one example of a lower portion of the right shock absorber). The right outer tube 312 supports the right front wheel 31. The right outer tube 312 extends in the up-down direction of the vehicle body frame 21. The right outer tube 312 includes a right support shaft 314 at a lower end portion thereof. The right front wheel 31 is supported by the right support shaft 314.

The right shock absorber 33 includes a right inner tube 316 (one example of an upper portion of the right shock absorber). The right inner tube 316 extends in the up-down direction of the vehicle body frame 21. The right inner tube 316 is disposed directly above the right outer tube 312 when the right inner tube 316 is partially inserted into the right outer tube 312. An upper portion of the right inner tube 316 is fixed to the right bracket 317.

The right shock absorber 33 is preferably a so-called telescopic shock absorber, for example. When the right inner tube 316 moves relative to the right outer tube 312 in a direction that the right outer tube 312 extends, the right shock absorber 33 extends or contracts in that direction. This enables the right shock absorber 33 to buffer a displacement of the right front wheel 31 in the up-down direction of the vehicle body frame 21 in relation to the right inner tube 316.

The left shock absorber 35 includes a left outer tube 322 (one example of a lower portion of the left shock absorber). The left outer tube 322 supports the left front wheel 32. The left outer tube 322 extends in the up-down direction of the vehicle body frame 21. The left outer tube 322 includes a left support shaft 324 at a lower end portion thereof. The left front wheel 32 is supported by the left support shaft 324.

The left shock absorber 35 includes a left inner tube 326 (one example of an upper portion of the left shock absorber). The left inner tube 326 extends in the up-down direction of the vehicle body frame 21. The left inner tube 326 is disposed directly above the left outer tube 322 when the left inner tube 326 is partially inserted into the left outer tube 322. An upper portion of the left inner tube 326 is fixed to the left bracket 327.

The left shock absorber 35 is preferably a so-called telescopic shock absorber, for example. When the left inner tube 326 moves relative to the left outer tube 322 in a direction that the left outer tube 322 extends, the left shock absorber 35 extends or contracts in that direction. This enables the left shock absorber 35 to buffer a displacement of the left front wheel 32 in the up-down direction of the vehicle body frame 21 in relation to the left inner tube 326.

Figure 3:
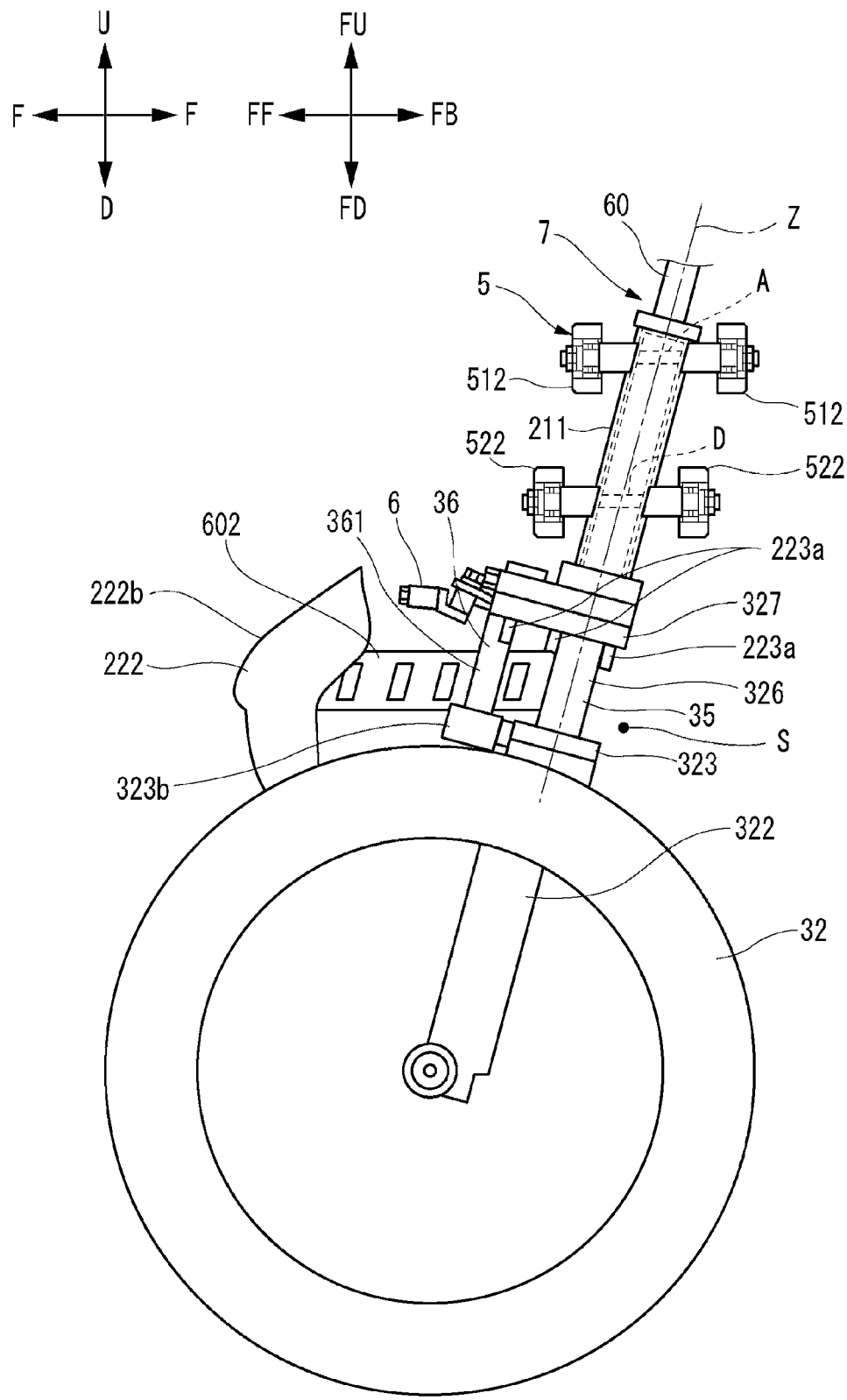
FIG. 3 is a left side view wherein a portion of the vehicle shown in FIG. 1 is seen from the left.

FIG. 3 is a left side view wherein the front portion of the vehicle 1 is seen from the left of the vehicle body frame 21. In FIG. 3, the vehicle body frame 21 is in the upright state. The following description referring to FIG. 3 will be based on the premise that the vehicle body frame 21 is in the upright state. FIG. 3 shows the front portion of the vehicle 1 when the front cover 221 and the pair of left and right front fenders 223 are removed.

The left shock absorber 35 includes a left turn prevention mechanism 36. The left turn prevention mechanism 36 includes a left turn prevention rod 361 (one example of an upper portion of the left shock absorber), a left guide 323, and the left bracket 327. The left guide 323 is fixed to an upper portion of the left outer tube 322. The left guide 323 includes a left guide tube 323b at a front portion thereof.

The left turn prevention rod 361 extends parallel or substantially parallel to the left inner tube 326. The left turn prevention rod 361 is fixed to a front portion of the left bracket 327. The left turn prevention rod 361 is disposed directly ahead of the left inner tube 326 when the left turn prevention rod 361 is partially inserted into the left guide tube 323b. This prevents the left turn prevention rod 361 from moving relative to the left inner tube 326. When the left inner tube 326 moves relative to the left outer tube 322 in a direction that the left outer tube 322 extends, the left turn prevention rod 361 also moves relative to the left guide tube 323b. On the other hand, the left outer tube 322 is prevented from turning relative to the left inner tube 326 about an axis that extends in a direction that the left shock absorber 35 extends or contracts.

As shown in FIG. 2, the right shock absorber 33 includes a right turn prevention mechanism 34. The right turn prevention mechanism 34 includes a right turn prevention rod 341 (one example of an upper portion of the right shock absorber), a right guide 313, and the right bracket 317. The right guide 313 is fixed to an upper portion of the right outer tube 312. The right guide 313 includes a right guide tube 313b at a front portion thereof.

The right turn prevention rod 341 extends parallel or substantially parallel to the right inner tube 316. The right turn prevention rod 341 is fixed to a front portion of the right bracket 317. The right turn prevention rod 341 is disposed directly ahead of the right inner tube 316 with a portion thereof inserted into the right guide tube 313b. This prevents the right turn prevention rod 341 from moving relative to the right inner tube 316. When the right inner tube 316 moves relative to the right outer tube 312 in a direction that the right outer tube 312 extends, the right turn prevention rod 341 also moves relative to the right guide tube 313b. On the other hand, the right outer tube 312 is prevented from turning relative to the right inner tube 316 about an axis that extends in a direction that the right shock absorber 33 extends or contracts.

As shown in FIG. 2, the steering mechanism 7 includes a steering force transmission mechanism 6. The steering force transmission mechanism 6 includes the handlebar 23 and a steering shaft 60. The handlebar 23 is attached to an upper portion of the steering shaft 60. A portion of the steering shaft 60 is turnably supported on the head pipe 211. A turning axis Z of the steering shaft 60 extends in the up-down direction of the vehicle body frame 21. As shown in FIG. 1, the upper portion of the steering shaft 60 is disposed behind a lower portion thereof. Consequently, as shown in FIG. 3, the turning axis Z of the steering shaft 60 is inclined in the front-rear direction of the vehicle body frame 21. The steering shaft 60 turns about the turning axis Z according to an operation of the handlebar 23 by the rider.

The steering force transmission mechanism 6 transmits a steering force generated in accordance with the operation of the handlebar 23 by the rider to the right bracket 317 and the left bracket 327. A specific configuration thereof will be described in detail below.

In the vehicle 1 according to the present preferred embodiment, the link mechanism 5 preferably uses a four parallel or substantially parallel joint link system (also referred to as a parallelogram link).

As shown in FIG. 2, the link mechanism 5 is disposed below the handlebar 23. The link mechanism 5 is disposed above the right front wheel 31 and the left front wheel 32. The link mechanism 5 includes an upper cross member 51, a lower cross member 52, a right side member 53, and a left side member 54. The link mechanism 5 is free from the turning of the steering shaft 60 about the turning axis Z in association with the operation of the handlebar 23 and does not turn relative to the vehicle body frame 21 about the turning axis Z.

The upper cross member 51 includes a pair of plate-shaped members 512. The plate-shaped members 512 are individually disposed directly ahead of and directly behind the head pipe 211. Each of the plate-shaped members 512 extends in the left-right direction of the vehicle body frame 21.

A middle portion of the upper cross member 51 is supported on the head pipe 211 by a support portion A. The upper cross member 51 is able to turn relative to the head pipe 211 about a middle upper axis that passes through the support portion A and extends in the front-rear direction of the vehicle body frame 21.

A right end portion of the upper cross member 51 is supported on the right side member 53 by a support portion B. The upper support portion 51 is able to turn relative to the right side member 53 about a right upper axis that passes through the support portion B and extends in the front-rear direction of the vehicle body frame 21.

A left end portion of the upper cross member 51 is supported on the left side member 54 by a support portion C. The upper cross member 51 is able to turn relative to the left side member 54 about a left upper axis that passes through the support portion C and extends in the front-rear direction of the vehicle body frame 21.

The lower cross member 52 includes a pair of plate-shaped members 522. The plate-shaped members 522 are individually disposed directly ahead of and directly behind the head pipe 211. Each of the plate-shaped members 522 extends in the left-right direction of the vehicle body frame 21. The second cross member 52 is disposed below the first cross member 51. A lengthwise dimension of the lower cross member 52 in the left-right direction of the vehicle body frame 21 is the same as or similar to a lengthwise dimension of the upper cross member 51 in the left-right direction of the vehicle body frame 21. The lower cross member 52 extends parallel or substantially parallel to the upper cross member 51.

A middle portion of the lower cross member 52 is supported on the head pipe 211 by a support portion D. The lower cross member 52 is able to turn about a middle lower axis that passes through the support portion D and extends in the front-rear direction of the vehicle body frame 21.

A right end portion of the lower cross member 52 is supported on the right side member 53 by a support portion E. The lower cross member 52 is able to turn about a right lower axis that passes through the support portion E and extends in the front-rear direction of the vehicle body frame 21.

A left end portion of the lower cross member 52 is supported on the left side member 54 by a support portion F. The lower cross member 52 is able to turn about a left lower axis that passes through the support portion F and extends in the front-rear direction of the vehicle body frame 21.

The middle upper axis, the middle right axis, the middle left axis, the middle lower axis, the right lower axis, and the left lower axis extend parallel or substantially parallel to each other. The middle upper axis, the middle right axis, the middle left axis, the middle lower axis, the right lower axis, and the left lower axis are disposed above the right front wheel 31 and the left front wheel 32.

Figure 4:
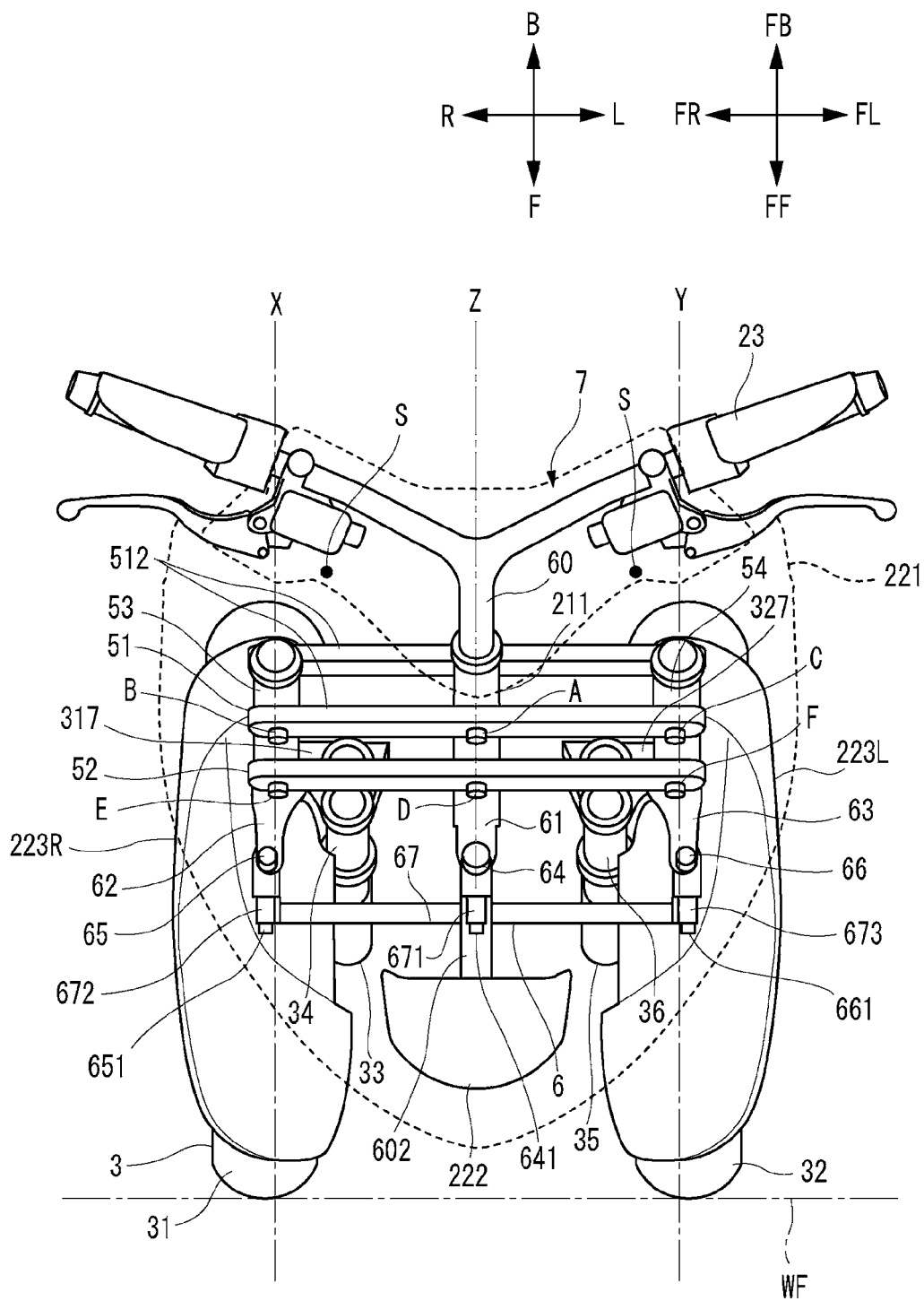
FIG. 4 is a plan view wherein a portion of the vehicle shown in FIG. 1 is seen from above.

FIG. 4 is a plan view wherein the front portion of the vehicle 1 is seen from above the vehicle body frame 21. In FIG. 4, the vehicle body frame 21 is in the upright state. The following description referring to FIG. 4 will be based on the premise that the vehicle body frame 21 is in the upright state. FIG. 4 shows a state seen through the front cover 221 which is indicated by dashed lines.

As shown in FIGS. 2 and 4, the right side member 53 is disposed directly to the right of the head pipe 211. The right side member 53 is disposed above the right front wheel 31. The right side member 53 extends in a direction that the head pipe 211 extends. The right side member 53 extends in a direction that the turning axis Z of the steering shaft 60 extends. An upper portion of the right side member 53 is disposed behind a lower portion thereof.

The lower portion of the right side member 53 is connected to the right bracket 317. The right bracket 317 is able to turn relative to the right side member 53 about a right center axis X. The right center axis X extends in the direction that the right side member 53 extends. As shown in FIG. 2, the right center axis X extends parallel or substantially parallel to the turning axis Z of the steering shaft 60 in the up-down direction of the vehicle body frame 21. As shown in FIG. 4, the right center axis X extends parallel or substantially parallel to the turning axis Z of the steering shaft 60 in the front-rear direction of the vehicle body frame 21.

As shown in FIGS. 2 and 4, the left side member 54 is disposed directly to the right of the head pipe 211. The left side member 54 is disposed above the left front wheel 32. The left side member 54 extends in the direction that the head pipe 211 extends. The left side member 54 extends in the direction that the turning axis Z of the steering shaft 60 extends. An upper portion of the left side member 54 is disposed behind a lower portion thereof.

The lower portion of the left side member 54 is connected to the left bracket 327. The left bracket 327 is able to turn relative to the left side member 54 about a left center axis Y. The left center axis Y extends in the direction that the right side member 53 extends. As shown in FIG. 2, the left center axis Y extends parallel or substantially parallel to the turning axis Z of the steering shaft 60 in the up-down direction of the vehicle body frame 21. As shown in FIG. 4, the left center axis Y extends parallel or substantially parallel to the turning axis Z of the steering shaft 60 in the front-rear direction of the vehicle body frame 21.

Thus, as has been described above, the upper cross member 51, the lower cross member 52, the right side member 53, and the left side member 54 are supported on the vehicle body frame 21 so that the upper cross member 51 and the lower cross member 52 maintain postures that are parallel or substantially parallel to each other and the right side member 53 and the left side member 54 maintain postures that are parallel or substantially parallel to each other.

As shown in FIG. 2, the steering force transmission mechanism 6 includes a middle transmission plate 61, a right transmission plate 62, a left transmission plate 63, a middle joint 64, a right joint 65, a left joint 66, and a tie rod 67, in addition to the handlebar 23 and the steering shaft 60.

The middle transmission plate 61 is connected to the lower portion of the steering shaft 60. The middle transmission plate 61 cannot turn relative to the steering shaft 60. The middle transmission plate 61 is able to turn relative to the head pipe 211 about the turning axis Z of the steering shaft 60. A front portion of the middle transmission plate 61 is tapered in the left-right direction of the vehicle body frame 21 than a rear portion thereof.

The right transmission plate 62 is disposed directly to the right of the middle transmission plate 61. The right transmission plate 62 is connected to a lower portion of the right bracket 317. The right transmission plate 62 cannot turn relative to the right bracket 317. The right transmission plate 62 is able to turn relative to the right side member 53 about the right center axis X. A front portion of the right transmission plate 62 is more tapered in the left-right direction of the vehicle body frame 21 than a rear portion thereof.

The left transmission plate 63 is disposed directly to the left of the middle transmission plate 61. The left transmission plate 63 is connected to a lower portion of the left bracket 327. The left transmission plate 63 cannot turn relative to the left bracket 327. The left transmission plate 63 is able to turn relative to the left side member 54 about the left center axis Y. A front portion of the left transmission plate 63 is more tapered in the left-right direction of the vehicle body frame 21 than a rear portion thereof.

As shown in FIG. 4, the middle joint 64 is disposed at the front portion of the middle transmission plate 61. The right joint 65 is disposed at the front portion of the right transmission plate 62. The right joint 65 is disposed directly to the right of the middle joint 64. The left joint 66 is disposed at the front portion of the left transmission plate 63. The left joint 66 is disposed directly to the left of the middle joint 64.

The tie rod 67 extends in the left-right direction of the vehicle body frame 21. The tie rod 67 includes a middle front rod 641, a right front rod 651, and a left front rod 661.

The middle front rod 641 extends in the left-right direction of the vehicle body frame 21. The middle front rod 641 is supported on the middle transmission plate 61 via the middle joint 64. The middle front rod 641 is able to turn relative to the middle transmission plate 61. A turning axis of the middle front rod 641 relative to the middle transmission plate 61 extends parallel or substantially parallel to the turning axis Z of the steering shaft 60.

The right front rod 651 is disposed directly to the right of the middle front rod 641. The right front rod 651 extends in the left-right direction of the vehicle body frame 21. The right front rod 651 extends parallel or substantially parallel to the middle front rod 641. The right front rod 651 is supported on the right transmission plate 62 via the right joint 65. The right front rod 651 is able to turn relative to the right transmission plate 62. A turning axis of the right front rod 651 relative to the right transmission plate 62 extends parallel or substantially parallel to the right center axis X.

The left front rod 661 is disposed directly to the left of the middle front rod 641. The left front rod 661 extends in the left-right direction of the vehicle body frame 21. The left front rod 661 extends parallel or substantially parallel to the middle front rod 641. The left front rod 661 is supported on the left transmission plate 63 via the left joint 66. The left front rod 661 is able to turn relative to the left transmission plate 63. A turning axis of the left front rod 661 relative to the left transmission plate 63 extends parallel or substantially parallel to the left center axis Y.

The tie rod 67 further includes a middle ring 671, a right ring 672, and a left ring 673.

The middle ring 671 is connected to the middle front rod 641. The middle ring 671 is able to turn relatively about the middle front rod 641 that extends in the front-rear direction of the vehicle body frame 21.

The right ring 672 is disposed directly to the right of the middle ring 671. The right ring 672 is connected to the right front rod 651. The right ring 672 is able to turn relatively about the right front rod 651 that extends in the front-rear direction of the vehicle body frame 21.

The left ring 673 is disposed directly to the left of the middle ring 671. The left ring 673 is connected to the left front rod 661. The left ring 673 is able to turn relatively about the left front rod 661 that extends in the front-rear direction of the vehicle body frame 21.

Thus, as has been described above, the right transmission plate 62 and the left transmission plate 63 are respectively connected to the middle transmission plate 61 via the tie rod 67.

Figure 7:
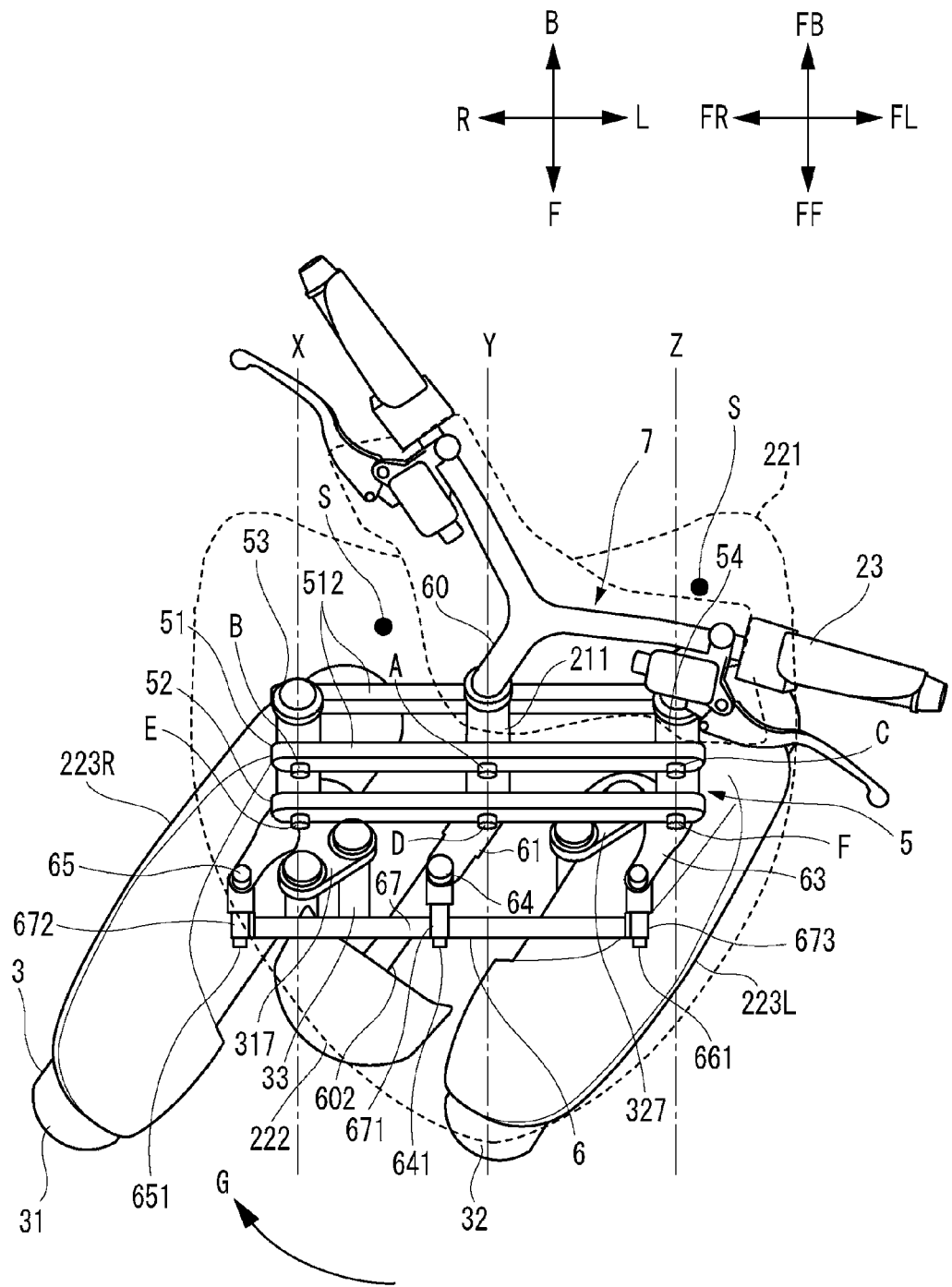
FIG. 7 is a plan view wherein a portion of the vehicle shown in FIG. 1 is seen from above when the vehicle is steered to the right.

Next, referring to FIGS. 4 and 7, a steering operation of the vehicle 1 will be described. FIG. 7 is a plan view wherein the front portion of the vehicle 1 is seen from above the vehicle body frame 21 showing a state when the right front wheel 31 and the left front wheel 32 are steered rightward. FIG. 7 shows a state seen through the front cover 221 which is indicated by dashed lines.

When the rider operates the handlebar 23, the steering shaft 60 turns about the turning axis Z relative to the head pipe 211. When steering rightward as shown in FIG. 7, the steering shaft 60 turns in a direction indicated by an arrow G. The middle transmission plate 61 turns about the turning axis z in the direction of the arrow G relative to the head pipe 211 as the steering shaft 60 turns.

The middle front rod 641 of the tie rod 67 turns in an opposite direction to the direction indicated by the arrow G about the middle joint 64 relative to the middle transmission plate 61 as the middle transmission plate 61 turns in the direction indicated by the arrow G. This causes the tie rod 67 to move rightward and rearward while maintaining the posture of the tie rod 67.

As the tie rod 67 moves rightward and rearward, the right front rod 651 and the left front rod 661 of the tie rod 67 turn in the opposite direction to the direction indicated by the arrow G about the right joint 65 and the left joint 66, respectively. This causes the right transmission plate 62 and the left transmission plate 63 to turn in the direction indicated by the arrow G while the tie rod 67 maintains its posture.

When the right transmission plate 62 turns in the direction indicated by the arrow G, the right bracket 317 that is prevented from turning relative to the right transmission plate 62 turns about the right center axis X in the direction indicated by the arrow G relative to the right side member 53.

When the left transmission plate 63 turns in the direction indicated by the arrow G, the left bracket 327 that is prevented from turning relative to the left transmission plate 63 turns about the left center axis Y in the direction indicated by the arrow G relative to the left side member 54.

When the right bracket 317 turns in the direction indicated by the arrow G, the right shock absorber 33 that is connected to the right bracket 317 via the right inner tube 316 turns in the direction indicated by the arrow G about the right center axis X relative to the right side member 53. When the right shock absorber 33 turns in the direction indicated by the arrow G, the right front wheel 31 that is supported on the right shock absorber 33 via the right support shaft 314 turns in the direction indicated by the arrow G about the right center axis X relative to the right side member 53.

When the left bracket 327 turns in the direction indicated by the arrow G, the left shock absorber 35 that is connected to the left bracket 327 via the left inner tube 326 turns in the direction indicated by the arrow G about the left center axis Y relative to the left side member 54. When the left shock absorber 35 turns in the direction indicated by the arrow G, the left front wheel 32 that is supported on the left shock absorber 35 via the left support shaft 324 turns in the direction indicated by the arrow G about the left center axis Y relative to the left side member 54.

Thus, as has been described above, the steering force transmission mechanism 6 transmits a steering force to the right front wheel 31 and the left front wheel 32 in accordance with the operation of the handlebar 23 by the rider. The right front wheel 31 and the left front wheel 32 turn in a direction that corresponds to a direction that the handlebar 23 is operated by the rider about the right center axis X and the left center axis Y.

Figure 5:
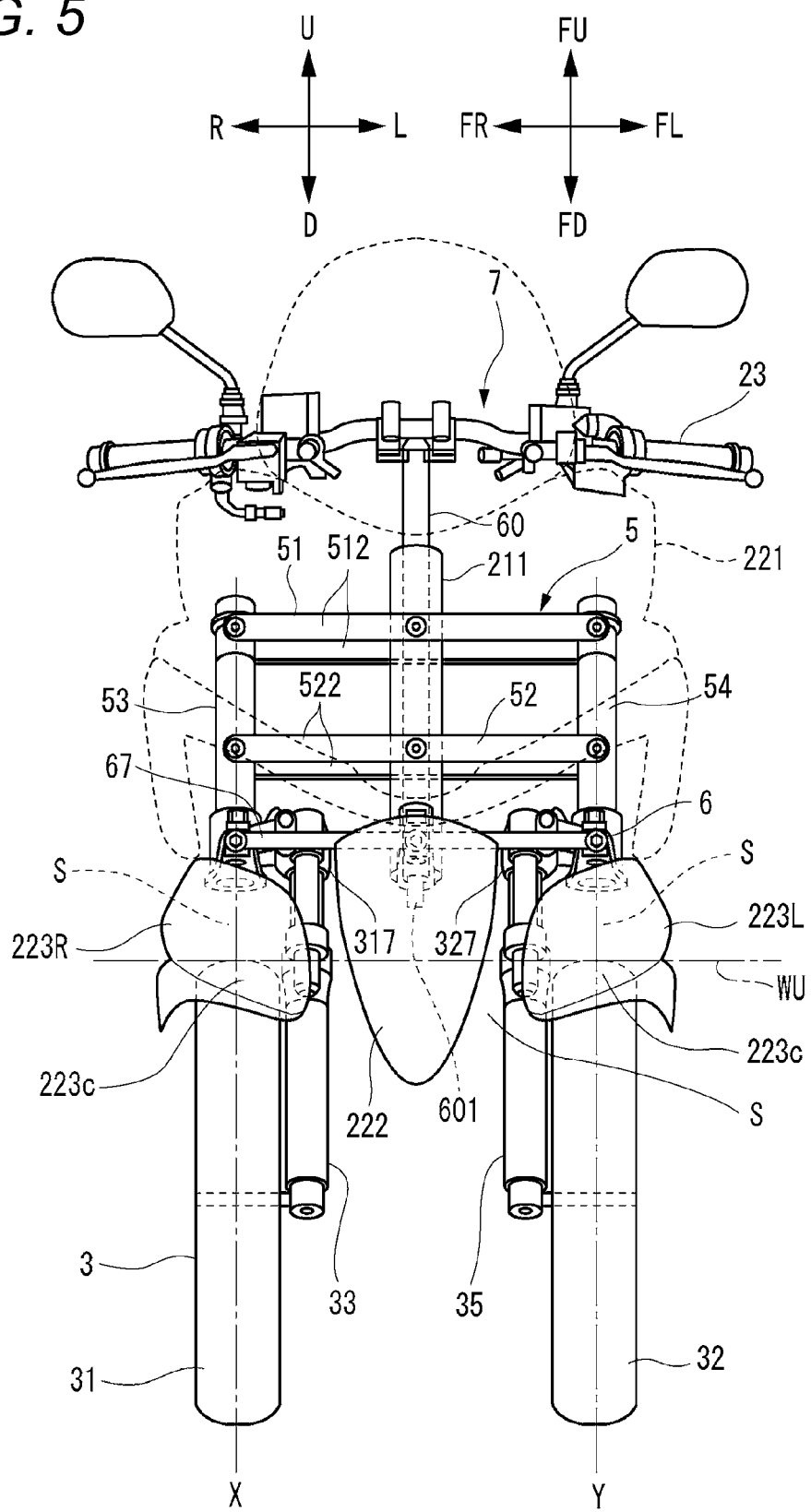
FIG. 5 is a front view wherein a portion of the vehicle shown in FIG. 1 is seen from the front.
Figure 8:
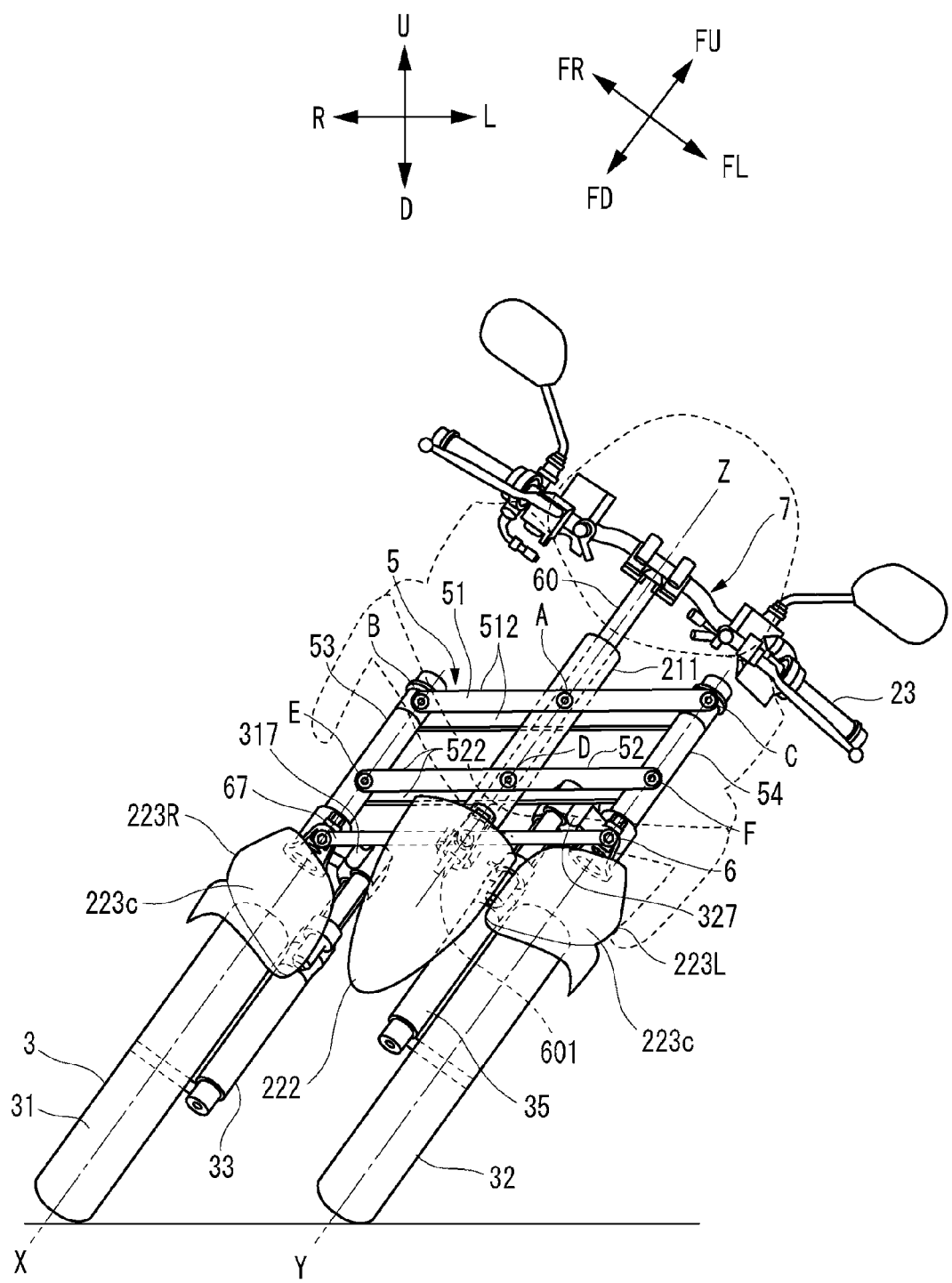
FIG. 8 is a front view wherein a portion of the vehicle shown in FIG. 1 is seen from the front when the vehicle is caused to lean leftward.
Figure 10A:
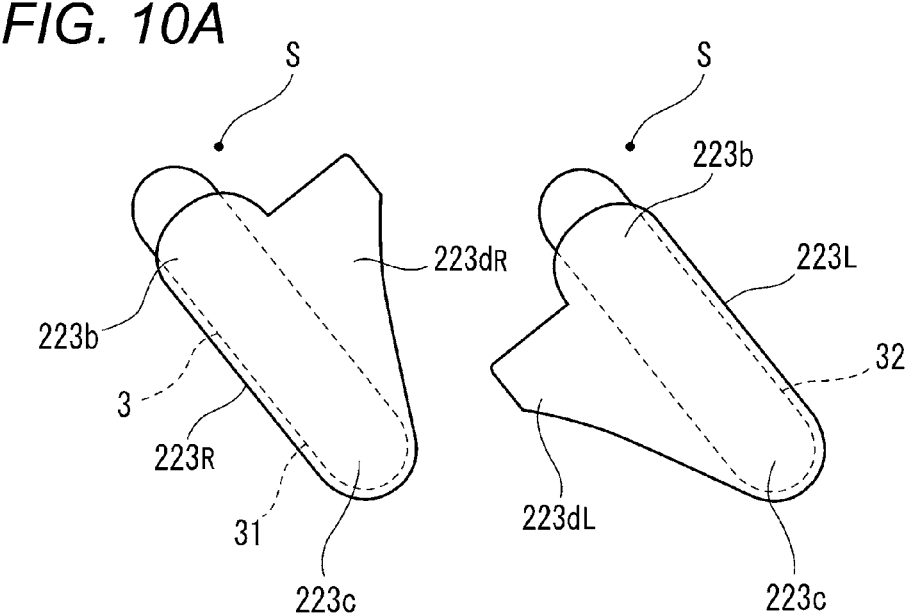
FIGS. 10A and 10B are views showing a modified example of the vehicle shown in FIG. 1.
Figure 10B:
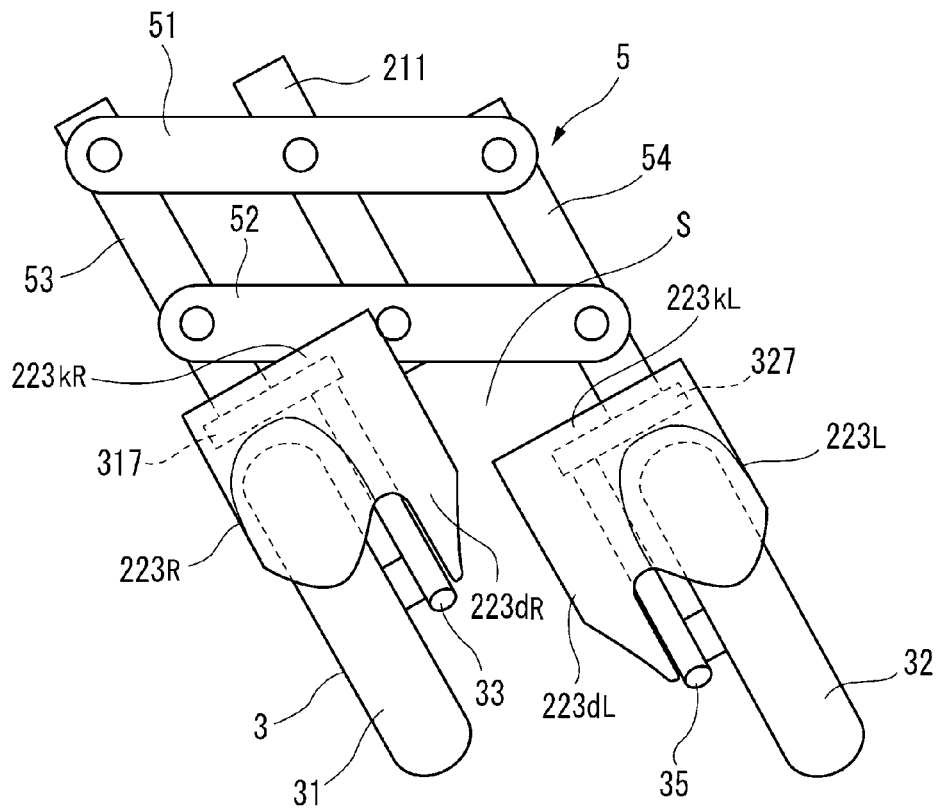

Next, referring to FIGS. 5 and 8, a leaning operation of the vehicle 1 will be described. FIG. 5 is a front view wherein the front portion of the vehicle 1 is seen from the front of the vehicle body frame 21. In FIG. 5, the vehicle body frame 21 is in the upright state. The following description referring to FIG. 5 will be based on the premise that the vehicle body frame 21 is in the upright state. FIG. 5 shows a state seen through the front cover 221 which is indicated by dashed lines. FIG. 8 is a front view wherein the front portion of the vehicle 1 is seen from the front of the vehicle body frame 21 when the vehicle body frame 21 is caused to lean leftward. FIG. 8 shows a state seen through the front cover 221 which is indicated by dashed lines.

As shown in FIG. 5, when the vehicle body frame 21 is in the upright state, the link mechanism 5 has a rectangular or substantially rectangular shape when the vehicle 1 is seen from the front of the vehicle body frame 21. As shown in FIG. 8, when the vehicle body frame 21 is in the leaned state, the link mechanism 5 has a shape of a parallelogram when the vehicle 1 is seen from the front of the vehicle body frame 21. The deformation of the link mechanism 5 is interlocked with the leftward or rightward leaning of the vehicle body frame 21. When the link mechanism 5 is described as operating, this indicates that the upper cross member 51, the lower cross member 52, the right side member 53, and the left side member 54 of the link mechanism 5 turn relative to each other about the turning axes that pass through the corresponding support portions A to F to deform the link mechanism 5.

For example, as shown in FIG. 8, when the rider causes the vehicle 1 to lean leftward, the head pipe 211 leans leftward in relation to the vertical direction. When the head pipe 211 leans, the upper cross member 51 turns rightward relative to the head pipe 211 about the middle upper axis that passes through the support portion A. Similarly, the lower cross member 52 turns rightward relative to the head pipe 211 about the middle lower axis that passes through the support portion D. This causes the upper cross member 51 to move leftward relative to the lower cross member 52.

As the upper cross member 51 moves leftward, the upper cross member 51 turns rightward relative to the right side member 53 and the left side member 54 about the right upper axis that passes through the support portion B and the left upper axis that passes through the support portion C. Similarly, the lower cross member 52 turns rightward relative to the right side member 53 and the left side member 54 about the right lower axis that passes through the support portion E and the left lower axis that passes through the support portion F. This causes the right side member 53 and the left side member 54 to lean leftward in relation to the vertical direction while maintaining their postures that are parallel or substantially parallel to the head pipe 211.

Here, the lower cross member 52 moves leftward relative to the tie rod 67. As the lower cross member 52 moves leftward, the middle ring 671, the right ring 672, and the left ring 673 of the tie rod 67 turn rightward about the middle front rod 641, the right front rod 651, and the left front rod 661, respectively. This enables the tie rod 67 to keep a posture parallel or substantially parallel to the upper cross member 51 and the lower cross member 52.

As the right side member 53 leans leftward, the right bracket 317 that is connected to the right side member 53 leans leftward. As the right bracket 317 leans leftward, the right shock absorber 33 that is connected to the right bracket 317 leans leftward. As the right shock absorber 33 leans leftward, the right front wheel 31 that is supported on the right shock absorber 33 leans leftward while maintaining a posture that is parallel or substantially parallel to the head pipe 211.

As the left side member 54 leans leftward, the left bracket 327 that is connected to the left side member 54 leans leftward. As the left bracket 327 leans leftward, the left shock absorber 35 that is connected to the left bracket 327 leans leftward. As the left shock absorber 35 leans leftward, the left front wheel 32 that is supported on the left shock absorber 35 leans leftward while maintaining a posture that is parallel or substantially parallel to the head pipe 211.

The description of the leaning operations of the right front wheel 31 and the left front wheel 32 are based on the vertical direction. However, when the vehicle 1 operates to lean (when the link mechanism 5 operates), the up-down direction of the vehicle body frame 21 does not coincide with the vertical direction. When a description is made based on the up-down direction of the vehicle body frame 21, when the link mechanism 5 is in operation, the relative positions of the right front wheel 31 and the left front wheel 32 to the vehicle body frame 21 change. In other words, the link mechanism 5 changes the positions of the right front wheel 31 and the left front wheel 32 relative to the vehicle body frame 21 in the up-down direction of the vehicle body frame 21 to cause the vehicle body frame 21 to lean in relation to the vertical direction.

As shown in FIG. 4, when the vehicle 1 is not turned or steered at all and the vehicle body 21 is in the upright state, respective front ends WF of the right front wheel 31 and the left front wheel 32 coincide with each other. Although not shown in the figure, respective rear ends WB of the right front wheel 31 and the left front wheel 32 also coincide with each other. In addition, as shown in FIG. 5, when the vehicle 1 is not turned or steered at all and the vehicle body 21 is in the upright state, respective upper ends WU of the right front wheel 31 and the left front wheel 32 coincide with each other.

Figure 6:
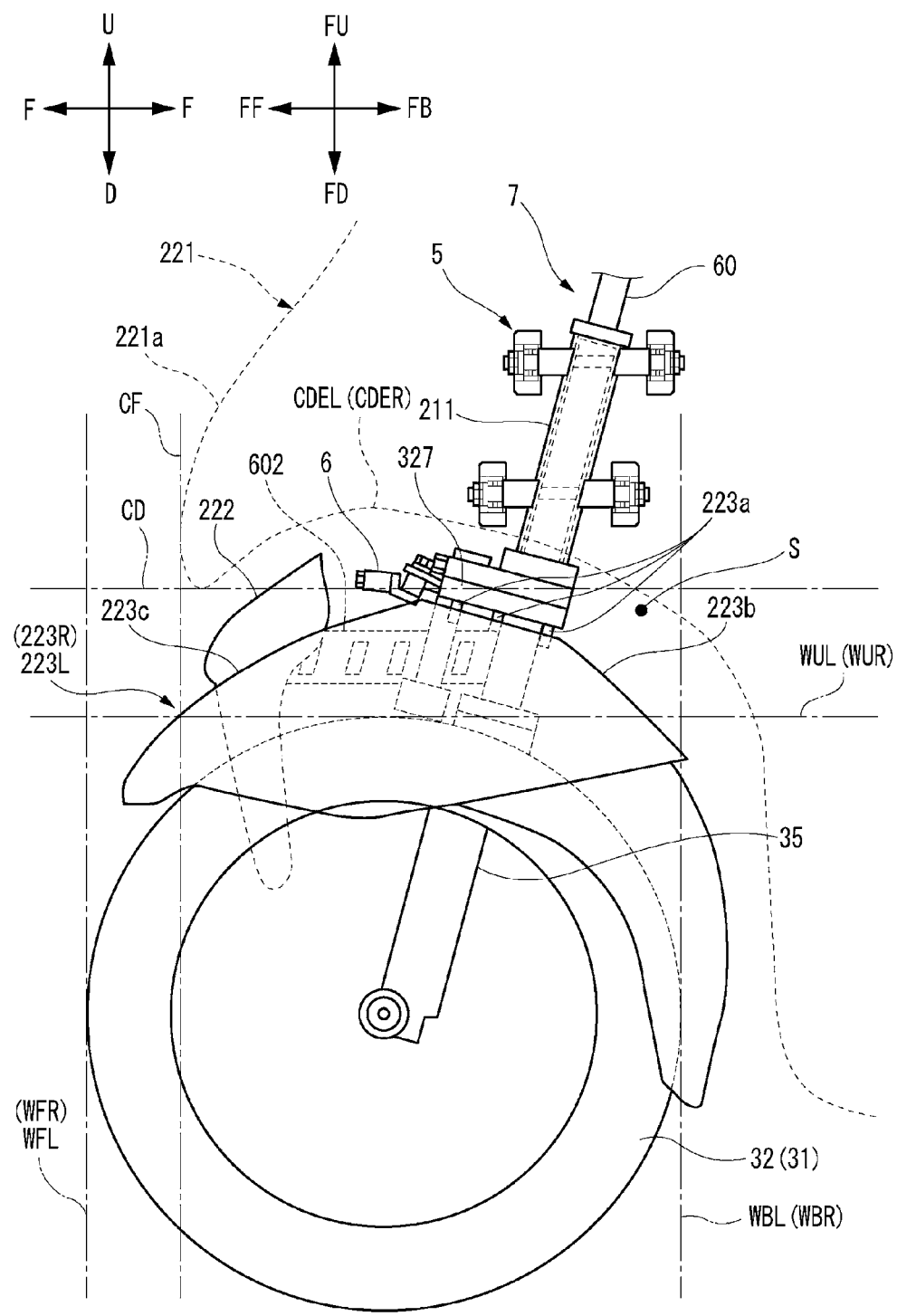
FIG. 6 is a left side view wherein a portion of the vehicle shown in FIG. 1 is seen from the left.

As described with reference to FIG. 1, the vehicle body cover 22 includes the front cover 221, the front spoiler 222, and the front fenders 223. Referring to FIG. 6, the positions and shapes of the constituent elements will be described. FIG. 6 is a side view wherein the front portion of the vehicle 1 is seen from the left of the vehicle body frame 21. In FIG. 6, the vehicle body frame 21 is in the upright state. The following description referring to FIG. 6 will be based on the premise that the vehicle body frame 21 is in the upright state. FIG. 6 shows a state seen through the front cover 221 which is indicated by dashed lines.

The front cover 221 (one example of a link cover portion) covers at least a portion of the link mechanism 5. The front cover 221 is not displaced relative to the vehicle body frame 21. The front cover 221 includes a front portion 221a. The front portion 221a is disposed forward of the respective rear ends WB of the right front wheel 31 and the left front wheel 32 in the front-rear direction of the vehicle body frame 21. A front end CF of the front portion 221a is disposed behind the respective front ends WF of the right front wheel 31 and the left front wheel 32 in the front-rear direction of the vehicle body frame 21, when the vehicle body frame 21 is in the upright state.

The front spoiler 222 is preferably made of synthetic resin or the like. The front spoiler 222 is connected to the steering shaft 60 via a stay 602. As shown in FIG. 5, a lower end portion of the steering shaft 60 projects farther downward than a lower end portion of the head pipe 211 to define a spoiler mounting portion 601.

The front spoiler 222 is displaced in relation to the vehicle body frame 21 in accordance with the operation of the steering mechanism 7. As shown in FIG. 7, when the rider operates the handlebar 23, the steering shaft 60 turns about the turning axis Z relative to the head pipe 211. This causes the front spoiler 222 that is connected to the steering shaft 60 via the spoiler mounting portion 601 and the stay 602 to turn about the turning axis Z relative to the head pipe 211. More specifically, the front spoiler 222 is displaced in the left-right direction of the vehicle body frame 21 in accordance with the operation of the steering mechanism 7.

As shown in FIG. 8, when the rider causes the vehicle 1 to lean leftward, the head pipe 211 leans leftward in relation to the vertical direction. When the headpipe 211 leans leftward, the steering shaft 60 also leans leftward. When the steering shaft 60 leans leftward, the front spoiler 222 that is connected to the steering shaft 60 via the spoiler mounting portion 601 and the stay 602 leans leftward in relation to the vertical direction.

The front fenders 223 include a right front fender 223R and a left front fender 223L. The right front fender 223R and the left front fender 223L are preferably made of synthetic resin or the like. As shown in FIG. 6, the left front fender 223L includes a rear surface 223b and a front surface 223c which are inclined. Although not shown, the right front fender 223R preferably has a similar configuration.

The left front fender 223L is supported on the left bracket 327. A plurality of stud bolts 223a are provided on the left bracket 327. A plurality of hole portions through which the stud bolts 223a are respectively inserted are provided in the left front fender 223L. The left front fender 223L is fixed to the left bracket 327 by inserting the plurality of stud bolts 223a into the plurality of corresponding hole portions. The left front fender 223L cannot be displaced relative to the left bracket 327.

The right front fender 223R is supported on the right bracket 317. Although not shown, the right front fender 223R is fixed to the right bracket 317 by a similar configuration to that of the left front fender 223L. The right front fender 223R cannot be displaced relative to the right bracket 317.

Consequently, the right front fender 223R and the left front fender 223L are displaced relative to the vehicle body frame 21 in accordance with the operation of the steering mechanism 7. As shown in FIG. 7, when the rider operates the handlebar 23, via the steering force transmission mechanism 6, the right bracket 317 and the left bracket 327 are turned relative to the right side member 53 and the left side member 54 about the right center axis X and the left center axis Y, respectively. This causes the right front fender 223R and the left front fender 223L that are connected to the right bracket 317 and the left bracket 327 via the stud bolts 223a to turn about the right center axis X and the left center axis Y relative to the right side member 53 and the left side member 54. More specifically, the right front fender 223R and the left front fender 223L are displaced in the left-right direction of the vehicle body frame 21 in accordance with the operation of the steering mechanism 7.

As shown in FIG. 8, when the rider causes the vehicle 1 to lean leftward, the link mechanism 5 operates. The positions of the right bracket 317 and the left bracket 327 relative to the vehicle body frame 21 are changed in the up-down direction of the vehicle body frame 21 in accordance with the operation of the link mechanism 5. Consequently, the right front fender 223R and the left front fender 223L that are fixed to the right bracket 317 and the left bracket 327, respectively, change their relative positions to the vehicle body frame 21 in the up-down direction of the vehicle body frame 21. More specifically, the right front fender 223R and the left front fender 223L are displaced relative to the vehicle body frame 21 in accordance with the operation of the link mechanism 5.

Thus, as has been described above, the vehicle 1 according to the present preferred embodiment includes the vehicle body frame 21. A handlebar 23 is able to turn relative to the vehicle body frame 21. At least a portion of a vehicle body cover 22 covers the vehicle body frame 21. The right front wheel 31 and the left front wheel 32 are arranged side by side in the left-right direction of the body frame 21. The steering mechanism 7 transmits a turning motion of the handlebar 23 to the right front wheel 31 and the left front wheel 32. The link mechanism 5 is disposed above the right front wheel 31 and the left front wheel 32. The link mechanism 5 changes the respective positions of the right front wheel 31 and the left front wheel 32 relative to the vehicle body frame 21, thus causing the vehicle body frame 21 to lean relative to the vertical direction. The power unit 25 is supported by the vehicle body frame 21. The vehicle body cover 22 includes a front cover 221 (one example of the link cover portion), a right front fender 223R (one example of the right aerodynamic portion) and a left front fender 223L (one example of the left aerodynamic portion).

Figure 17:
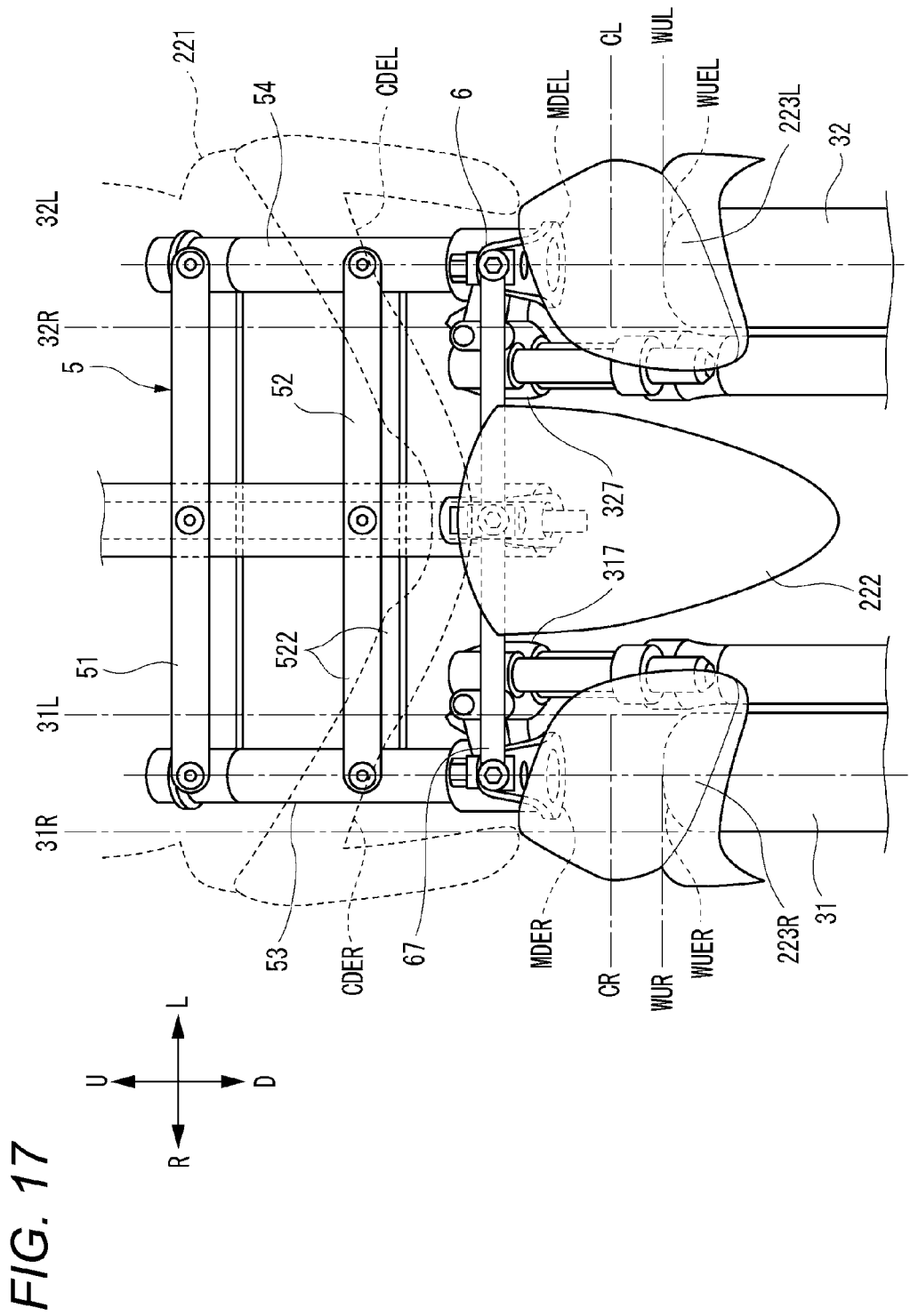
FIG. 17 is a view illustrating the right aerodynamic portion and the left aerodynamic portion on the vehicle shown in FIG. 1.

The left front fender 223L is displaced relative to the vehicle body frame 21 in accordance with the operation of the link mechanism 5. As illustrated in FIG. 17, the left front fender 223L reduces the wind pressure received during the traveling of the vehicle 1 by at least one of a portion of the power unit 25, a portion of the vehicle body cover 22, a portion of the vehicle body frame 21, a portion of the steering mechanism 7, and a portion of the link mechanism 5, any one of which is located between the left lower edge CDEL of the front portion 221a of the front cover 221 and the upper edge WUEL of the left front wheel 32 as seen from the front in the front-rear direction of the vehicle body frame 21 of the vehicle 1 when the vehicle body frame is in the upright state, and is located above the center CL in the up-down direction of the vehicle body frame 21 between the upper end WUL of the left front wheel 32 and the lower edge MDEL of the link mechanism 5 or the steering mechanism 7 directly above the left front wheel 32.

Here, the "left lower edge CDEL of the front portion 221a of the front cover 221" denotes a contour portion of the front portion 221a shown in FIG. 6 that extends from a portion intersecting an imaginary line denoting the front end CF to a portion intersecting an imaginary line denoting a rear end WBL of the left front wheel 32 by way of a lower end CD.

Here, the "upper edge WUEL of the left front wheel 32" denotes a contour portion that extends from a portion intersecting an imaginary line denoting a right end 32R of the left front wheel 32 to a portion intersecting an imaginary line denoting a left end 32L of the left wheel 32. Both imaginary lines shown in FIG. 17 extend in the up-down direction of the vehicle body frame 21.

Here, the "lower edge MEDL of the link mechanism 5 or the steering mechanism 7 that is directly above the left front wheel 32" denotes a contour portion of the link mechanism 5 or the steering mechanism 7 that appears between the imaginary line denoting the right end 32R of the left front wheel 32 and the left end 32L of the left front wheel 32 in FIG. 17, and that faces the upper edge WUEL of the left front wheel 32. In the example shown in FIG. 17, portion of the left transmission plate 63 (see FIG. 2) defines the lower edge MDEL. Any portion that is included in the link mechanism 5 or the steering mechanism 7 and that is disposed in the related position can define the lower edge MDEL.

The right front fender 223R is displaced relative to the vehicle body frame 21 in accordance with the operation of the link mechanism 5. As illustrated in FIG. 17, the right front fender 223R reduces the wind pressure received during the traveling of the vehicle 1 by at least one of a portion of the power unit 25, a portion of the vehicle body cover 22, a portion of the vehicle body frame 21, a portion of the steering mechanism 7, and a portion of the link mechanism 5, any one of which is located between the right lower edge CDER of the front portion 221a of the front cover 221 and the upper edge WUER of the right front wheel 31 as seen from the front in the front-rear direction of the vehicle body frame 21 of the vehicle 1 when the vehicle body frame is in the upright state, and is located above the center CR in the up-down direction of the vehicle body frame 21 between the upper end WUR of the right front wheel 31 and the lower edge MDER of the link mechanism 5 or the steering mechanism 7 directly above the right front wheel 31.

Here, the "right lower edge CDER of the front portion 221a of the front cover 221" denotes a contour portion of the front portion 221a shown in FIG. 6 that extends from a portion intersecting an imaginary line denoting the front end CF to a portion intersecting an imaginary line denoting a rear end WBR of the right front wheel 31 by way of a lower end CD.

Here, the "upper edge WUER of the right front wheel 31" denotes a contour portion that extends from a portion intersecting an imaginary line denoting a right end 31R of the right front wheel 31 to a portion intersecting an imaginary line denoting a left end 31L of the right wheel 31. Both imaginary lines shown in FIG. 17 extend in the up-down direction of the vehicle body frame 21.

Here, the "lower edge MEDR of the link mechanism 5 or the steering mechanism 7 that is located above the upper side of the right front wheel 31" denotes a contour portion of the link mechanism 5 or the steering mechanism 7 that appears between the imaginary line denoting the right end 31R of the right front wheel 31 and the left end 31L of the right front wheel 31 in FIG. 17, and that faces the upper edge WUER of the right front wheel 31. In the example shown in FIG. 17, a portion of the right transmission plate 62 (see FIG. 2) defines the lower edge MDER. Any portion that is included in the link mechanism 5 or the steering mechanism 7 and that is disposed in the related position can define the lower edge MDER.

As shown in FIG. 5, as seen from the front in the front-rear direction of the vehicle body frame 21, an area directly above the right front wheel 31 and the left front wheel 32 and behind the right front wheel 31 and the left front wheel 32 is referred to as a behind-front-wheels area S. In the present preferred embodiment, a right upper portion and a left upper portion of the leg shield 225 as seen from the front in the front-rear direction of the vehicle body frame 21 corresponds to the behind-front-wheels area S. When no leg shield 225 is provided, among vehicle portions that are mounted on the down frame 212 or the periphery thereof, what corresponds to the behind-front-wheels area S is each of portions directly above the right front wheel 31 and the left front wheel 32 as seen from the front in the front-rear direction of the vehicle body frame 21 while behind the right front wheel 31 and the left front wheel 32. The right front fender 223R and the left front fender 223L reduce wind pressure that the behind-front-wheels area S receives when the vehicle 1 travels straight ahead.

Figure 13A:
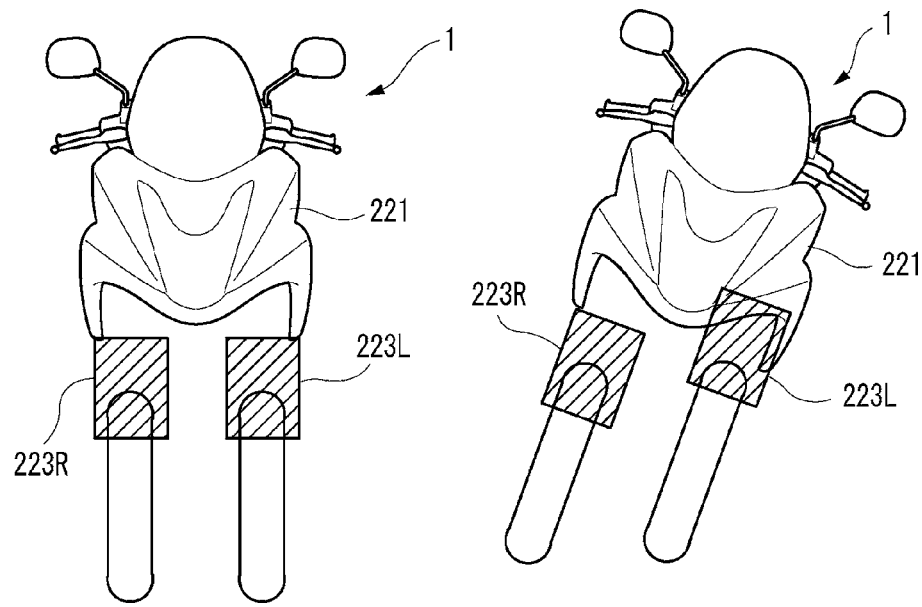
FIGS. 13A and 13B are views illustrating the effects of a right aerodynamic portion and a left aerodynamic portion on the vehicle shown in FIG. 1.
Figure 13B:
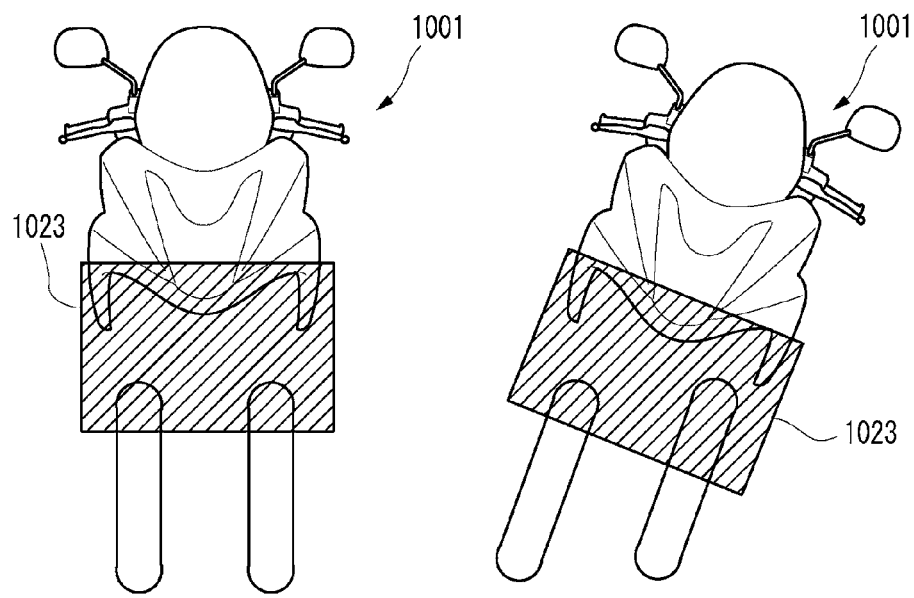
Figure 14:
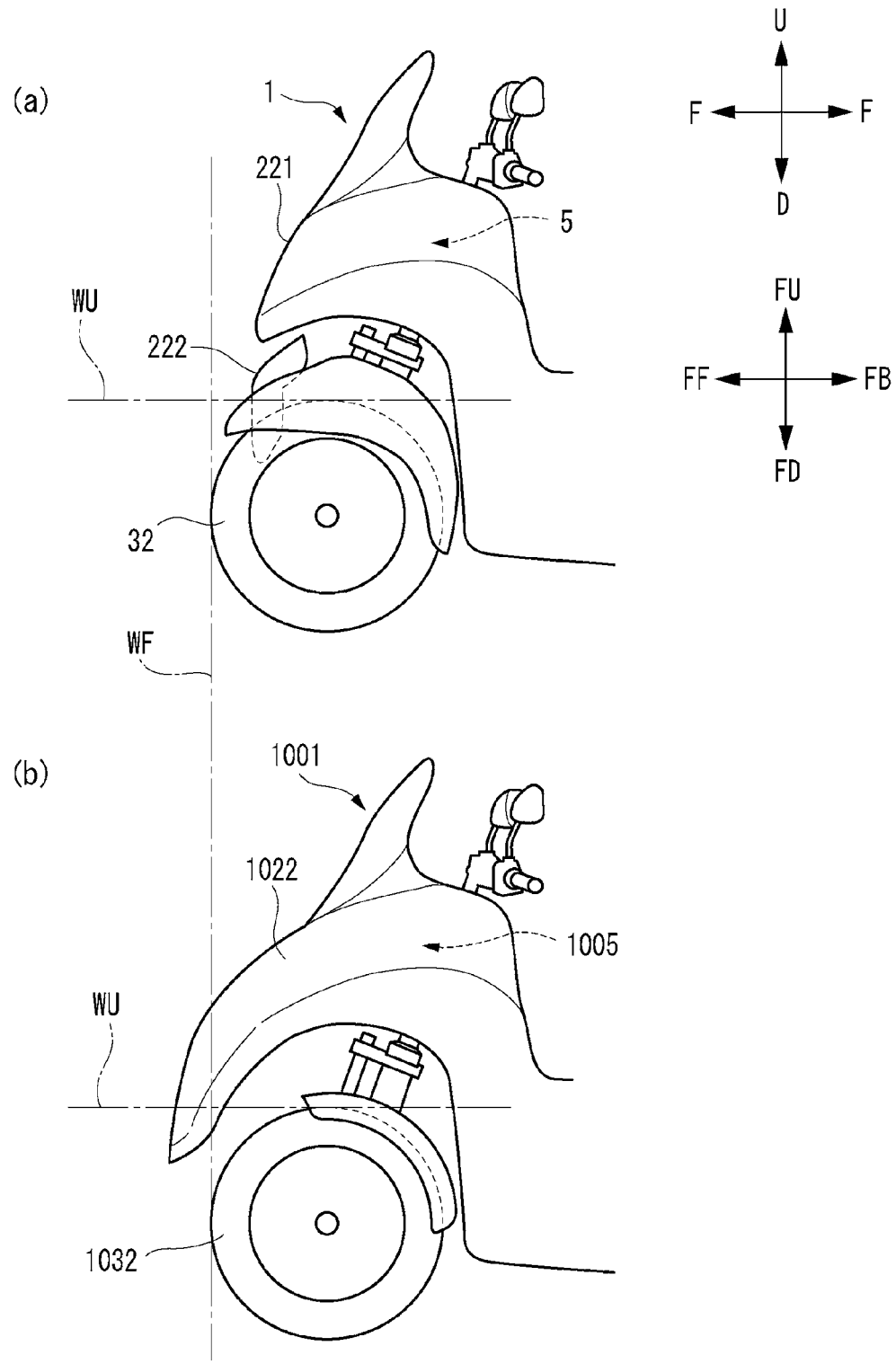
FIG. 14 is a view illustrating the effects of the right aerodynamic portion and the left aerodynamic portion on the vehicle shown in FIG. 1.
Figure 15:
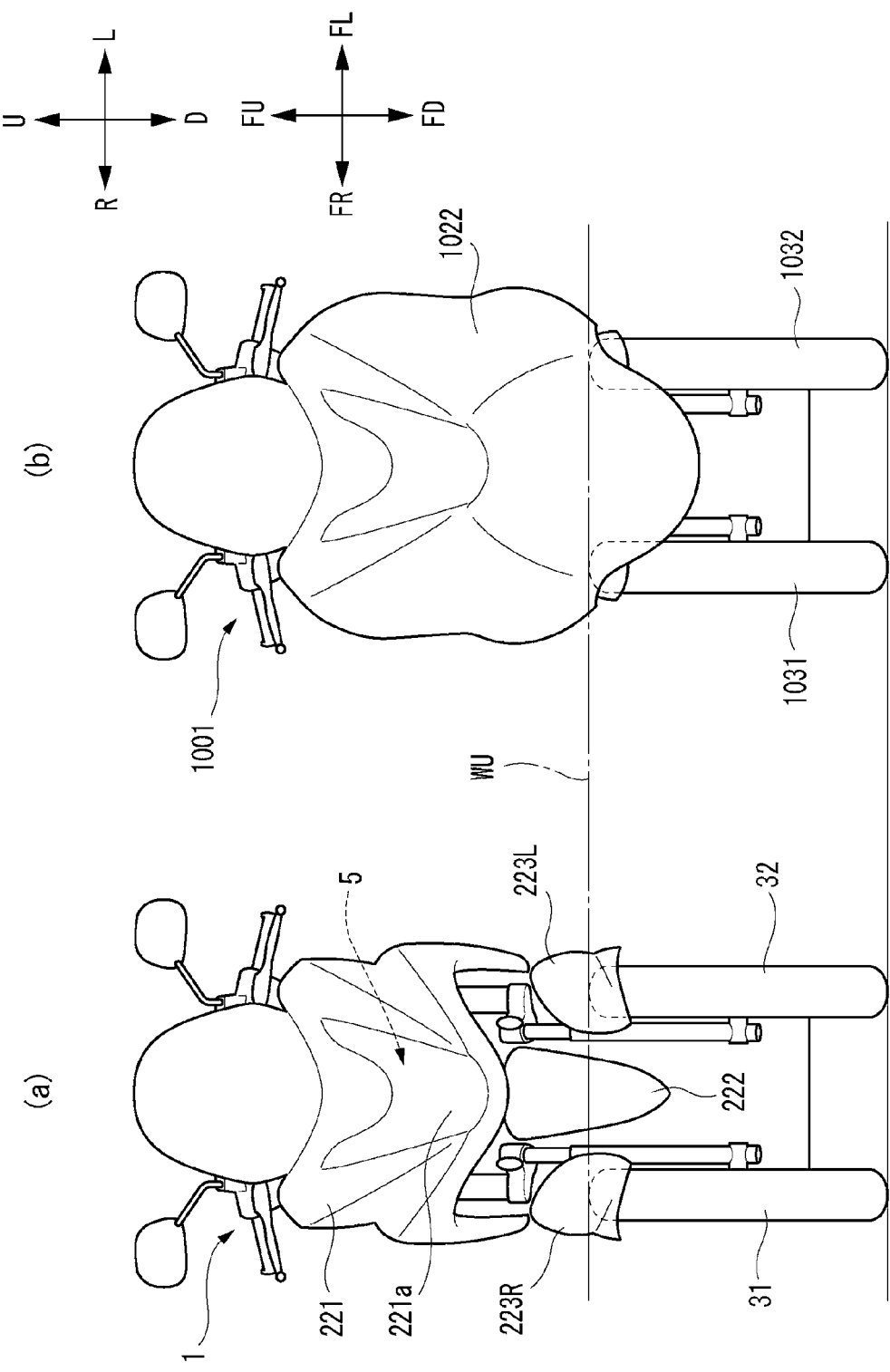
FIG. 15 is a view illustrating the effects of the right aerodynamic portion and the left aerodynamic portion on the vehicle shown in FIG. 1.
Figure 16:
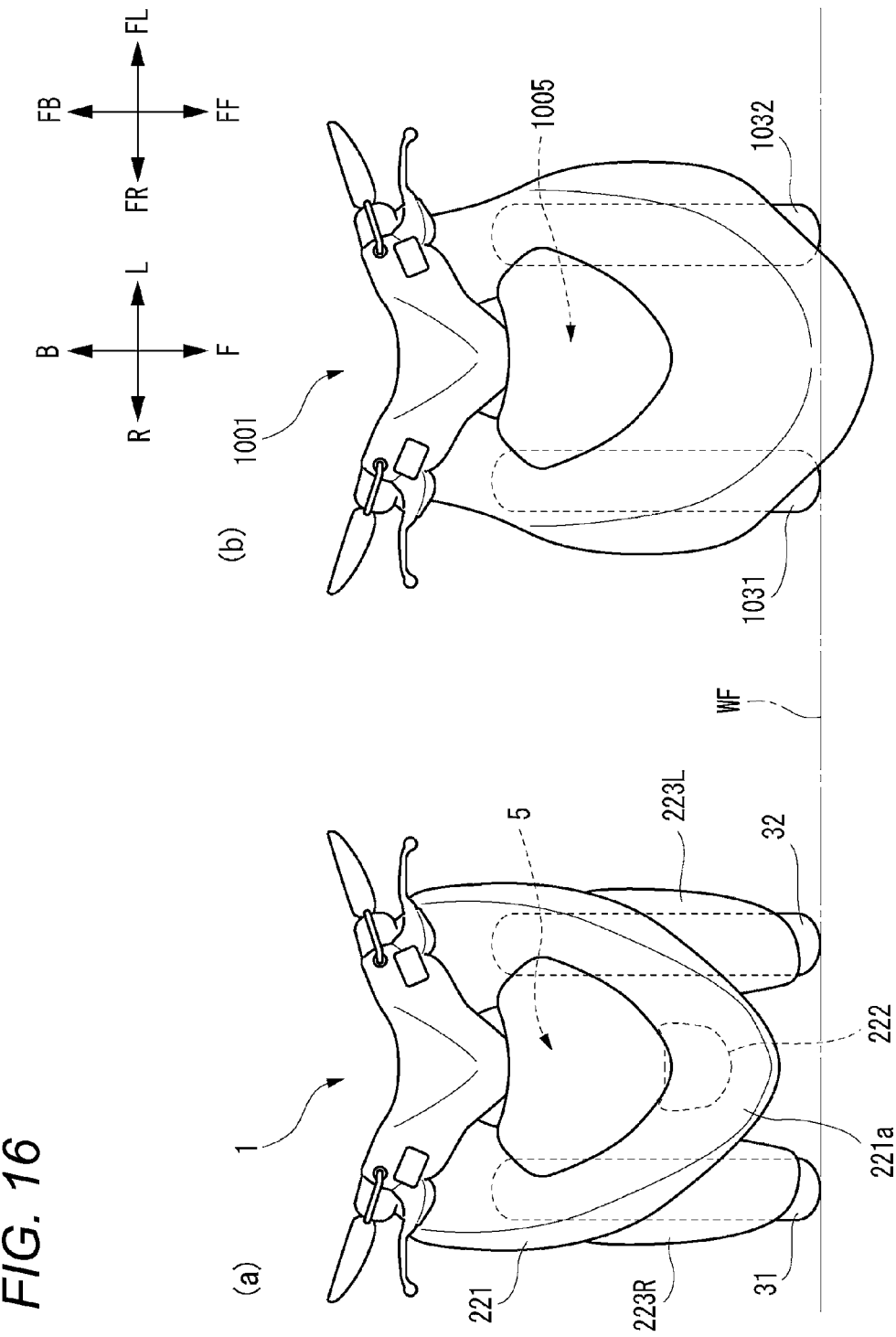
FIG. 16 is a view illustrating the right aerodynamic portion and the left aerodynamic portion on the vehicle shown in FIG. 1.

Referring to schematic drawings of FIGS. 13A to 16, there will be described the functions and advantageous effects of the right front fender 223R and the left front fender 223L that are configured as described above. Portion (a) in FIG. 14 is a side view wherein the front portion of the vehicle 1 according to the present preferred embodiment is seen from the side of the vehicle body frame 21. Portion (b) in FIG. 14 is a side view wherein the front portion of a vehicle 1001 according to a comparison example is seen from the same direction. Portion (a) in FIG. 15 is a front view wherein the front portion of the vehicle 1 according to the present preferred embodiment is seen from the front of the vehicle body frame 21. Portion (b) in FIG. 15 is a front view wherein the front portion of the vehicle 1001 according to the comparison example is seen from the same direction. Portion (a) in FIG. 16 is a plan view wherein the front portion of the vehicle 1 according to the present preferred embodiment is seen from above the vehicle body frame 21. Portion (b) in FIG. 16 is a plan view wherein the front portion of the vehicle 1001 according to the comparison example is seen from the same direction. In any one of those drawings, the vehicle body frame is in the upright state.

In the vehicle including the leanable vehicle body frame and the link mechanism, the right front wheel and the left front wheel each have a wide movable range. This is because the right front wheel and the left front wheel are turned when steered, are displaced in the up-down direction of the vehicle body frame as the right shock absorber and the left shock absorber extend or contract, and are displaced in the up-down direction of the vehicle body frame in accordance with the operation of the link mechanism. A vehicle body cover that is not displaced relative to the vehicle body frame covers a long distance with respect to the right front wheel and the left front wheel, each of which has such a wide movable range, so as to avoid interference therewith.

When a front end of the vehicle body cover is disposed behind the respective front ends of the right and left front wheels arranged within a narrowed space so as to decrease the size of the vehicle body cover in the front-rear direction of the vehicle body frame, the vehicle body cover is likely to interfere with the right and left front wheels. It is desirable to secure a large distance between a lower edge of the front portion of the vehicle body cover and each of the respective upper ends of the right and left front wheels so as to prevent interference between the vehicle body cover and the right and left front wheels.

As a result of evaluations of various vehicle body covers having different shapes, it has been discovered that the deterioration of the traveling performance is caused by wind pressure received during the traveling of the vehicle by at least one of a portion of the power unit, a portion of the vehicle body cover, a portion of the vehicle body frame, a portion of the steering mechanism, and a portion of the link mechanism located between the right lower edge of the front portion of the link cover portion and the upper edge of the right front wheel and between the left lower edge of the front portion of the link cover portion and the upper edge of the left front wheel as seen from the front in the front-rear direction of the vehicle body frame when the vehicle body frame is in the upright state; is located above the center in the up-down direction of the vehicle body frame between the upper end of the right front wheel and the lower edge of the link mechanism or the steering mechanism directly above the right front wheel; and is located above the center in the up-down direction of the vehicle body frame between the upper end of the left front wheel and the lower edge of the link mechanism or the steering mechanism directly above the left front wheel. It has been discovered that the traveling performance of the vehicle is maintained by reducing the wind pressure.

In addition, it has been discovered that the vehicle body cover not only covers at least a portion of the link mechanism but also reduces wind pressure. Accordingly, the vehicle body cover is divided in accordance with the functions thereof into the portion (the link cover portion) that covers at least a portion of the link mechanism and the portion (the right aerodynamic portion and the left aerodynamic portion) that contributes to the wind pressure reduction. Then suitable positions and shapes for each of the individual functional portions was considered.

In the vehicle including the leanable vehicle body frame and the link mechanism, the right front wheel and the left front wheel each have a wide movable range. Consequently, there is a large change in the positions and sizes of the areas between the link mechanism and the right front wheel and between the link mechanism and the left front wheel in accordance with the operation of the link mechanism. When a portion of the vehicle body cover that defines the aerodynamic portion is not displaced relative to the vehicle body frame, as in the vehicle 1001 according to the comparison example shown in FIG. 13B, the aerodynamic portion covers the entire the areas 1223 that change largely to deflect air flow coming into these areas. This enlarges the vehicle body cover.

The front cover 221, which is one example of a link cover portion provided on the vehicle 1, is provided so as not to be displaced relative to the vehicle body frame 21 and covers at least a portion of the link mechanism 5. In the front cover 221, at least a portion of the function that contributes to the wind pressure reduction is divided into the aerodynamic portion. Thus, the degree of freedom in design of the front cover 221 is enhanced. In addition, by separating a portion of the functions that the front cover 221 performs, the front cover 221 is made smaller. Specifically, the front cover 221 includes the front portion 221a that is disposed forward of the respective rear ends WBR, WBL of the right front wheel 31 and the left front wheel 32 in the front-rear direction of the vehicle body frame 21. As seen from the front in the front-rear direction of the vehicle body frame 21 of the vehicle 1 when the vehicle body frame 21 is in the upright state, the right lower edge CDER of the front portion 221a that is directly above the right front wheel 31 is disposed above the lower end of the link mechanism 5 or the steering mechanism 7 in the up-down direction of the vehicle body frame 21, and the left lower edge CDEL of the front portion 221a that is directly above the left front wheel 32 is disposed above the lower end of the link mechanism 5 or the steering mechanism 7 in the up-down direction of the vehicle body frame 21. More specifically, the vehicle body cover 22 is made smaller in size in relation to the left-right direction of the vehicle body frame 21 by narrowing the space between the right front wheel 31 and the left front wheel 32. In addition to this, the vehicle body cover 22 is also made smaller in size in relation to the front-rear direction of the vehicle body frame 21.

By reducing the size of the front cover 221 in relation to the front-rear direction of the vehicle body frame 21, relatively large spaces are provided individually between the right lower edge CDER of the front portion 221a of the front cover 221 and the upper edge WUER of the right front wheel 31, and between the left lower edge CDEL of the front portion 221a of the front cover 21 and the upper edge WUEL of the left front wheel 32. However, the right front fender 223R and the left front fender 223L are displaced relative to the vehicle body frame 21 in accordance with the operation of the link mechanism 5. More specifically, as shown in FIG. 13A, even though the positions and sizes of the areas defined between the link mechanism 5 and the right front wheel 31 and between the link mechanism 5 and the left front wheel 32 change in accordance with the operation of the link mechanism 5, the right front fender 223R and the left front fender 223L are caused to move according to the changes in position and size. Consequently, the right front fender 223R (one example of the right aerodynamic portion) and the left front fender 223L (one example of the left aerodynamic portion) are made smaller in size, even though the right front fender 223R and the left front fender 223L provide the same function of wind pressure reduction as that of the aerodynamic portion that is not displaced relative to the vehicle body frame 21 irrespective of how the link mechanism 5 operates. Thus, even though the right front fender 223R and the left front fender 223L are made smaller in size, it is possible to reduce or prevent an increase of the wind pressure that the vehicle 1 receives. In addition, it is possible to reduce the air resistance in the behind-front-wheels area S.

As has been described above, the front cover 221 is made smaller in size by separating therefrom at least a portion of the function that contributes to the wind pressure reduction. In addition, the right front fender 223R and the left front fender 223L which include the function of contributing to the wind pressure reduction are made smaller by providing the right front fender 223R and the left front fender 223L so as to displaced relative to the vehicle body frame 21 in accordance with the operation of the link mechanisms. Consequently, the front portion of the vehicle 1 is made smaller in size while maintaining the traveling performance of the vehicle 1 including the leanable vehicle body frame 21 and the two front wheels 3.

The expressions "divide" and "separate" used in the above explanations are not intended to exclusively indicate a case where the function to cover at least a portion of the link mechanism 5 is completely divided or separated from the function that contributes to the wind pressure reduction. It is not excluded a case where the front cover 221 includes the function of contributing to the wind pressure reduction. It is not excluded a case where each of the right front fender 223R and the left front fender 223L includes the function to cover at least a portion of the link mechanism 5.

Figure 18:
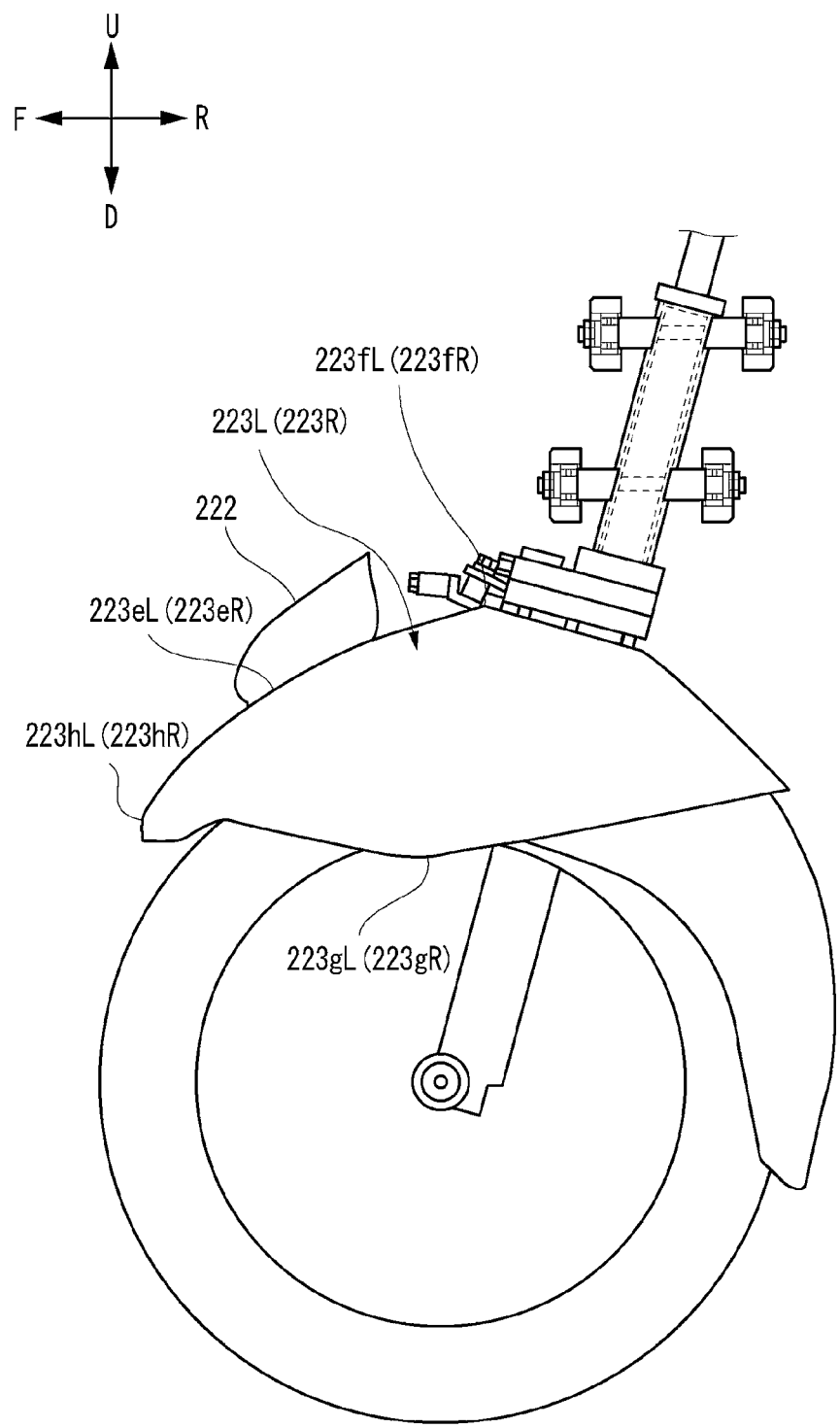
FIG. 18 is a view illustrating the shapes of the right aerodynamic portion and the left aerodynamic portion on the vehicle shown in FIG. 1.

In the present preferred embodiment, as shown in FIG. 18, as seen from the side of the vehicle body frame 21 of the vehicle 1 when the vehicle body frame 21 is in the upright state, a front edge 223eL of the left front fender 223L is inclined so that at least either of an upper end 223fL and a lower end 223gL is positioned behind a front end 223hL. Similarly, as seen from the side of the vehicle body frame 21 of the vehicle 1 when the vehicle body frame 21 is in the upright state, a front edge 223eR of the right front fender 223R is inclined so that at least either of an upper end 223fR and a lower end 223gR is positioned behind a front end 223hR.

Here, the "front edge 223eL of the left front fender 223L" denotes a contour portion that extends from the upper end 223fL to the lower end 223gL. In FIG. 18, the contour portion appears in an area forward of the vehicle body frame 21. Here, the "front edge 223eR of the right front fender 223R" denotes a contour portion that extends from the upper end 223fR to the lower end 223gR. In FIG. 18, the contour portion appears in an area forward of the vehicle body frame 21.

With this configuration, the direction of air is deflected in the up-down direction of the vehicle body frame 21, along the inclined portion of the right front fender 223R, that is flowing toward at least one of a portion of the power unit 25, a portion of the vehicle body cover 22, a portion of the vehicle body frame 21, a portion of the steering mechanism 7, and a portion of the link mechanism 5, any one of which is located between the right lower edge CDER of the front portion 221a of the front cover 221 and the upper edge WUER of the right front wheel 31 as seen from the front in the front-rear direction of the vehicle body frame 21 of the vehicle 1 when the vehicle body frame 21 is in the upright state, and is located above the center CR in the up-down direction of the vehicle body frame 21 between the upper end WUR of the right front wheel 31 and the lower edge MDER of the link mechanism 5 or the steering mechanism 7 directly above the right front wheel 31. Accordingly, it is possible to further reduce the wind pressure received during the traveling of the vehicle 1 by at least one of a portion of the power unit 25, a portion of the vehicle body cover 22, a portion of the vehicle body frame 21, a portion of the steering mechanism 7, and a portion of the link mechanism 5, any one of which is located between the right lower edge CDER of the front portion 221a of the front cover 221 and the upper edge WUER of the right front wheel 31 as seen from the front in the front-rear direction of the vehicle body frame 21 of the vehicle 1 when the vehicle body frame 21 is in the upright state, and is located above the center CR in the up-down direction of the vehicle body frame 21 between the upper end WUR of the right front wheel 31 and the lower edge MDER of the link mechanism 5 or the steering mechanism 7 directly above the right front wheel 31. It is also possible to directly reduce the air resistance in the behind-front-wheels area S. Accordingly, the right front fender 223R including the function of contributing to reduce wind pressure is made smaller in size.

In addition, air is deflected in the up-down direction of the vehicle body frame 21, along the inclined portion of the left front fender 223L, that is flowing toward at least one of a portion of the power unit 25, a portion of the vehicle body cover 22, a portion of the vehicle body frame 21, a portion of the steering mechanism 7, and a portion of the link mechanism 5, any one of which is located between the left lower edge CDEL of the front portion 221a of the front cover 221 and the upper edge WUEL of the left front wheel 32 as seen from the front in the front-rear direction of the vehicle body frame 21 of the vehicle 1 when the vehicle body frame 21 is in the upright state, and is located above the center CL in the up-down direction of the vehicle body frame 21 between the upper end WUL of the left front wheel 32 and the lower edge MDEL of the link mechanism 5 or the steering mechanism 7 directly above the left front wheel 32. Accordingly, it is possible to further reduce the wind pressure received during the traveling of the vehicle 1 by at least one of a portion of the power unit 25, a portion of the vehicle body cover 22, a portion of the vehicle body frame 21, a portion of the steering mechanism 7, and a portion of the link mechanism 5, any one of which is located between the left lower edge CDEL of the front portion 221*a* of the front cover 221 and the upper edge WUEL of the left front wheel 32 as seen from the front in the front-rear direction of the vehicle body frame 21 of the vehicle 1 when the vehicle body frame 21 is in the upright state, and is located above the center CL in the up-down direction of the vehicle body frame 21 between the upper end WUL of the left front wheel 32 and the lower edge MDEL of the link mechanism 5 or the steering mechanism 7 directly above the left front wheel 32. It is also possible to directly reduce the air resistance in the behind-front-wheels area S. Accordingly, the left front fender 223L including the function of contributing to reduce wind pressure is made smaller in size.

Accordingly, it is possible to decrease the size of the front portion 221*a* of the vehicle 1 while maintaining the traveling performance of the vehicle 1 including the leanable vehicle body frame 21 and two front wheels.

Figure 19:
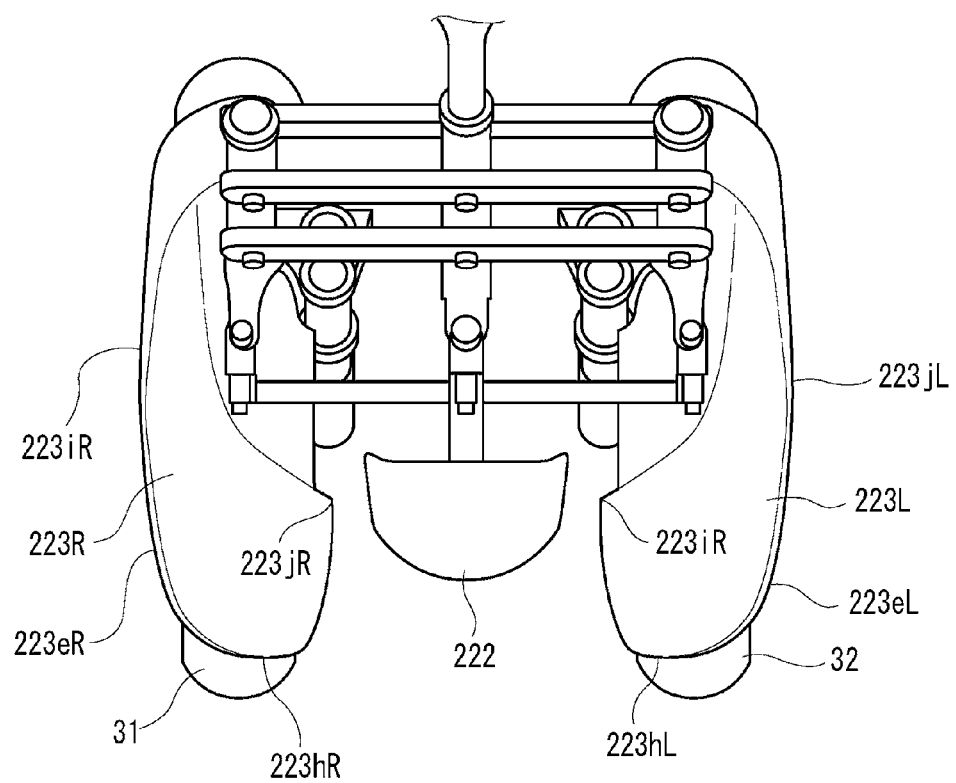
FIG. 19 is a view illustrating the shapes of the right aerodynamic portion and the left aerodynamic portion on the vehicle shown in FIG. 1.

In the present preferred embodiment, as shown in FIG. 19, as seen from above the vehicle body frame 21 of the vehicle 1 when the vehicle body frame 21 is in the upright state, the front edge 223*e*R of the right front fender 223R is inclined so that at least either of a right end 223*i*R and a left end 223*j*R is positioned behind the front end 223*h*R. In addition, as seen from above the vehicle body frame 21 of the vehicle 1 when the vehicle body frame 21 is in the upright state, a front edge 223*e*L of the left front fender 223L is inclined so that at least either of a right end 223*i*L and a left end 223*j*L is positioned behind a front end 223*h*R.

Here, the "front edge 223*e*L of the left front fender 223L" denotes a contour portion that extends from the right end 223*i*L to the left end 223*j*L. In FIG. 19, the contour portion appears in an area forward of the vehicle body frame 21. In addition, the "front edge 223*e*R of the right front fender 223R" denotes a contour portion that extends from the right end 223*i*R to the left end 223*j*R. In FIG. 19, the contour portion appears in an area forward of the vehicle body frame 21.

With this configuration, air is deflected in the left-right direction of the vehicle body frame 21, along the inclined portion of the right front fender 223R, that is flowing toward at least one of a portion of the power unit 25, a portion of the vehicle body cover 22, a portion of the vehicle body frame 21, a portion of the steering mechanism 7, and a portion of the link mechanism 5, any one of which is located between the right lower edge CDER of the front portion 221*a* of the front cover 221 and the upper edge WUER of the right front wheel 31 as seen from the front in the front-rear direction of the vehicle body frame 21 of the vehicle 1 when the vehicle body frame 21 is in the upright state, and is located above the center CR in the up-down direction of the vehicle body frame 21 between the upper end WUR of the right front wheel 31 and the lower edge MDER of the link mechanism 5 or the steering mechanism 7 directly above the right front wheel 31. Accordingly, it is possible to further reduce wind pressure received during the traveling of the vehicle 1 by at least one of a portion of the power unit 25, a portion of the vehicle body cover 22, a portion of the vehicle body frame 21, a portion of the steering mechanism 7, and a portion of the link mechanism 5, any one of which is located between the right lower edge CDER of the front portion 221*a* of the front cover 221 and the upper edge WUER of the right front wheel 31 as seen from the front in the front-rear direction of the vehicle body frame 21 of the vehicle 1 when the vehicle body frame 21 is in the upright state, and is located above the center CR in the up-down direction of the vehicle body frame 21 between the upper end WUR of the right front wheel 31 and the lower edge MDER of the link mechanism 5 or the steering mechanism 7 directly above the right front wheel 31. It is also possible to directly reduce the air resistance in the behind-front-wheels area S. Accordingly, the right front fender 223R including the function of contributing to reduce wind pressure is made smaller in size.

In addition, air is deflected in the left-right direction of the vehicle body frame 21, along the inclined portion of the left front fender 223L, that is flowing toward at least one of a portion of the power unit 25, a portion of the vehicle body cover 22, a portion of the vehicle body frame 21, a portion of the steering mechanism 7, and a portion of the link mechanism 5, any one of which is located between the left lower edge CDEL of the front portion 221*a* of the front cover 221 and the upper edge WUEL of the left front wheel 32 as seen from the front in the front-rear direction of the vehicle body frame 21 of the vehicle 1 when the vehicle body frame 21 is in the upright state, and is located above the center CL in the up-down direction of the vehicle body frame 21 between the upper end WUL of the left front wheel 32 and the lower edge MDEL of the link mechanism 5 or the steering mechanism 7 directly above the left front wheel 32. Accordingly, it is possible to further reduce the wind pressure received during the traveling of the vehicle 1 by at least one of a portion of the power unit 25, a portion of the vehicle body cover 22, a portion of the vehicle body frame 21, a portion of the steering mechanism 7, and a portion of the link mechanism 5, any one of which is located between the left lower edge CDEL of the front portion 221*a* of the front cover 221 and the upper edge WUEL of the left front wheel 32 as seen from the front in the front-rear direction of the vehicle body frame 21 of the vehicle 1 when the vehicle body frame 21 is in the upright state, and is located above the center CL in the up-down direction of the vehicle body frame 21 between the upper end WUL of the left front wheel 32 and the lower edge MDEL of the link mechanism 5 or the steering mechanism 7 directly above the left front wheel 32. It is also possible to directly reduce the air resistance in the behind-front-wheels area S. Accordingly, the left front fender 223L including the function of contributing to reduce the wind pressure is made smaller in size.

Accordingly, it is possible to decrease the size of the front portion of the vehicle 1 while maintaining the traveling performance of the vehicle 1 including the leanable vehicle body frame 21 and the two front wheels 3.

In the present preferred embodiment, as shown in FIG. 6, at least a portion of the right front fender 223R is disposed behind the front end WFR of the right front wheel 31 in the front-rear direction of the vehicle body frame 21 when the vehicle body frame 21 is in the upright state. In addition, at least a portion of the left front fender 223L is disposed behind the front end WFL of the left front wheel 32 in the front-rear direction of the vehicle body frame 21 when the vehicle body frame 21 is in the upright state.

With this arrangement, it is possible to further reduce the wind pressure received during the traveling of the vehicle 1 by at least one of a portion of the power unit 25, a portion of the vehicle body cover 22, a portion of the vehicle body frame 21, a portion of the steering mechanism 7, and a portion of the link mechanism 5, any one of which is located between the right lower edge CDER of the front portion 221*a* of the front cover 221 and the upper edge WUER of the right front wheel 31 as seen from the front in the front-rear direction of the vehicle body frame 21 of the vehicle 1 when the vehicle body frame 21 is in the upright state, and is located above the center CR in the up-down direction of the vehicle body frame 21 between the upper end WUR of the right front wheel 31 and the lower edge MDER of the link mechanism 5 or the steering mechanism 7 directly above the right front wheel 31. It is also possible to directly reduce the air resistance in the behind-front-wheels area S. Further, the right front wheel 31 and the right front fender 223R are made closer to each other while avoiding interference of the displacing right front wheel 31 with the right front fender 223R. Accordingly, the vehicle 1 equipped with the right front fender 223R including the function of reducing the wind pressure is made smaller in size.

In addition, it is possible to further reduce the wind pressure received during the traveling of the vehicle 1 by at least one of a portion of the power unit 25, a portion of the vehicle body cover 22, a portion of the vehicle body frame 21, a portion of the steering mechanism 7, and a portion of the link mechanism 5, any one of which is located between the left lower edge CDEL of the front portion 221a of the front cover 221 and the upper edge WUEL of the left front wheel 32 as seen from the front in the front-rear direction of the vehicle body frame 21 of the vehicle 1 when the vehicle body frame 21 is in the upright state, and is located above the center CL in the up-down direction of the vehicle body frame 21 between the upper end WUL of the left front wheel 32 and the lower edge MDEL of the link mechanism 5 or the steering mechanism 7 directly above the left front wheel 32. It is also possible to directly reduce the air resistance in the behind-front-wheels area S. Further, the left front wheel 32 and the left front fender 223L are made closer to each other while avoiding interference of the displacing left front wheel 32 with the left front fender 223L. Accordingly, the vehicle 1 equipped with the left front fender 223L including the function of contributing to the reduction in wind pressure is made smaller in size.

Accordingly, it is possible to decrease the size of the front portion of the vehicle 1 while maintaining the traveling performance of the vehicle 1 including the leanable vehicle body frame 21 and the two front wheels 3.

In the present preferred embodiment, as illustrated in FIG. 17, at least a portion of the right front fender 223R is disposed forward of at least one of a portion of the power unit 25, a portion of the vehicle body cover 22, a portion of the vehicle body frame 21, a portion of the steering mechanism 7, and a portion of the link mechanism 5, any one of which is located between the right lower edge CDER of the front portion 221a of the front cover 221 and the upper edge WUER of the right front wheel 31 as seen from the front in the front-rear direction of the vehicle body frame 21 of the vehicle 1 when the vehicle body frame 21 is in the upright state, and is located above the center CR in the up-down direction of the vehicle body frame 21 between the upper end WUR of the right front wheel 31 and the lower edge MDER of the link mechanism 5 or the steering mechanism 7 directly above the right front wheel 31.

In addition, at least a portion of the left front fender 223L is disposed forward of at least one of a portion of the power unit 25, a portion of the vehicle body cover 22, a portion of the vehicle body frame 21, a portion of the steering mechanism 7, and a portion of the link mechanism 5, any one of which is located between the left lower edge CDEL of the front portion 221a of the front cover 221 and the upper edge WUEL of the left front wheel 32 as seen from the front in the front-rear direction of the vehicle body frame 21 of the vehicle 1 when the vehicle body frame 21 is in the upright state, and is located above the center CL in the up-down direction of the vehicle body frame 21 between the upper end WUL of the left front wheel 32 and the lower edge MDEL of the link mechanism 5 or the steering mechanism 7 directly above the left front wheel 32.

With this arrangement, it is possible to further the reduce wind pressure received during the traveling of the vehicle 1 by at least one of a portion of the power unit 25, a portion of the vehicle body cover 22, a portion of the vehicle body frame 21, a portion of the steering mechanism 7, and a portion of the link mechanism 5, any one of which is located between the right lower edge CDER of the front portion 221a of the front cover 221 and the upper edge WUER of the right front wheel 31 as seen from the front in the front-rear direction of the vehicle body frame 21 of the vehicle 1 when the vehicle body frame 21 is in the upright state, and is located above the center CR in the up-down direction of the vehicle body frame 21 between the upper end WUR of the right front wheel 31 and the lower edge MDER of the link mechanism 5 or the steering mechanism 7 directly above the right front wheel 31. It is also possible to directly reduce the air resistance in the behind-front-wheels area S. Further, the right front wheel 31 and the right front fender 223R are made closer to each other while avoiding interference of the displacing right front wheel 31 with the right front fender 223R. Accordingly, the vehicle 1 equipped with the right front fender 223R including the function of reducing the wind pressure is made smaller in size.

In addition, it is possible to further reduce the wind pressure received during the traveling of the vehicle 1 by at least one of a portion of the power unit 25, a portion of the vehicle body cover 22, a portion of the vehicle body frame 21, a portion of the steering mechanism 7, and a portion of the link mechanism 5, any one of which is located between the left lower edge CDEL of the front portion 221a of the front cover 221 and the upper edge WUEL of the left front wheel 32 as seen from the front in the front-rear direction of the vehicle body frame 21 of the vehicle 1 when the vehicle body frame 21 is in the upright state, and is located above the center CL in the up-down direction of the vehicle body frame 21 between the upper end WUL of the left front wheel 32 and the lower edge MDEL of the link mechanism 5 or the steering mechanism 7 directly above the left front wheel 32. It is also possible to directly reduce the air resistance in the behind-front-wheels area S. Further, the left front wheel 32 and the left front fender 223L are made closer to each other while avoiding interference of the displacing left front wheel 32 with the left front fender 223L. Accordingly, the vehicle 1 equipped with the left front fender 223L including the function of reducing the wind pressure is made smaller in size.

Accordingly, it is possible to decrease the size of the front portion of the vehicle 1 while maintaining the traveling performance of the vehicle 1 including the leanable vehicle body frame 21 and the two front wheels 3.

In the present preferred embodiment, as shown in FIG. 17, as seen from the front the vehicle 1 in the front-rear direction of the vehicle body frame 21 when the vehicle body frame 21 is in the upright state, at least a portion of the right front fender 223R is disposed above a center CR in the up-down direction of the vehicle body frame 21 between the upper end WUR of the right front wheel 31 and a right lower edge MDER of the link mechanism 5 or the steering mechanism 7 that is directly above the right front wheel 31, and is disposed below a right lower edge CEDR of the front portion 221a of the front cover 221.

In addition, as seen from the front of the vehicle 1 in the front-rear direction of the vehicle body frame 21 when the vehicle body frame 21 is in the upright state, at least a portion of the left front fender 223L is disposed above a center CL in the up-down direction of the vehicle body frame 21 between the upper end WUL of the left front wheel 32 and a left lower edge MDEL of the link mechanism 5 or the steering mechanism 7 that is directly above the left front wheel 32, and is disposed below a left lower edge CEDL of the front portion 221a of the front cover 221.

With this arrangement, it is possible to directly reduce the wind pressure received during the traveling of the vehicle 1 by at least one of a portion of the power unit 25, a portion of the vehicle body cover 22, a portion of the vehicle body frame 21, a portion of the steering mechanism 7, and a portion of the link mechanism 5, any one of which is located between the right lower edge CDER of the front portion 221a of the front cover 221 and the upper edge WUER of the right front wheel 31 as seen from the front in the front-rear direction of the vehicle body frame 21 of the vehicle 1 when the vehicle body frame 21 is in the upright state, and is located above the center CR in the up-down direction of the vehicle body frame 21 between the upper end WUR of the right front wheel 31 and the lower edge MDER of the link mechanism 5 or the steering mechanism 7 directly above the right front wheel 31. It is also possible to directly reduce the air resistance in the behind-front-wheels area S. Accordingly, the right front fender 223R including the function of reducing the wind pressure is made smaller in size.

In addition, it is possible to directly reduce the wind pressure received during the traveling of the vehicle 1 by at least one of a portion of the power unit 25, a portion of the vehicle body cover 22, a portion of the vehicle body frame 21, a portion of the steering mechanism 7, and a portion of the link mechanism 5, any one of which is located between the left lower edge CDEL of the front portion 221a of the front cover 221 and the upper edge WUEL of the left front wheel 32 as seen from the front in the front-rear direction of the vehicle body frame 21 of the vehicle 1 when the vehicle body frame 21 is in the upright state, and is located above the center CL in the up-down direction of the vehicle body frame 21 between the upper end WUL of the left front wheel 32 and the lower edge MDEL of the link mechanism 5 or the steering mechanism 7 directly above the left front wheel 32. It is also possible to directly reduce the air resistance in the behind-front-wheels area S. Accordingly, the left front fender 223L including the function of reducing the wind pressure is made smaller in size.

Accordingly, it is possible to decrease the size of the front portion of the vehicle 1 while maintaining the traveling performance of the vehicle 1 including the leanable vehicle body frame 21 and the two front wheels 3.

In the present preferred embodiment, as shown in FIG. 17, as seen from the front in the front-rear direction of the vehicle body frame 21 of the vehicle 1 when the vehicle body frame 21 is in the upright state, at least a portion of the right front fender 223R is disposed below the center CR in the up-down direction of the vehicle body frame 21 between the upper end WUR of the right front wheel 31 and the lower edge MDER of the link mechanism 5 or the steering mechanism 7 that is directly above the right front wheel 31, and is disposed above the upper edge WUER of the right front wheel 31.

In addition, as seen from the front in the front-rear direction of the vehicle body frame 21 of the vehicle 1 when the vehicle body frame 21 is in the upright state, at least a portion of the left front fender 223L is disposed below the center CL in the up-down direction of the vehicle body frame 21 between the upper end WUL of the left front wheel 32 and the lower edge MDEL of the link mechanism 5 or the steering mechanism 7 that is directly above the left front wheel 32, and is disposed above the upper edge WUEL of the left front wheel 32.

According to the arrangement described above, as seen from the front in the front-rear direction of the vehicle body frame 21 of the vehicle 1 when the vehicle body frame 21 is in the upright state, at least a portion of the right front fender 223R is disposed below the center CR in the up-down direction of the vehicle body frame 21 between the upper end WUR of the right front wheel 31 and the lower edge MEDR of the link mechanism 5 or the steering mechanism 7 that is directly above the right front wheel 31, and is disposed upward than the upper edge WUER of the right front wheel 31. Since the right front fender 223R that is displaced relative to the vehicle body frame is disposed both above and below the center CR, the function of contributing to the wind pressure reduction is ensured even though the right front fender 223R is small. In addition, it is possible to ensure the function of reducing the air resistance in the behind-front-wheels area S. Here, the portion below the center CR is spaced farther away from the front cover 221 that is displaced relative to the vehicle body frame 21 than the portion above the center CR. Accordingly, even though a portion of the right front fender 223R is disposed below the center CR, interference of the right front fender 223R with the front cover 221 is avoided.

In addition, as seen from the front in the front-rear direction of the vehicle body frame 21 of the vehicle 1 when the vehicle body frame 21 is in the upright state, at least a portion of the left front fender 223L is disposed below the center CL in the up-down direction of the vehicle body frame 21 between the upper end WUL of the left front wheel 32 and the lower edge MDEL of the link mechanism 5 or the steering mechanism 7 that is directly above the left front wheel 32, and is disposed above the upper edge WUEL of the left front wheel 32. Since the left front fender 223L that is displaced relative to the vehicle body frame 21 is disposed both above and below the center CL, the function of contributing to the wind pressure reduction is ensured even though the left front fender 223L is small. In addition, it is possible to ensure the function of reducing the air resistance in the behind-front-wheels area S. Here, the portion below the center CL is spaced farther away from the front cover 221 that is not displaced relative to the vehicle body frame 21 than the portion higher than the center CL. Accordingly, even though a portion of the left front fender 223L is disposed below the center CL, interference of the left front fender 223L with the front cover 221 is avoided.

Accordingly, it is possible to decrease the size of the front portion of the vehicle 1 while maintaining the traveling performance of the vehicle 1 including the leanable vehicle body frame 21 and the two front wheels 3.

In the present preferred embodiment, the right front fender 223R includes at least a portion of a fender function to cover at least a portion of an upper surface of the right front wheel 31 and to reduce or prevent the scattering of muddy water or the like that is kicked up by the right front wheel 31. In addition, the left front fender 223L includes at least a portion of a fender function to cover at least a portion of an upper surface of the left front wheel 32 and to reduce or prevent the scattering of muddy water or the like that is kicked up by the left front wheel 32.

With this configuration, it is possible to directly reduce the wind pressure received during the traveling of the vehicle 1 by at least one of a portion of the power unit 25, a portion of the vehicle body cover 22, a portion of the vehicle body frame 21, a portion of the steering mechanism 7, and a portion of the link mechanism 5, any one of which is located between the right lower edge CDER of the front portion 221a of the front cover 221 and the upper edge WUER of the right front wheel 31 as seen from the front in the front-rear direction of the vehicle body frame 21 of the vehicle 1 when the vehicle body frame 21 is in the upright state, and is located above the center CR in the up-down direction of the vehicle body frame 21 between the upper end WUR of the right front wheel 31 and the lower edge MDER of the link mechanism 5 or the steering mechanism 7 directly above the right front wheel 31. It is also possible to directly reduce the air resistance in the behind-front-wheels area S. Accordingly, the right front fender 223R including the function of reducing the wind pressure is made smaller in size. In addition, since a portion of the fender function for the right front wheel 31 is provided by the right front fender 223R, it is possible to enhance the degree of freedom in the design of the right aerodynamic portion and the right front fender. Moreover, since a portion of the function of the right aerodynamic portion is provided by the right front fender of the right front wheel, it is possible to enhance the degree of freedom in the design of the right aerodynamic portion and the right front fender. Accordingly, compared with a case where individual portions are prepared for each of the functions, the overall configuration is made smaller while ensuring the same functions.

In addition, it is possible to directly reduce the wind pressure received during the traveling of the vehicle 1 by at least one of a portion of the power unit 25, a portion of the vehicle body cover 22, a portion of the vehicle body frame 21, a portion of the steering mechanism 7, and a portion of the link mechanism 5, any one of which is located between the left lower edge CDEL of the front portion 221a of the front cover 221 and the upper edge WUEL of the left front wheel 32 as seen from the front in the front-rear direction of the vehicle body frame 21 of the vehicle 1 when the vehicle body frame 21 is in the upright state, and is located above the center CL in the up-down direction of the vehicle body frame 21 between the upper end WUL of the left front wheel 32 and the lower edge MDEL of the link mechanism 5 or the steering mechanism 7 directly above the left front wheel 32. It is also possible to directly reduce the air resistance in the behind-front-wheels area S. Accordingly, the left front fender 223L including the function of reducing the wind pressure is made smaller in size. Since a portion of a fender function for the left front wheel 32 is provided by the left front fender 223L, it is possible to enhance the degree of freedom in the design of the left aerodynamic portion and the left front fender. Moreover, since a portion of the function of the left aerodynamic portion is provided by the left front fender of the left front wheel, it is possible to enhance the degree of freedom in the design of the left aerodynamic portion and the left front fender. Accordingly, compared with a case where individual portions are prepared for each of the functions, the overall configuration is made smaller while ensuring the same functions.

Accordingly, it is possible to decrease the size of the front portion of the vehicle 1 while maintaining traveling performance of the vehicle 1 including the leanable vehicle body frame 21 and the two front wheels 3.

In the present preferred embodiment, as has been described with reference to FIGS. 5 and 6, the right front fender 223R and the left front fender 223L are fixed to the right bracket 317 and the left bracket 327, respectively.

According to this configuration, since the right front fender 223R and the left front fender 223L are moved directly in accordance with the operation of the link mechanism 5, the right front fender 223R and the left front fender 223L are easily made small in size. Accordingly, it is possible to decrease the size of the front portion of the vehicle 1 while maintaining the traveling performance of the vehicle 1 including the leanable vehicle body frame 21 and the two front wheels 3.

The portion defining and serving as the right aerodynamic portion may be fixed to a portion other than the right bracket 317 as long as it is possible to reduce the wind pressure received during the traveling of the vehicle 1 by at least one of a portion of the power unit 25, a portion of the vehicle body cover 22, a portion of the vehicle body frame 21, a portion of the steering mechanism 7, and a portion of the link mechanism 5, any one of which is located between the right lower edge CDER of the front portion 221a of the front cover 221 and the upper edge WUER of the right front wheel 31 as seen from the front in the front-rear direction of the vehicle body frame 21 of the vehicle 1 when the vehicle body frame 21 is in the upright state, and is located above the center CR in the up-down direction of the vehicle body frame 21 between the upper end WUR of the right front wheel 31 and the lower edge MDER of the link mechanism 5 or the steering mechanism 7 directly above the right front wheel 31. For example, the portion defining and serving as the right aerodynamic portion may be fixed to any one of a right shock absorber 33 and a steering force transmission mechanism 6. Here, the steering force transmission mechanism 6 includes the middle transmission plate 61, the right transmission plate 62, the middle joint 64, the right joint 65, and the tie rod 67.

In addition, the portion defining and serving as the left aerodynamic portion may be fixed to a portion other than the left bracket 327 as long as it is possible to reduce the wind pressure received during the traveling of the vehicle 1 by at least one of a portion of the power unit 25, a portion of the vehicle body cover 22, a portion of the vehicle body frame 21, a portion of the steering mechanism 7, and a portion of the link mechanism 5, any one of which is located between the left lower edge CDEL of the front portion 221a of the front cover 221 and the upper edge WUEL of the left front wheel 32 as seen from the front in the front-rear direction of the vehicle body frame 21 of the vehicle 1 when the vehicle body frame 21 is in the upright state, and is located above the center CL in the up-down direction of the vehicle body frame 21 between the upper end WUL of the left front wheel 32 and the lower edge MDEL of the link mechanism 5 or the steering mechanism 7 directly above the left front wheel 32. For example, the portion defining and serving as the left aerodynamic portion may be fixed to any one of a left shock absorber 35 and the steering force transmission mechanism 6. Here, the steering force transmission mechanism 6 includes the middle transmission plate 61, the left transmission plate 63, the middle joint 64, the left joint 66, and the tie rod 67.

Figure 11:
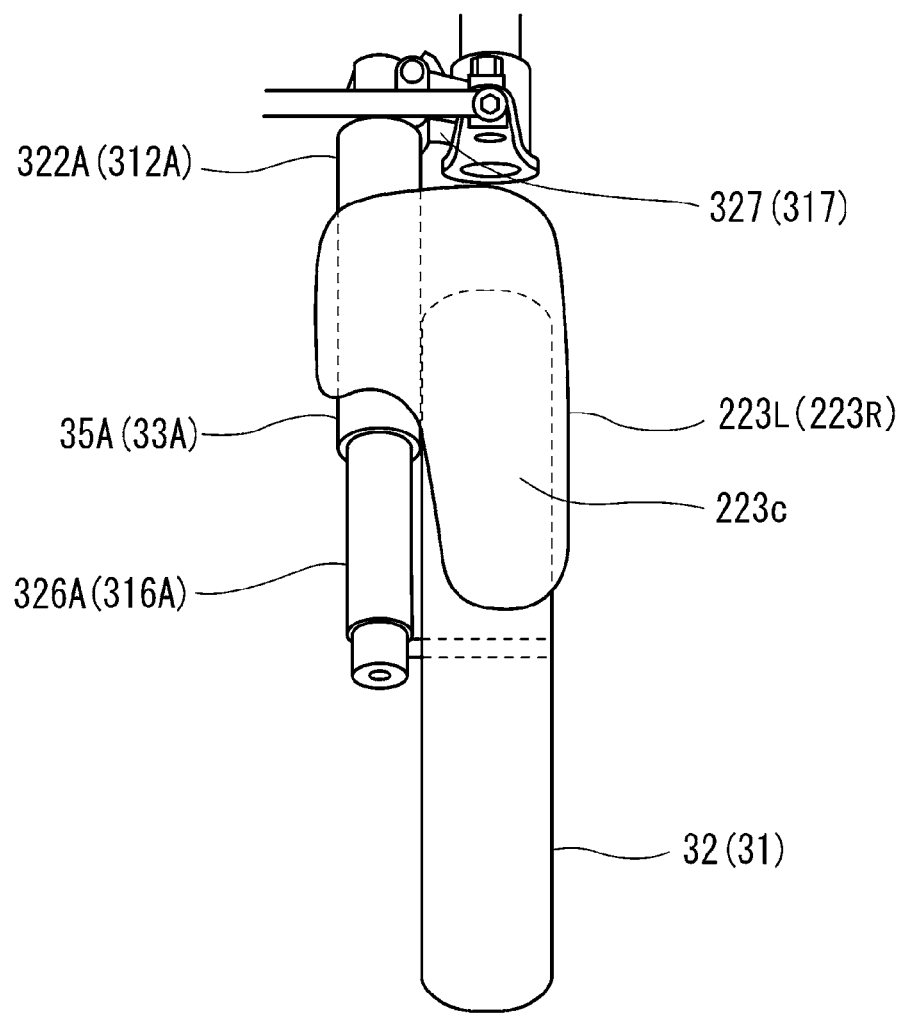
FIG. 11 is a view showing a modified example of the vehicle shown in FIG. 1.

For example, in a modified example shown in FIG. 11, aright front fender 223R and a left front fender 223L are fixed to upper portions of left and right shock absorbers, respectively.

A left shock absorber 35A according to a modified example includes a left outer tube 322A (one example of the upper portion of the left shock absorber) and a left inner tube 326A (one example of the lower portion of the left shock absorber). An upper portion of the left outer tube 322A is fixed to a left bracket 327. The left inner tube 326A is disposed directly below the left outer tube 322A when a portion of the left inner tube 326A is inserted into the left outer tube 322A. The left inner tube 326A supports a left front wheel 32.

The left front fender 223L according to a modified example includes a portion that extends farther rightward in a left-right direction of a vehicle body frame 21 than the left front wheel 32, as seen from the front of the vehicle 1 when the vehicle body frame 21 is in the upright state. The left front fender 223L is fixed to the left outer tube 322A.

Although not shown, a right shock absorber 33A according to a modified example includes a configuration that is preferably symmetrical with that of the left shock absorber 35A in relation to the left-right direction. More specifically, the right shock absorber 33A according to a modified example includes a right outer tube 312A (one example of the upper portion of the right shock absorber) and a right inner tube 316A (one example of the lower portion of the right shock absorber). An upper portion of the right outer tube 312A is fixed to a right bracket 317. The right inner tube 316A is disposed directly below the right outer tube 312A when a portion of the right inner tube 316A is inserted into the right outer tube 312A. The right inner tube 316A supports a right front wheel 31.

Although not shown, the right front fender 223R preferably has a configuration that is symmetrical with that of the left front fender 223L in relation to the left-right direction. More specifically, the right front fender 223R includes a portion that extends farther leftward in the left-right direction of the vehicle body frame 21 than the right front wheel 31, as seen from the front of the vehicle 1 when the vehicle body frame 21 is in the upright state. The right front fender 223R is fixed to the right outer tube 312A.

With this configuration, even when the right front wheel 31 is displaced in the up-down direction of the vehicle body frame 21 due to the operation of the right shock absorber 33, the right front fender 223R is not displaced in the same direction in accordance with the displacement of the right front wheel 31. Accordingly, it is possible to further reduce the wind pressure received during the traveling of the vehicle 1 by at least one of a portion of the power unit 25, a portion of the vehicle body cover 22, a portion of the vehicle body frame 21, a portion of the steering mechanism 7, and a portion of the link mechanism 5, any one of which is located between the right lower edge CDER of the front portion 221a of the front cover 221 and the upper edge WUER of the right front wheel 31 as seen from the front in the front-rear direction of the vehicle body frame 21 of the vehicle 1 when the vehicle body frame 21 is in the upright state, and is located above the center CR in the up-down direction of the vehicle body frame 21 between the upper end WUR of the right front wheel 31 and the lower edge MDER of the link mechanism 5 or the steering mechanism 7 directly above the right front wheel 31. It is also possible to directly reduce air resistance in the behind-front-wheels area S. Accordingly, the right front fender 223R including the function of reducing the wind pressure is made smaller in size.

In addition, even when the left front wheel 32 is displaced in the up-down direction of the vehicle body frame 21 due to the operation of the left shock absorber 35, the left front fender 223L is not displaced in the same direction in accordance with the displacement of the left front wheel 32. Accordingly, it is possible to further reduce the wind pressure received during the traveling of the vehicle 1 by at least one of a portion of the power unit 25, a portion of the vehicle body cover 22, a portion of the vehicle body frame 21, a portion of the steering mechanism 7, and a portion of the link mechanism 5, any one of which is located between the left lower edge CDEL of the front portion 221a of the front cover 221 and the upper edge WUEL of the left front wheel 32 as seen from the front in the front-rear direction of the vehicle body frame 21 of the vehicle 1 when the vehicle body frame 21 is in the upright state, and is located above the center CL in the up-down direction of the vehicle body frame 21 between the upper end WUL of the left front wheel 32 and the lower edge MDEL of the link mechanism 5 or the steering mechanism 7 directly above the left front wheel 32. It is also possible to directly reduce the air resistance in the behind-front-wheels area S. Accordingly, the left front fender 223L including the function of reducing the wind pressure is made smaller in size.

Accordingly, it is possible to decrease the size of the front portion of the vehicle 1 while maintaining the traveling performance of the vehicle 1 including the leanable vehicle body frame 21 and the two front wheels 3.

The shape of the right front fender 223R may be appropriately selected as long as it is possible to reduce the wind pressure received during the traveling of the vehicle 1 by at least one of a portion of the power unit 25, a portion of the vehicle body cover 22, a portion of the vehicle body frame 21, a portion of the steering mechanism 7, and a portion of the link mechanism 5, any one of which is located between the right lower edge CDER of the front portion 221a of the front cover 221 and the upper edge WUER of the right front wheel 31 as seen from the front in the front-rear direction of the vehicle body frame 21 of the vehicle 1 when the vehicle body frame is in the upright state, and is located above the center CR in the up-down direction of the vehicle body frame 21 between the upper end WUR of the right front wheel 31 and the lower edge MDER of the link mechanism 5 or the steering mechanism 7 directly above the right front wheel 31.

The shape of the left front fender 223L may be appropriately selected as long as it is possible to reduce the wind pressure received during the traveling of the vehicle 1 by at least one of a portion of the power unit 25, a portion of the vehicle body cover 22, a portion of the vehicle body frame 21, a portion of the steering mechanism 7, and a portion of the link mechanism 5, any one of which is located between the left lower edge CDEL of the front portion 221a of the front cover 221 and the upper edge WUEL of the left front wheel 32 as seen from the front in the front-rear direction of the vehicle body frame 21 of the vehicle 1 when the vehicle body frame is in the upright state, and is located above the center CL in the up-down direction of the vehicle body frame 21 between the upper end WUL of the left front wheel 32 and the lower edge MDEL of the link mechanism 5 or the steering mechanism 7 directly above the left front wheel 32. At least one of a portion of the power unit 25, a portion of the vehicle body cover 22, a portion of the vehicle body frame 21, a portion of the steering mechanism 7, and a portion of the link mechanism 5, any one of which is located between the right lower edge CDER of the front portion 221a of the front cover 221 and the upper edge WUER of the right front wheel 31 as seen from the front side in the front-rear direction of the vehicle body frame 21 of the vehicle 1 when the vehicle body frame is in the upright state is located above the center CR in the up-down direction of the vehicle body frame 21 between the upper end WUR of the right front wheel 31 and the lower edge MDER of the link mechanism 5 or the steering mechanism 7 directly above the right front wheel 31.

Figures 9A, 9B, 9C:
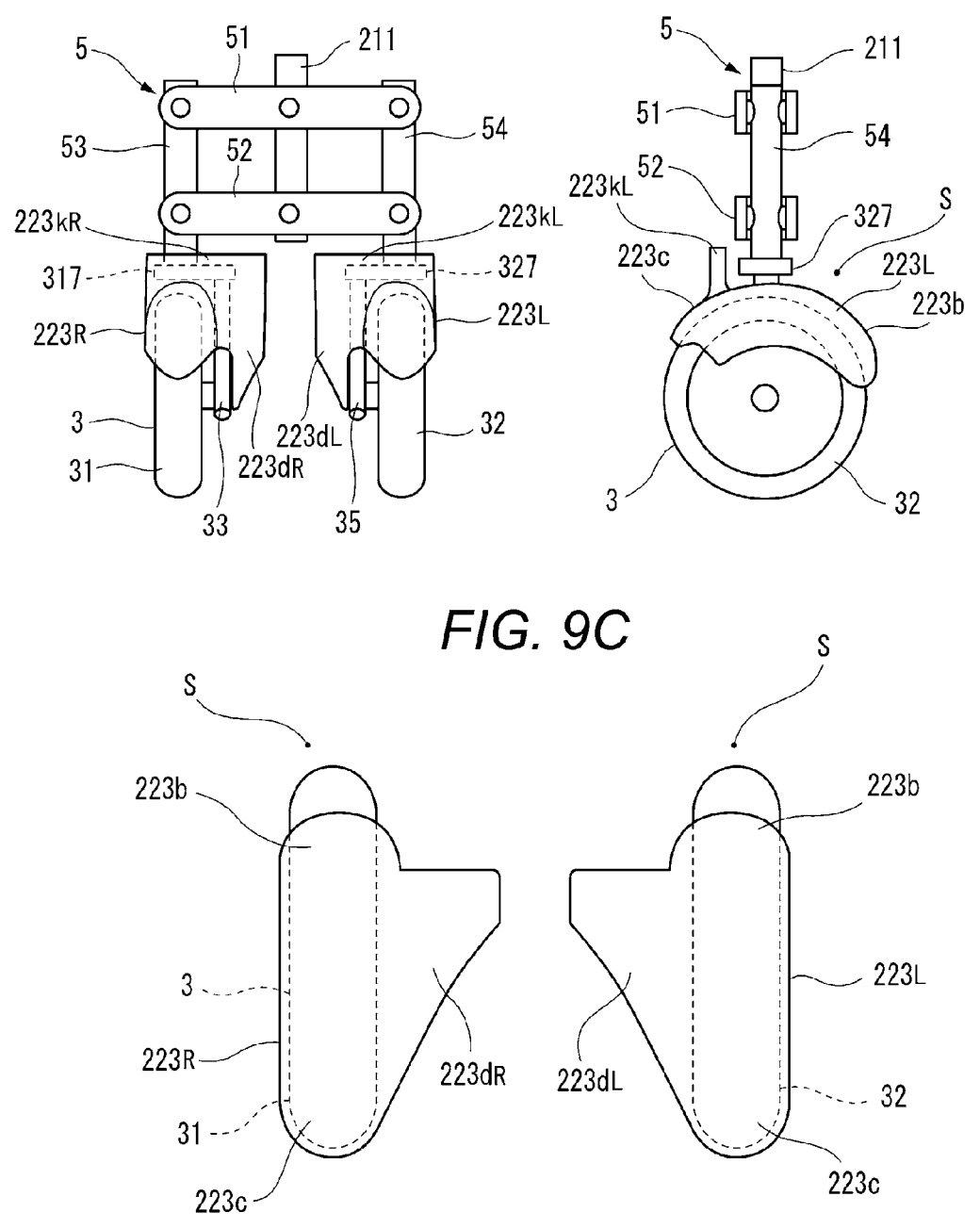

Referring to FIGS. 9A-9C, 10A, and 10B, such a modified example will be described. FIGS. 9A-9C, 10A, and 10B are front views that schematically show a portion of the configuration of the modified example. FIG. 9A is a front view wherein the configuration is seen from the front in a front-rear direction of the vehicle body frame 21. FIG. 9B is a left side view wherein the configuration is seen from the left in a left-right direction of the vehicle body frame 21. FIG. 9C is a plan view wherein a right front fender 223R and a left front fender 223L according this modified example are seen from above in the up-down direction of the vehicle body frame 21.

The right front fender 223R according to the modified example includes a first right projecting portion 223dR that extends farther leftward in the left-right direction of the vehicle body frame 21 than a right front wheel 31, and includes a second projecting portion 223kR that extends farther upward in the up-down direction of the vehicle body frame 21 than the right front wheel 31, as seen from the front of the vehicle 1 when the vehicle body frame 21 is in the upright state.

The left front fender 223L according to the modified example includes a first left projecting portion 223dL that extends farther rightward in the left-right direction of the vehicle body frame 21 than a left front wheel 32, and includes a second projecting portion 223kL that extends farther upward in the up-down direction of the vehicle body frame 21 than the left front wheel 32, as seen from the front of the vehicle 1 when the vehicle body frame 21 is in the upright state.

The first right projecting portion 223dR, the second right projecting portion 223kR, the first left projecting portion 223dL, and the second left projecting portion 223kL are displaced relative to the vehicle body frame 21 in accordance with the operation of a steering mechanism 7. As shown in FIG. 7, when the rider operates the handlebar 23, via the steering force transmission mechanism 6, the right bracket 317 and the left bracket 327 are turned relative to the right side member 53 and the left side member 54 about the right center axis X and the left center axis Y, respectively. This causes the right front fender 223R and the left front fender 223L that are connected to the right bracket 317 and the left bracket 327 via the stud bolts 223a to turn about the right center axis X and the left center axis Y relative to the right side member 53 and the left side member 54. Consequently, the first right projecting portion 223dR, the second right projecting portion 223kR, the first left projecting portion 223dL, and the second left projecting portion 223kL are displaced in the left-right direction of the vehicle body frame 21 in accordance with the operation of the steering mechanism 7.

As shown in FIG. 8, when the rider causes the vehicle 1 to lean leftward, the link mechanism 5 operates. The positions of the right bracket 317 and the left bracket 327 relative to the vehicle body frame 21 are changed in the up-down direction of the vehicle body frame 21 in accordance with the operation of the link mechanism 5. This causes the right front fender 223R and the left front fender 223L that are fixed to the right bracket 317 and the left bracket 327, respectively, to change their relative positions to the vehicle body frame 21 in the up-down direction of the vehicle body frame 21. Consequently, the first right projecting portion 223dR, the second right projecting portion 223kR, the first left projecting portion 223dL, and the second left projecting portion 223kL are displaced relative to the vehicle body frame 21 in accordance with the operation of the link mechanism 5.

The first right projecting portion 223dR and the second left projecting portion 223dL are disposed and shaped so that the first right projecting portion 223dR and the first left projecting portion 223dL are prevented from interfering with each other even though the first right projecting portion 223dR and the first left projecting portion 223dL are displaced relative to the vehicle body frame 21 according to the steering operation and the leaning operation that are described above.

The right front fender 223R may be fixed to a right outer tube 312 (one example of the lower portion of the right shock absorber) of a right shock absorber 33. The left front fender 223L may be fixed to a left outer tube 322 (one example of the lower portion of the left shock absorber) of a left shock absorber 35. Here, the right front fender 223R may also be displaced relative to the vehicle body frame 21 by being displaced in the same direction as a right shock absorber 33 extends or contract. Similarly, the left front fender 223L may also be displaced relative to the vehicle body frame 21 by being displaced in the same direction as a left shock absorber 35 extends or contract.

Figure 12:
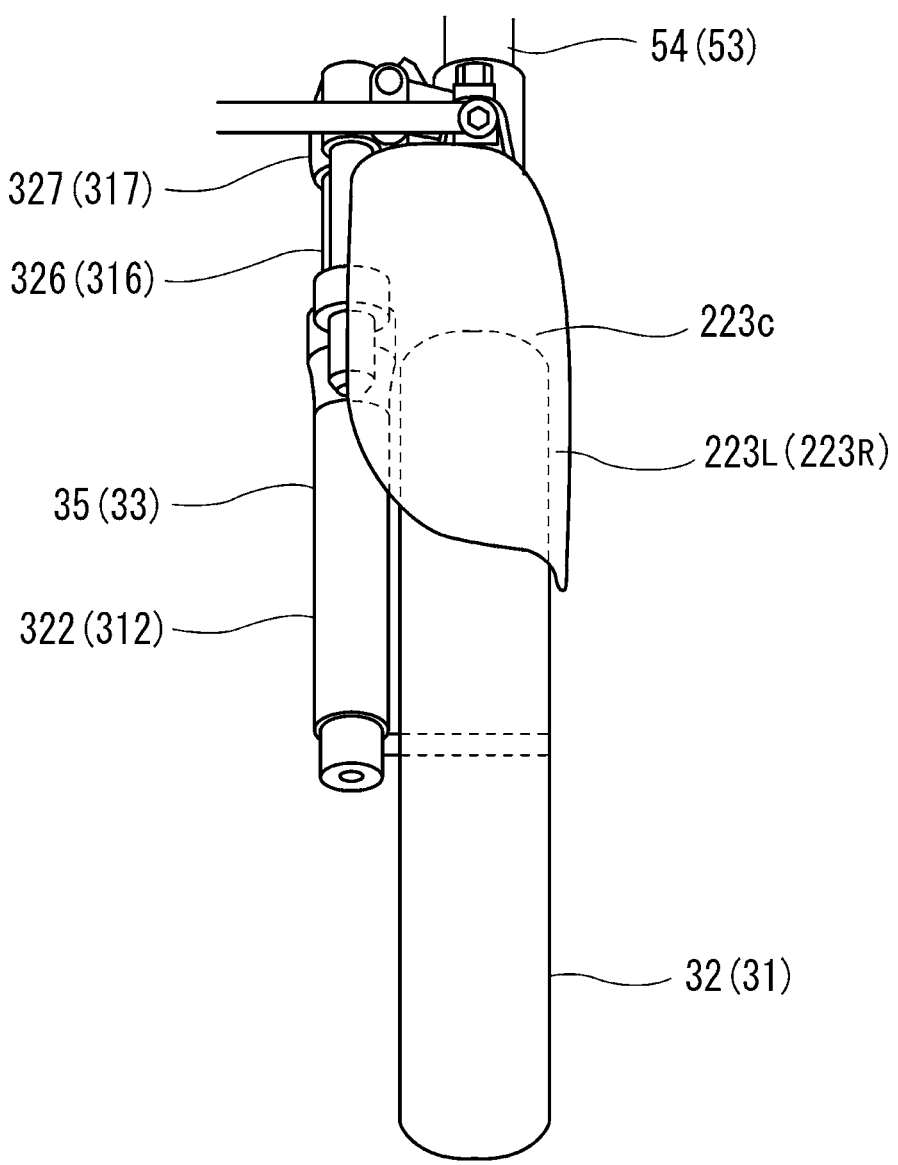
FIG. 12 is a view showing a modified example of the vehicle shown in FIG. 1.

Additionally, as shown in one example shown in FIG. 12, the left front fender 223L is preferably integral and unitary with the left bracket 327. Although not shown, the right front fender 223R according to this modified example may also be integral and unitary with the right bracket 317.

The terms and expressions that are used herein are used to describe the preferred embodiments of the present invention and hence should not be construed as limiting the scope of the present invention. It should be understood that any equivalents to the characteristic matters that are shown and described herein should not be excluded and that various modifications made within the scope of claims to be made later are permitted.

The expressions "divide" and "separate" used in the above explanations are not intended to exclusively indicate a case where the function to cover at least a portion of the link mechanism 5 is completely divided or separated from the function to contribute to the wind pressure reduction. It is not excluded a case where the link cover portion includes the function to contribute to the wind pressure reduction. It is not excluded a case where each of the right aerodynamic portion and the left aerodynamic portion includes the function to cover at least a portion of the link mechanism.

When referred to in this specification, the "parallel or substantially parallel" line also includes two straight lines which do not intersect each other as members while they are inclined within the range of about ±40 degrees, for example. When referred to in relation to the "direction," and the "member" in the present invention, the term "along" also includes a case where the direction and the member are inclined within the range of about ±40 degrees, for example. When referred to in relation to the "direction" in the present invention, the term "extend" also includes a case where the direction is inclined within the range of about ±40 degrees, for example.

The present invention is implemented with many different preferred embodiments. This disclosure should be regarded as provision of the preferred embodiments based on the principle of the present invention. Based on the understanding that the preferred embodiments which are described and/or illustrated herein are not intended to limit the present invention thereto, several preferred embodiments are described and illustrated herein.

Several illustrated preferred embodiments of the present invention are described herein. The present invention should not be limited to the preferred embodiments described herein. The present invention includes every preferred embodiment that includes equivalent elements, modifications, deletions, combinations (for example, combinations of characteristics that are common to various preferred embodiments), improvements and/or modifications that those skilled in the art to which the present invention pertains can recognize based on the disclosure made herein. Matters limited by claims should be construed widely based on terms that are used in the claims and should not be limited to the preferred embodiments described in this description or the prosecution of this patent application. Such preferred embodiments are interpreted to be non-exclusive. For example, in this disclosure, the terms "preferred," "preferable" and "good" should be construed as being non-exclusive and those terms indicate, respectively, "preferred but not limited to," "preferable but not limited thereto" and "good but not limited thereto."

The vehicle according to the preferred embodiments of the present invention is preferably a vehicle including a leanable vehicle body frame and two front wheels. The number of rear wheels is not limited to one, and may be two.

In a preferred embodiment, a center in the left-right direction of the vehicle body frame 21 of the rear wheel 4 coincides with a center in the left-right direction of the vehicle body frame 21 of the space defined between the right front wheel 31 and the left front wheel 32. Although the configuration described above is preferable, the center in the left-right direction of the vehicle body frame 21 of the rear wheel 4 does not have to coincide with the center in the left-right direction of the vehicle body frame 21 of the space defined between the right front wheel 31 and the left front wheel 32.

The link mechanism 5 may further include a cross member other than the upper cross member 51 and the lower cross member 52. The "upper cross member" and the "lower cross member" are merely so called based on their relative positions in the up-down direction. The upper cross member is not necessarily an uppermost cross member of the link mechanism 5. The upper cross member indicates a cross member that is above another cross member that is below. The lower cross member is not necessarily a lowermost cross member of the link mechanism 5. The lower cross member indicates a cross member that is below another cross member that is above. At least one of the upper cross member 51 and the lower cross member 52 may include two portions such as a right cross member and a left cross member. In this way, the upper cross member 51 and the lower cross member 52 may include a plurality of cross members, as long as the linkage function is realized.

The portion that defines the right aerodynamic portion does not have to be the right front fender 223R that is included in the vehicle body cover 22. The right aerodynamic portion may include a plurality of rods or a group of fins, as long as it is possible to ensure the function of reducing the wind pressure received during the traveling of the vehicle 1 by at least one of a portion of the power unit 25, a portion of the vehicle body cover 22, a portion of the vehicle body frame 21, a portion of the steering mechanism 7, and a portion of the link mechanism 5, any one of which is located between the right lower edge CDER of the front portion 221a of the front cover 221 and the upper edge WUER of the right front wheel 31 as seen from the front in the front-rear direction of the vehicle body frame 21 of the vehicle 1 when the vehicle body frame 21 is in the upright state, and is located above the center CR in the up-down direction of the vehicle body frame 21 between the upper end WUR of the right front wheel 31 and the lower edge MDER of the link mechanism 5 or the steering mechanism 7 directly above the right front wheel 31. Here, the material of the right aerodynamic portion is not limited to resins but metals or the like may be used.

The portion that defines the left aerodynamic portion does not have to be the left front fender 223L that is included in the vehicle body cover 22. The left aerodynamic portion may include a plurality of rods or a group of fins, as long as it is possible to ensure the function of reducing the wind pressure received during the traveling of the vehicle 1 by at least one of a portion of the power unit 25, a portion of the vehicle body cover 22, a portion of the vehicle body frame 21, a portion of the steering mechanism 7, and a portion of the link mechanism 5, any one of which is located between the left lower edge CDEL of the front portion 221a of the front cover 221 and the upper edge WUEL of the left front wheel 32 as seen from the front in the front-rear direction of the vehicle body frame 21 of the vehicle 1 when the vehicle body frame is in the upright state, and is located above the center CL in the up-down direction of the vehicle body frame 21 between the upper end WUL of the left front wheel 32 and the lower edge MDEL of the link mechanism 5 or the steering mechanism 7 directly above the left front wheel 32. At least one of a portion of the power unit 25, a portion of the vehicle body cover 22, a portion of the vehicle body frame 21, a portion of the steering mechanism 7, and a portion of the link mechanism 5, any one of which is located between the right lower edge CDER of the front portion 221a of the front cover 221 and the upper edge WUER of the right front wheel 31 as seen from the front side in the front-rear direction of the vehicle body frame 21 of the vehicle 1 when the vehicle body frame is in the upright state is located higher than the center CR in the up-down direction of the vehicle body frame 21 between the upper end WUR of the right front wheel 31 and the lower edge MDER of the link mechanism 5 or the steering mechanism 7 in the upper side of the right front wheel 31. Here, the material of the left aerodynamic portion is not limited to resins but metals or the like may be used.

This application claims priority to Japanese Patent Application No. 2012-276256 filed on Dec. 18, 2012, the entire contents of which are incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:
1. A vehicle comprising:
  a vehicle body frame;
  a handlebar configured to turn relative to the vehicle body frame;
  a vehicle body cover, at least a portion of which covers the vehicle body frame;
  a right front wheel and a left front wheel arranged side by side in a left-right direction of the vehicle body frame;
  a steering mechanism configured to transmit a turning motion of the handlebar to the right front wheel and the left front wheel;
  a link mechanism disposed above the right front wheel and the left front wheel, and configured to cause the vehicle body frame to lean relative to a vertical direction by changing positions of the right front wheel and the left front wheel relative to the vehicle body frame; and
  a power unit supported by the vehicle body frame and including a drive source; wherein the vehicle body cover includes:
- a link cover portion covering at least a portion of the link mechanism, configured to not be displaced relative to the vehicle body frame, including a front portion disposed forward of rear ends of the right front wheel and the left front wheel in a front-rear direction of the vehicle body frame, and as seen from a front in the front-rear direction of the vehicle body frame when the vehicle body frame is in an upright state, configured such that a right lower edge of the front portion directly above the right front wheel is disposed above a lower end of the link mechanism or the steering mechanism in an up-down direction of the vehicle body frame, and such that a left lower edge of the front portion directly above the left front wheel is disposed above a lower end of the link mechanism or the steering mechanism in the up-down direction of the vehicle body frame;
- a right aerodynamic portion configured to be displaced relative to the vehicle body frame in accordance with an operation of the link mechanism, configured to reduce wind pressure received during travelling of the vehicle by at least one of a portion of the link mechanism, a portion of the steering mechanism, a portion of the vehicle body frame, a portion of the vehicle body cover, and a portion of the power unit, any one of which is located between an upper edge of the right front wheel and the right lower edge of the front portion of the link cover portion, and is located above a center in the up-down direction of the vehicle body frame between an upper end of the right front wheel and a lower edge of the link mechanism or the steering mechanism directly above the right front wheel as seen from the front in the front-rear direction of the vehicle body frame when the vehicle body frame is in the upright state; and
- a left aerodynamic portion configured to be displaced relative to the vehicle body frame in accordance with the operation of the link mechanism, configured to reduce wind pressure received during travelling of the vehicle by at least one of a portion of the link mechanism, a portion of the steering mechanism, a portion of the vehicle body frame, a portion of the vehicle body cover, and a portion of the power unit, any one of which is located between an upper edge of the left front wheel and the left lower edge of the front portion of the link cover portion, and is located above a center in the up-down direction of the vehicle body frame between an upper end of the left front wheel and a lower edge of the link mechanism or the steering mechanism directly above the left front wheel as seen from the front in the front-rear direction of the vehicle body frame when the vehicle body frame is in the upright state.

2. The vehicle as set forth in claim 1, wherein a front edge of the right aerodynamic portion is inclined such that at least one of an upper end thereof and a lower end thereof is located behind a front end thereof as seen from a side of the vehicle body frame when the vehicle body frame is in the upright state; and
- a front edge of the left aerodynamic portion is inclined such that at least one of an upper end thereof and a lower end thereof is located behind a front end thereof as seen from the side of the vehicle body frame when the vehicle body frame is in the upright state.

3. The vehicle as set forth in claim 1, wherein a front edge of the right aerodynamic portion is inclined such that at least one of a right end thereof and a left end thereof is located behind a front end thereof as seen from above the vehicle body frame when the vehicle body frame is in the upright state; and
- a front edge of the left aerodynamic portion is inclined such that at least one of a right end thereof and a left end thereof is located behind a front end thereof as seen from above the vehicle body frame when the vehicle body frame is in the upright state.

4. The vehicle as set forth in claim 1, wherein at least a portion of the right aerodynamic portion is disposed behind a front end of the right front wheel in the front-rear direction of the vehicle body frame when the vehicle body frame is in the upright state; and
- at least a portion of the left aerodynamic portion is disposed behind a front end of the left front wheel in the front-rear direction of the vehicle body frame when the vehicle body frame is in the upright state.

5. The vehicle as set forth in claim 1, wherein at least a portion of the right aerodynamic portion is disposed farther forward of the front-rear direction of the vehicle body frame than at least one of portion of the link mechanism, a portion of the steering mechanism, a portion of the vehicle body frame, a portion of the vehicle body cover, and a portion of the power unit, any one of which is located between the upper edge of the right front wheel and the right lower edge of the front portion of the link cover portion, and is located above the center in the up-down direction of the vehicle body frame between an upper end of the right front wheel and a lower edge of the link mechanism or the steering mechanism directly above the right front wheel as seen from the front in the front-rear direction of the vehicle body frame when the vehicle body frame is in the upright state; and
- at least a portion of the left aerodynamic portion is disposed forward of at least one of a portion of the link mechanism, a portion of the steering mechanism, a portion of the vehicle body frame, a portion of the vehicle body cover, and a portion of the power unit, any one of which is located between the upper edge of the left front wheel and the left lower edge of the front portion of the link cover portion, and is located above the center in the up-down direction in the vehicle body frame between an upper end of the left front wheel and a lower edge of the link mechanism or the steering mechanism directly above the left front wheel as seen from the front in the front-rear direction of the vehicle body frame when the vehicle body frame is in the upright state.

6. The vehicle as set forth in claim 1, wherein the steering mechanism includes:
- a right shock absorber supporting the right front wheel at a lower portion thereof, and configured to buffer displacement of the right front wheel in the up-down direction of the vehicle body frame relative to an upper portion thereof;
- a left shock absorber supporting the left front wheel at a lower portion thereof, and configured to buffer displacement of the left front wheel in the up-down direction of the vehicle body frame relative to an upper portion thereof;
- a right bracket to which the upper portion of the right shock absorber is fixed;
- a left bracket to which the upper portion of the left shock absorber is fixed;

a steering shaft to which the handlebar is attached; and a transmission mechanism configured to transmit a turning motion of steering shaft to the right bracket and the left bracket; wherein the right aerodynamic portion is fixed to any one of the link mechanism, the right shock absorber, the right bracket, and the transmission mechanism; and the left aerodynamic portion is fixed to any one of the link mechanism, the left shock absorber, the left bracket, and the transmission mechanism.

7. The vehicle as set forth in claim 6, wherein the right aerodynamic portion is fixed to the upper portion of the right shock absorber, and the left aerodynamic portion is fixed to the upper portion of the left shock absorber.

8. The vehicle as set forth in claim 1, wherein at least a portion of the right aerodynamic portion is disposed above the center in the up-down direction of the vehicle body frame between the upper end of the right front wheel and the lower edge of the link mechanism or the steering mechanism directly above the right front wheel, and is disposed below the right lower edge of the front portion of the link cover portion as seen from the front in the front-rear direction of the vehicle body frame when the vehicle body frame is in the upright state; and at least a portion of the left aerodynamic portion is disposed above the center in the up-down direction of the vehicle body frame between the upper end of the left front wheel and the lower edge of the link mechanism or the steering mechanism directly above the left front wheel, and is disposed below the left lower edge of the front portion of the link cover portion as seen from the front in the front-rear direction of the vehicle body frame when the vehicle body frame is in the upright state.

9. The vehicle as set forth in claim 8, wherein at least a portion of the right aerodynamic portion is disposed below the center in the up-down direction of the vehicle body frame between the upper end of the right front wheel and the lower edge of the link mechanism or the steering mechanism directly above the right front wheel, and is disposed above an upper edge of the right front wheel as seen from the front in the front-rear direction of the vehicle body frame when the vehicle body frame is in the upright state; and at least a portion of the left aerodynamic portion is disposed below the center in the up-down direction of the vehicle body frame between the upper end of the left front wheel and the lower edge of the link mechanism or the steering mechanism directly above the left front wheel, and is disposed above an upper edge of the left front wheel as seen from the front in the front-rear direction of the vehicle body frame when the vehicle body frame is in the upright state.

10. The vehicle as set forth in claim 1, wherein the right aerodynamic portion covers at least a portion of an upper surface of the right front wheel, and is configured to prevent objects including muddy water kicked up by the right front wheel from scattering; and the left aerodynamic portion covers at least a portion of an upper surface of the left front wheel, and is configured to prevent objects including muddy water kicked up by the left front wheel from scattering.

* * * * *